(12) United States Patent
Periwal

(10) Patent No.: US 10,437,564 B1
(45) Date of Patent: Oct. 8, 2019

(54) OBJECT MAPPING AND CONVERSION SYSTEM

(71) Applicant: Software Tree, LLC, Campbell, CA (US)

(72) Inventor: Damodar D. Periwal, Campbell, CA (US)

(73) Assignee: Software Tree, LLC, Campbell, CA (US)

( * ) Notice: Subject to any disclaimer, the term of this patent is extended or adjusted under 35 U.S.C. 154(b) by 0 days.

(21) Appl. No.: 15/607,398

(22) Filed: May 26, 2017

Related U.S. Application Data

(60) Provisional application No. 62/396,090, filed on Sep. 16, 2016.

(51) Int. Cl.
| | |
|---|---|
| *G06F 17/30* | (2006.01) |
| *H04L 29/06* | (2006.01) |
| *H04L 29/08* | (2006.01) |
| *G06F 7/00* | (2006.01) |

(Continued)

(52) U.S. Cl.
CPC ............ *G06F 8/315* (2013.01); *G06F 16/284* (2019.01)

(58) Field of Classification Search
CPC ......... G06F 17/30569; G06F 17/30595; G06F 17/30292; G06F 17/30294; G06F 17/30427; G06F 17/30477; G06F 17/30958; G06F 17/30598; G06F 16/284; G06F 16/9235;

(Continued)

(56) References Cited

U.S. PATENT DOCUMENTS

| | | |
|---|---|---|
| 5,201,046 A | 4/1993 | Goldberg et al. |
| 5,235,701 A | 8/1993 | Ohler et al. |
| 5,291,583 A | 3/1994 | Bapat |

(Continued)

OTHER PUBLICATIONS

Amin et al., Universal database access layer to facilitate query, 6 pages (Year: 2014).*

(Continued)

*Primary Examiner* — Thuy Dao
(74) *Attorney, Agent, or Firm* — Witkowski Law

(57) ABSTRACT

A system for mapping, converting, pruning, flattening, and persisting data amongst object-oriented systems and relational systems. Object class definitions and JSON objects define an object-oriented system and a relational database defines a relational system. An Object Relational Mapping (ORM) system exchanges data between an object-oriented system and a relational system. An ORM system includes an ORM Grammar, an ORM Specification, an ORM Data Structure, and an OR Mapping Unit. Data transfer can be achieved amongst relational and non-relational systems. An Object Conversion System (OCS) system exchanges data between one or more object-oriented systems. An OCS system includes an OCS Grammar, an OCS Specification, an OCS Data Structure, and an Object Conversion Unit. The ORM and OCS Specifications may use virtual attributes including path expressions. A path expression includes a chain of attribute names to specify a nested attribute in an object graph. Objects may be augmented with extra attributes during mapping or conversion. An OCS system can be used as an automatic object conversion machine. Multiple OCS systems may provide an Object Conversion Exchange service.

60 Claims, 56 Drawing Sheets

(51) Int. Cl.
*G06F 8/30* (2018.01)
*G06F 16/28* (2019.01)

(58) Field of Classification Search
CPC .... G06F 16/258; G06F 16/27; G06F 16/9024;
G06F 8/36; G06F 8/315; G06N 5/04
See application file for complete search history.

(56) References Cited

U.S. PATENT DOCUMENTS

| | | | |
|---|---|---|---|
| 5,295,256 A | 3/1994 | Bapat | |
| 5,315,709 A | 5/1994 | Alston, Jr. et al. | |
| 5,426,780 A | 6/1995 | Gerull et al. | |
| 5,499,371 A | 3/1996 | Henninger et al. | |
| 5,504,884 A | 4/1996 | Kyuma et al. | |
| 5,504,892 A | 4/1996 | Atsatt et al. | |
| 5,542,078 A | 7/1996 | Martel et al. | |
| 5,627,979 A | 5/1997 | Chang et al. | |
| 5,694,598 A | 12/1997 | Durand et al. | |
| 5,706,504 A | 1/1998 | Atkinson et al. | |
| 5,729,739 A | 3/1998 | Cantin et al. | |
| 5,732,257 A | 3/1998 | Atkinson et al. | |
| 5,765,162 A | 6/1998 | Blackman et al. | |
| 5,765,163 A | 6/1998 | Blackman et al. | |
| 5,774,692 A | 6/1998 | Boyer et al. | |
| 5,797,136 A | 8/1998 | Boyer et al. | |
| 5,799,309 A | 8/1998 | Srinivasan | |
| 5,832,498 A | 11/1998 | Exertier | |
| 5,838,965 A | 11/1998 | Kavanagh et al. | |
| 5,873,093 A | 2/1999 | Williamson et al. | |
| 5,878,411 A | 3/1999 | Burroughs et al. | |
| 5,907,847 A | 5/1999 | Goldberg | |
| 5,956,725 A | 9/1999 | Burroughs et al. | |
| 5,956,730 A | 9/1999 | Burroughs et al. | |
| 5,978,796 A | 11/1999 | Malloy et al. | |
| 5,995,975 A | 11/1999 | Malcolm | |
| 6,009,436 A | 12/1999 | Motoyama et al. | |
| 6,047,284 A | 4/2000 | Owens et al. | |
| 6,061,515 A | 5/2000 | Chang et al. | |
| 6,076,090 A | 6/2000 | Burroughs et al. | |
| 6,101,502 A | 8/2000 | Heubner et al. | |
| 6,163,776 A | 12/2000 | Periwal | |
| 6,163,781 A | 12/2000 | Wess, Jr. | |
| 6,173,290 B1 | 1/2001 | Goldberg | |
| 6,230,157 B1 | 5/2001 | Malcolm et al. | |
| 6,240,422 B1 | 5/2001 | Atkins et al. | |
| 6,279,015 B1 | 8/2001 | Fong et al. | |
| 6,301,585 B1 | 10/2001 | Milne | |
| 6,334,158 B1 | 12/2001 | Jennyc et al. | |
| 6,374,252 B1 | 4/2002 | Althoff et al. | |
| 6,470,354 B1 | 10/2002 | Aldridge et al. | |
| 6,484,180 B1 | 11/2002 | Lyons et al. | |
| 6,587,856 B1 | 7/2003 | Srinivasan et al. | |
| 6,704,744 B1 | 3/2004 | Williamson et al. | |
| 6,711,582 B2 | 3/2004 | Aldridge et al. | |
| 6,754,670 B1 | 6/2004 | Lindsay et al. | |
| 6,799,182 B2 | 9/2004 | Bata | |
| 7,039,624 B1 | 5/2006 | Merk et al. | |
| 7,069,269 B2 | 6/2006 | Morris | |
| 7,127,474 B2 | 10/2006 | Williamson et al. | |
| 7,191,196 B2 | 3/2007 | Perks et al. | |
| 7,343,378 B2 | 3/2008 | Marcjan | |
| 7,386,836 B2 | 6/2008 | Fox et al. | |
| 7,406,683 B2 | 7/2008 | Kalidindi et al. | |
| 7,680,767 B2 | 3/2010 | Adya | |
| 7,725,469 B2 | 5/2010 | Colgrave et al. | |
| 7,809,768 B2 | 10/2010 | Owens et al. | |
| 7,844,612 B2 | 11/2010 | Colgrave et al. | |
| 8,359,280 B2 | 1/2013 | Yu et al. | |
| 8,589,450 B2 | 11/2013 | Xue et al. | |
| 8,914,438 B2 * | 12/2014 | Pletter | G06F 3/0481 709/203 |
| 8,949,294 B2 | 2/2015 | Surtani et al. | |
| 9,037,614 B1 | 5/2015 | Parrott | |
| 9,305,044 B2 * | 4/2016 | Hahn | G06F 19/00 |
| 9,430,549 B2 * | 8/2016 | Guo | G06F 16/282 |
| 9,552,403 B2 * | 1/2017 | Bhattacharjee | G06F 16/258 |
| 9,684,699 B2 * | 6/2017 | DelGobbo | G06F 16/242 |
| 9,792,347 B2 * | 10/2017 | Guo | G06F 16/282 |
| 10,133,558 B2 * | 11/2018 | Farooqi | G06F 8/36 |
| 2008/0228697 A1 | 9/2008 | Adya et al. | |
| 2009/0055432 A1 * | 2/2009 | Smith | G06F 17/30595 |
| 2010/0082646 A1 | 4/2010 | Meek et al. | |
| 2011/0321010 A1 | 12/2011 | Wang | |
| 2012/0246202 A1 | 9/2012 | Surtani et al. | |
| 2013/0166568 A1 * | 6/2013 | Binkert | G06F 17/30911 707/741 |
| 2013/0218933 A1 * | 8/2013 | Ismailov | G06F 9/4493 707/812 |
| 2014/0032588 A1 | 1/2014 | Getmanets | |
| 2014/0059140 A1 | 2/2014 | Auriemma et al. | |
| 2014/0279838 A1 * | 9/2014 | Tsirogiannis | G06F 17/30292 707/603 |
| 2015/0074081 A1 * | 3/2015 | Falter | G06F 17/30604 707/713 |
| 2016/0342708 A1 * | 11/2016 | Fokoue-Nkoutche | G06F 16/9024 |
| 2016/0373456 A1 * | 12/2016 | Vermeulen | G06F 17/30675 |
| 2017/0116273 A1 * | 4/2017 | Liu | G06F 17/30466 |
| 2017/0116283 A1 * | 4/2017 | Park | G06F 16/258 |

OTHER PUBLICATIONS

Dimou et al., Mapping Hierarchical Sources into RDF Using the RML Mapping Language, 8 pages (Year: 2014).*
"Building TOPLink Table Descriptors, Version 2.1", The Object People Inc., (Sep. 1996).
"Enterprise Toolkit", http://www.sunmanagers.org/archives/1996/att-0453/01-part Retrieved from the Internet on Jun. 7, 2006,(1996).
"Introduction to TOPLink, version 2.1", The Object People Inc. (Sep. 1996).
"TOPLink Employee Demo Reference, Version 2.1", The Object People Inc., (Sep. 1996).
"Toolink v.2.1", The Obiect People, Inc. (1996).
Jenkov, J. (n.d.). Java JSON Tutorial. Retrieved Oct. 4, 2017, from http://tutorials.jenkov.com/java-json/index.html.
Hibernate ORM. (n.d.). Retrieved Oct. 4, 2017, from http://hibernate.org/orm/.
Java Persistence API. (n.d.). Retrieved Oct. 4, 2017, from http://www.oracle.com/technetwork/java/javaee/tech/persistence-jsp-140049.html.
Java Data Objects. (n.d.). Retrieved Oct. 4, 2017, from https://db.apache.org/jdo/.
White Papers. (n.d.). Retrieved Oct. 4, 2017, from http://softwaretree.com/v1/KISSPrinciples.html.

* cited by examiner

```
<ORM-INFO>                      ::= [;ORMId=<ORMId>]
                                    [;ORMFile=<fileName>]
                                    [;DBTYPE=<DATABASE-TYPE>]
                                    [;JDBC_DRIVER=<driverName>]

<DATABASE-URL>                  ::= <regularURL>[<ORM-INFO>]

<ENDDATABASE-SPEC>              ::= ;

<DATABASE-SPEC>                 ::= DATABASE <DATABASE-URL>
                                    <ENDDATABASE-SPEC>

<PRIMARY-KEY-SPEC>              ::= PRIMARY_KEY {<attribName> ...}

<REFERENCE-KEY-SPEC>            ::= REFERENCE_KEY <referenceKeyName>
                                        {<attribName> ...}

<IMPLICIT-ATTRIB-SPEC>          ::= IMPLICIT_ATTRIB <attribName>
                                        ATTRIB_TYPE <attribType>

<VIRTUAL-ATTRIB-SPEC>           ::= VIRTUAL_ATTRIB <attribName>
                                        ATTRIB_TYPE <attribType>

<VIRTUAL-COMPLEXATTRIB-SPEC>    ::= VIRTUAL_COMPLEXATTRIB <attribName>
                                        ATTRIB_TYPE <attribType>

<SQLMAP-SPEC>                   ::= SQLMAP FOR <attribName>
                                        [COLUMN_NAME <columnName>]
                                        [SQLTYPE <sqlType>]
                                        [NULLABLE]

<RDBMS-GENERATED-ATTRIBS-SPEC>  ::= RDBMS_GENERATED {<attribName> ...}

<IGNORE-ATTRIBS-SPEC>           ::= IGNORE {<attribName> ...}

<RELATIONSHIP-SPEC>             ::= RELATIONSHIP <attribName>
                                        REFERENCES [!]<targetClassName>
                                        {EMBEDDED | INLINE  [AUTO_INSTANTIATE]|
                                        [BYVALUE]
                                        [REFERENCED_KEY <referencedKeyName>]
                                        [INVERSE <owningAttribName>]
                                        WITH <attribName> ...}

<ENDCLASS-SPEC>                 ::= ;
```

FIG. 1A

```
<CLASS-SPEC>                ::= CLASS <className> [TABLE<tableName>]
                                <PRIMARY-KEY-SPEC>
                                [<REFERENCE-KEY-SPEC> ...]
                                  [<SQLMAP-SPEC>...]
                                  [<RDBMS-GENERATED-ATTRIBS-SPEC>...]
                                  [<IMPLICIT-ATTRIB-SPEC> ...]
                                  [<VIRTUAL-ATTRIB-SPEC> ...]
                                  [<VIRTUAL-COMPLEXATTRIB-SPEC> ...]
                                  [<IGNORE-ATTRIBS-SPEC> ...]
                                  [<RELATIONSHIP-SPEC> ...]
                                  <ENDCLASS-SPEC>

<ORDERBY-SPEC>              ::= [{ORDERBY | ORDERBY_DESC} {<attribName> ...}

<COLLECTION-CLASS-SPEC>     ::= COLLECTION_CLASS <className>
                                  COLLECTION_TYPE {ARRAY | VECTOR |
                                    JAVACOLLECTION}
                                  ELEMENT_CLASS <elementClassName>
                                    [ELEMENT_TABLE <elementTableName>]
                                <PRIMARY-KEY-SPEC>
                                [<REFERENCE-KEY-SPEC>]
                                <SQLMAP-SPEC>
                                [<ORDERBY-SPEC>]
                                <ENDCLASS-SPEC>

<SEQUENCE-SPEC>             ::= SEQUENCE <sequenceName>
                                  MAX_INCREMENT <maxIncrementValue>
                                  [START_WITH <startingVal>]

<REMARK-SPEC>               ::= {REM | //} [<any remarks>]

<ORM-SPEC>                  ::= <DATABASE-SPEC>
                                Any combination of <CLASS-SPEC>,
                                <COLLECTION-CLASS-SPEC>,
                                <SEQUENCE-SPEC>, and
                                <REMARK-SPEC>
```

FIG. 1B

```
DATABASE jdbc:sqldroid:<dbPath>/example.db;
    DBTYPE=SQLITE;USER=sa;PASSWORD=sa;
;
CLASS RoySched TABLE roysched
    PRIMARY_KEY title_id lorange
;
COLLECTION_CLASS ArrayRoySched COLLECTION_TYPE
    ARRAY ELEMENT_CLASS RoySched
    PRIMARY_KEY title_id
    ORDERBY royalty
;
CLASS Title TABLE titles
    PRIMARY_KEY title_id
    RELATIONSHIP royscheds REFERENCES ArrayRoySched
    BYVALUE WITH title_id
    SQLMAP FOR price SQLTYPE Money
;
COLLECTION_CLASS ArrayTitle COLLECTION_TYPE ARRAY
    ELEMENT_CLASS Title
    PRIMARY_KEY pub_id
    ORDERBY ytd_sales title_id
;
CLASS PubInfo TABLE pub_info
    PRIMARY_KEY pub_id
    SQLMAP FOR logo SQLTYPE image
    SQLMAP FOR prInfo COLUMN_NAME pr_info SQLTYPE text
;
CLASS Publisher TABLE publishers
    PRIMARY_KEY pub_id
    RELATIONSHIP pubInfo REFERENCES PubInfo BYVALUE
    WITH pub_id
    RELATIONSHIP titles REFERENCES ArrayTitle
                BYVALUE WITH pub_id
;
CLASS MyJSONPaymentClass TABLE PAYMENT
    VIRTUAL_ATTRIB paymentId ATTRIB_TYPE int
    VIRTUAL_ATTRIB publisherName ATTRIB_TYPE java.lang.String
    VIRTUAL_ATTRIB paymentDate ATTRIB_TYPE java.util.Date
    VIRTUAL_ATTRIB amount ATTRIB_TYPE float
    PRIMARY_KEY paymentId
    SQLMAP FOR paymentId SQLTYPE 'INTEGER PRIMARY KEY AUTOINCREMENT'
    RDBMS_GENERATED paymentId
;
SEQUENCE seqFoo MAX_INCREMENT 100
SEQUENCE seqBar MAX_INCREMENT 1000 START_WITH 1
```

FIG. 2

| Data Structure | Description |
|---|---|
| ColumnInfo | Stores the relational Column information – name, SQL type. |
| TableInfo | Stores the table name, the list of ColumnInfo corresponding to its columns. |
| AttribInfo | Stores the following information about a class attribute: name, type, ColumnInfo. |
| VirtualAttribInfo | Stores the following information about a virtual attribute: name, type, ColumnInfo. |
| ComplexAttribInfo | In addition to AttribInfo information, it also stores the information about the referenced object (or collection), the referencing attributes, the containment of the referenced object. |
| VirtualComplexAttribInfo | Similar to ComplexAttribInfo, stores information about a virtual complex attribute |
| ReferenceKeyInfo | Stores information about the primary and reference keys of a class |
| ClassInfo | Stores the class name, reference to TableInfo, list of AttribInfo, list of VirtualAttribInfo, list of ComplexAttribInfo, list of VirtualComplexAttribInfo, list of ReferenceKeyInfo. |
| CollectionClasssInfo | In addition to ClassInfo information for its element class, it also stores the information about collection type, containment type and order by attributes. |
| DatabaseInfo | Stores url, ORMId, list of ClassInfo, list of TableInfo, list of database connections. |

FIG. 3

| NAME | DESCRIPTION | REQUIRED? |
|---|---|---|
| ID | City Identificator | mandatory |
| dt | Time of data receiving in unixtime GMT | mandatory |
| coord.lat | City location (latitude) | mandatory |
| coord.lng | City location (longitude) | mandatory |
| name | City name | mandatory |
| main.temp | Temperature in Kelvin. Subtracted 273.15 from this figure to convert to Celsius. | mandatory |
| main.humidity | Humidity in % | mandatory |
| main.temp_min | Minimum temperature | Optional |
| main.temp_max | Maximum temperature | Optional |
| main.pressure | Atmospheric pressure in hPa | mandatory |
| wind.speed | Wind speed in mps | mandatory |
| wind.deg | Wind direction in degrees (meteorological) | mandatory |
| clouds.all | Cloudiness in % | mandatory |
| weather | weather condition codes | Optional |
| rain.3h | Precipitation volume mm per 3 hours | Optional |
| snow.3h | Precipitation volume mm per 3 hours | Optional |

FIG. 12

```
{
    "coord":{"lon":-74.01,"lat":40.71},
    "sys":
        {
        "message":0.4241,
        "country":"US",
        "sunrise":1387282482,
        "sunset":1387315825
        },
    "weather":
        [{
        "id":600,
        "main":"Snow",
        "description":"light snow",
        "icon":"13n"
        }],
    "base":"gdps stations",
    "main":
        {
        "temp":269.06,
        "pressure":1015,
        "temp_min":266.48,
        "temp_max":272.04,
        "humidity":100
        },
    "wind":{
        "speed":1.54,
        "gust":4.11,
        "deg":264},
    "rain":{
        "3h":0
        },
    "snow":{
        "3h":0
        },
    "clouds":
        {
        "all":80
        },
    "dt":1387321740,
    "id":5128581,
    "name":"New York",
    "cod":200
}
```

FIG. 13

```
CLASS com.example.model.JSON_Weather TABLE Weather
    // First declare all the VIRTUAL_ATTRIBs corresponding
    // to the JSON object attributes.
    VIRTUAL_ATTRIB name ATTRIB_TYPE java.lang.String
    VIRTUAL_ATTRIB dt ATTRIB_TYPE int
    VIRTUAL_ATTRIB main.temp ATTRIB_TYPE double
    VIRTUAL_ATTRIB main.pressure ATTRIB_TYPE double
    VIRTUAL_ATTRIB main.humidity ATTRIB_TYPE double
    VIRTUAL_ATTRIB wind.speed ATTRIB_TYPE double
    // Now provide the rest of the mapping specification for this class.
    // For example, define legitimate (without dot notation) and more
    // meaningful column names for some of the JSON attributes.
    PRIMARY_KEY name dt
    SQLMAP FOR name COLUMN_NAME city
    SQLMAP FOR dt COLUMN_NAME GMT_dt
    SQLMAP FOR main.temp COLUMN_NAME temp_kelvin
    SQLMAP FOR main.pressure COLUMN_NAME pressure_hpa
    SQLMAP FOR main.humidity COLUMN_NAME humidity_percentage
    SQLMAP FOR wind.speed COLUMN_NAME wind_speed_mps
;
```

FIG. 14

```
{
  "dt":1387321740,
  "name":"New York",
  "main.temp": 269.06
  "main.pressure":1015,
  "main.humidity":100,
  "wind.speed":1.54
}
```

FIG. 15

```
<OCS-SPEC>                            ::= {<CLASS-SPEC>...}

<CLASS-SPEC>                          ::= <INPUT-CLASS-SPEC>
                                             [<OUTPUT-CLASS-SPEC>]
                                             [<ATTRIB-SPEC>...]
                                             [<IGNORE-ATTRIBS-SPEC>]
                                             [<QUERY-SPEC>...]
                                          <ENDCLASS-SPEC>

<ENDCLASS-SPEC>                       ::= ;

<INPUT-CLASS-SPEC>                    ::= [CLASS | INPUT_CLASS]
                                             <inputClassName>

<OUTPUT-CLASS-SPEC>                   ::= OUTPUT_CLASS <outputClassName>

<ATTRIB-SPEC>                         ::= {<INPUT-ATTRIB-SPEC>
                                             [<OUTPUT-ATTRIB-SPEC>]}

<INPUT-ATTRIB-SPEC>                   ::= {<REGULAR-INPUT-ATTRIB-SPEC> |
                                             <VIRTUAL-INPUT-ATTRIB-SPEC> |
                                             <VIRTUAL-INPUT-COMPLEX-ATTRIB-SPEC>}

<REGULAR-INPUT-ATTRIB-SPEC>           ::= [ATTRIB | INPUT_ATTRIB] <attribName>

<VIRTUAL-INPUT-ATTRIB-SPEC>           ::= [VIRTUAL_ATTRIB | VIRTUAL_INPUT_ATTRIB]
                                             <attribName> <ATTRIB-TYPE-SPEC>

<VIRTUAL-INPUT-COMPLEX-ATTRIB-SPEC>   ::= [VIRTUAL_COMPLEXATTRIB |
                                             VIRTUAL_INPUT_COMPLEXATTRIB]
                                             <attribName> <ATTRIB-TYPE-SPEC>

<ATTRIB-TYPE-SPEC>                    ::= ATTRIB_TYPE <attribType>

<OUTPUT-ATTRIB-SPEC>                  ::= {<REGULAR-OUTPUT-ATTRIB-SPEC> |
                                             <VIRTUAL-OUTPUT-ATTRIB-SPEC> |
                                             <VIRTUAL-OUTPUT-COMPLEX-ATTRIB-SPEC>}

<REGULAR-OUTPUT-ATTRIB-SPEC>          ::= OUTPUT_ATTRIB <attribName>

<VIRTUAL-OUTPUT-ATTRIB-SPEC>          ::= VIRTUAL_OUTPUT_ATTRIB
                                             <attribName> <ATTRIB-TYPE-SPEC>

<VIRTUAL-OUTPUT-COMPLEX-ATTRIB-SPEC>  ::= VIRTUAL_OUTPUT_COMPLEXATTRIB
                                             <attribName> <ATTRIB-TYPE-SPEC>

<IGNORE-ATTRIBS-SPEC>                 ::= IGNORE {<attribName> ...}

<QUERY-SPEC>                          ::= QUERY_NAME <queryName>
                                             QUERY_URL <QUERY-URL>
```

FIG. 21

| Data Structure | Description |
| --- | --- |
| AttribInfo or InputAttribInfo | Stores the following information about an input(source) class attribute: name, type, OutputAttribInfo, VirtualOutputAttribInfo, etc. |
| VirtualAttribInfo or VirtualInputAttribInfo | Stores the following information about an input (source) virtual attribute: name, type, etc. |
| ComplexAttribInfo | In addition to AttribInfo information, it also stores the information about the referenced object (or collection), the referencing attributes, the containment of the referenced object, etc. |
| VirtualComplexAttribInfo or VirtualInputComplexAttribInfo | Similar to ComplexAttribInfo, stores information about an input (source) virtual complex attribute |
| OutputAttribInfo | Stores the following information about an output (target) attribute: name, type, etc. |
| VirtualOutputAttribInfo | Stores the following information about an output (target) virtual attribute: name, type, etc. |
| OutputClassInfo | Stores the target class name, reference to list of OutputAttribInfo, list of VirtualOutputAttribInfo, etc. |
| ReferenceKeyInfo | Stores information about the primary and reference keys of a class |
| ClassInfo or InputClassInfo | Stores the source class name, reference to OutputClassInfo, list of InputAttribInfo, list of VirtualInputAttribInfo, list of ComplexAttribInfo, list of VirtualComplexAttribInfo, list of ReferenceKeyInfo, etc. |
| CollectionClasssInfo | In addition to ClassInfo information for its element class, it also stores the information about collection type, containment type and order by attributes, etc. |
| QueryInfo | Stores the following information about making a query call: query name, query URL, InputClassInfo, query parameters, etc. |
| OCSInfo | Stores url, OCSId, list of InputClassInfo, list of OutputClassInfo, list of QueryInfo, etc. |

FIG. 22

```
package com.orm;

import org.json.JSONException;
import org.json.JSONObject;

/**
 * This class extends {{@link #JSONObject} to provide the added
 * capability of looking up the value of a named attribute (AKA
 * field, property, member) from the underlying JSON object such
 * that if the named attribute is a path expression specifying a
 * attribute name of a referenced object, it can traverse the
 * object path to retrieve the value of the specified named
 * attribute from the referenced object.
 * <p/>
 * A JSON (JavaScript Object Notation) is a lightweight
 * data-interchange format built on two structures:
 * - A collection of name/value pairs. In various languages, this
 * is realized as an object, record, struct, dictionary, hash
 * table, keyed list, or associative array.
 * <br>
 * - An ordered list of values. In most languages, this is realized
 * as an array, vector, list, or sequence.
 * <br>
 * Source: {@link http://json.org/}
 * <br>
 * A path expression specifies the attribute name of a reference
 * object (or value) in an object graph. For example, suppose a
 * JSON object obj1 has attributes a11 and a12 such that a12
 * references object obj2 (which has attributes a21, a22, and a23)
 * such that the attribute a23 references an object obj3 (which
 * further has attributes a31, a32, and a33).
 * <p/>
 * The following are examples of path expressions with reference to
 * the top level object obj1 described above:
 * <p/>
 * a11 (specifies the attribute a11 in obj1)
 * <br>
 * a12 (specifies the attribute a12 referencing obj2 in obj1)
 * <br>
 * a12.a21 (specifies the attribute a21 in obj2 referenced through
 * the attribute a12 in obj1)
 * <br>
 * a12.a23 (specifies the attribute a23 referencing obj3 in obj2
 * referenced through the attribute a12 in obj1)
 * <br>
 * a12.a23.a33 (specifies the attribute a33 in obj3 referenced through
 * the attribute a23 of obj2 referenced through the attribute a12
 * in obj1)
 * <p/>
 *
 * @author Damodar Periwal
 */
public class EnhancedJSONObject extends JSONObject { public EnhancedJSONObject() {
        super();
    }
```

FIG. 37A

```java
public EnhancedJSONObject(JSONObject origJSONObject)
    throws JSONException {
  super(origJSONObject.toString());
}

@Override
public Object get(String name) throws JSONException {
  if (null == name) {
    throw new JSONException("Null JSON attribute name.");
  }

Object value = this.opt(name);
  if (null == value) {
    // If a path expression is involved,
    // get the value from the referenced object
    if (name.contains(".")) {
      value = this.getWithPathExpression(name);
    }
  }
  return value;
}

/**
 * Gets the value for a given attribute name involving a path
 * expression.
 *
 * @param name An attribute name that involves a path expression
 * @return The value for the given attribute name or null if any
 * link is broken.
 * @throws JSONException
 */
private Object getWithPathExpression(String name)
    throws JSONException {
  if (name.contains(".")) { // It is a path expression
    int dotIndex = name.indexOf(".");
    String namePath = name.substring(0, dotIndex);
    JSONObject referencedJSONObject = (JSONObject) this.
        opt(namePath);
    if (null == referencedJSONObject) {
      // The path link to the desired attribute is broken.
      return null;
    }

// Go further down the path expression
    String remainingNamePath = name.substring(dotIndex + 1);
    try {
      return new EnhancedJSONObject(referencedJSONObject).
          get(remainingNamePath);
    } catch (JSONException ex) {
      throw new JSONException("Exception while accessing " +
          remainingNamePath + "; " + ex.getMessage());
    }
  } else
    return this.get(name);
}
}
```

FIG. 37B

```
package com.orm;

import org.json.JSONException;
import org.json.JSONObject;

/**
 * This class serves as a base class for persisting JSONObject
 * instances of a domain specific class which should be defined as
 * a subclass of this class. The object relational mapping for that
 * domain specific class is defined using VIRTUAL_ATTRIB
 * specifications for each attribute of the corresponding JSON object.
 * <p>
 * This class uses an encapsulated enhanced JSONObject instance to
 * manipulate object attributes (properties).
 * <p>
 * If, in the derived domain specific class, you want to define
 * additional attributes which are not part of the encapsulated
 * JSONObject, you must also define the corresponding setter/getter
 * methods for those additional attributes in the derived class.
 * You should also define any non-default object relational mapping
 * information for those additional attributes in the mappin
 * specification.
 * <p>
 * @author Damodar Periwal
 */
public abstract class JSONObjectContainer { transient JSONObject origJSONObject;
    transient EnhancedJSONObject enhancedJSONObject;

public JSONObjectContainer() {
        this.origJSONObject = null;
        this.enhancedJSONObject = new EnhancedJSONObject();
    }

/**
     * Constructor that supplies the underlying JSONObject to be
     * encapsulated.
     * <p>
     * @param jsonObject
     * @throws JSONException
     */
    public JSONObjectContainer(JSONObject jsonObject)
            throws JSONException {
        this.origJSONObject = jsonObject;
        this.enhancedJSONObject = new EnhancedJSONObject(jsonObject);
    }

/**
     * Returns the value mapped by attribName.
     * @param attribName Name of an attribute
     * @throws JSONException
     */
    public Object get(String attribName) throws JSONException {
        return enhancedJSONObject.get(attribName);
    }

```
 * Maps attribName to value, clobbering any existing
 * attribName/value mapping with the same attribName. If the
 * value is null, any existing mapping for attribName is removed.
 * <p>
 * @param attribName Name of an attribute
 * @param value  A JSONObject, JSONArray, String, Boolean,
 *           Integer, Long, Double, NULL, or null. May not
 *           be NaNs or infinities.
 * @throws JSONException
 */
public void put(String attribName, Object value)
    throws JSONException {
  enhancedJSONObject.put(attribName, value);
}

/**
 * This method is meant for ORM's internal use to handle
 * Implicit/Virtual Attributes
 */
public Object getAttribValue(String attribName)
    throws JSONException {
  return get(attribName);
}

/**
 * This method is meant for the ORM's internal use to handle
 * Implicit/Virtual Attributes
 */
public void setAttribValue(String attribName, Object value)
    throws JSONException{
  put(attribName, value);
}

/**
 * Returns the encapsulated JSONObject instance.
 * @throws JSONException
 */
public JSONObject getJSONObject() throws JSONException {
  if (null == origJSONObject) {
    return new JSONObject(enhancedJSONObject.toString());
  } else {
    return origJSONObject;
  }
} public EnhancedJSONObject getEnhancedJSONObject() {
  return enhancedJSONObject;
}

/**
 * Returns toString() result of the encapsulated JSONObject
 * instance.
 */
@Override
public String toString() {
  return enhancedJSONObject.toString();
}
}
```

FIG. 38B

```java
package com.orm;

import org.json.JSONException;
import org.json.JSONObject;

/**
 * This class serves as a base class for persisting JSONObject
 * instances of a domain specific class which should be defined
 * as a subclass of this class.
 * The object relational mapping for that domain specific class
 * is defined using VIRTUAL_ATTRIB specifications for each attribute
 * of the corresponding JSON object.
 * <p>
 * This class uses an encapsulated JSONObject instance to manipulate
 * object attributes (properties).
 * <p>
 * If, in the derived domain specific class, you want to define
 * additional attributes which are not part of the encapsulated
 * JSONObject, you must also define the corresponding setter/getter
 * methods for those additional attributes in the derived class.
 * You should also define any non-default object relational mapping
 * information for those additional attributes in the mapping
 * specification.
 * <p>
 * @author Damodar Periwal
 */
public class JSONObjectContainer { transient JSONObject jsonObject;

public JSONObjectContainer() {
        this.jsonObject = new JSONObject();
    }

/**
     * Constructor that supplies the underlying JSONObject to be
     * encapsulated.
     * <p>
     * @param jsonObject
     * @throws JSONException
     */
    public JSONObjectContainer(JSONObject jsonObject)
            throws JSONException {
        setJSONObject(jsonObject);
    } public void setJSONObject(JSONObject jsonObject)
            throws JSONException {
        this.jsonObject = jsonObject;
        if (jsonObject == null) {
            this.jsonObject = new JSONObject();
        }
    }
```

FIG. 39A

```java
/**
 * Gets the value for a given attribute name that may involve a
 * path expression.
 * @param attribName An attribute name that involves a path
 *                   expression
 * @return The value for the given attribute name or null if any
 * link is broken.
 * @throws JSONException
 */
public Object get(String attribName) throws JSONException {
    if (null == attribName) {
        throw new JSONException("Null JSON attribute name.");
    }

Object value = jsonObject.opt(attribName);
    if (null == value) {
        // If a path expression is involved,
        // get the value from the referenced object
        if (attribName.contains(".")) {
            value = getWithPathExpression(attribName);
        }
    }
    return value;
}

/**
 * Gets the value for a given attribute name involving a path
 * expression.
 * @param attribName An attribute name that involves a path
 * expression
 * @return The value for the given attribute name or null if any
 * link is broken.
 * @throws JSONException
 */
private Object getWithPathExpression(String attribName)
        throws JSONException {
    if (attribName.contains(".")) { // It is a path expression
        int dotIndex = attribName.indexOf(".");
        String namePath = attribName.substring(0, dotIndex);
        JSONObject referencedJSONObject =
                (JSONObject) jsonObject.opt(namePath);

if (null == referencedJSONObject) {
            // The path link to the desired attribute is broken.
            return null;
        }

// Go further down the path expression
        String remainingNamePath = attribName.
                substring(dotIndex + 1);
        try {
            return new JSONObjectContainer(referencedJSONObject).
                    get(remainingNamePath);
        } catch (JSONException ex) {
            throw new JSONException("Exception while accessing " +
                    remainingNamePath + "; " + ex.getMessage());
        }
    } else
        return get(attribName);
}
```

FIG. 39B

```
/**
 * Maps attribName to value, clobbering any existing
 * attribName/value mapping with the same attribName.
 * If the value is null, any existing mapping for attribName is
 * removed.
 * <p>
 * @param attribName Name of an attribute
 * @param value  A JSONObject, JSONArray, String, Boolean,
 *          Integer, Long, Double, NULL, or null.
 *          May not be NaNs or infinities.
 * @throws JSONException
 */
public void put(String attribName, Object value)
    throws JSONException {
  jsonObject.put(attribName, value);
}

/**
 * This method is meant for ORM's internal use to handle
 * Virtual Attributes
 */
public Object getAttribValue(String attribName)
    throws JSONException {
  return get(attribName);
}

/**
 * This method is meant for the ORM's internal use to handle
 * Virtual Attributes
 */
public void setAttribValue(String attribName, Object value)
    throws JSONException {
  put(attribName, value);
}

/**
 * Returns the encapsulated JSONObject instance.
 * @throws JSONException
 */
public JSONObject getJSONObject() throws JSONException {
   return jsonObject;
}

/**
 * Returns toString() result of the encapsulated JSONObject
 * instance.
 */
@Override
public String toString() {
   return jsonObject.toString();
}

```
package com.example.model;

import org.json.JSONException;
import org.json.JSONObject;

import com.orm.JSONObjectContainer;

/**
 * A shell class defining a domain model object class for Weather
 * objects based on the class JSONObject. This class needs to
 * define just two constructors. Most of the processing is handled
 * by the superclass JSONObjectContainer.
 * <p>
 * @author Damodar Periwal
 *
 */
public class JSON_Weather extends JSONObjectContainer { public JSON_Weather() {
        super();
    } public JSON_Weather(JSONObject jsonObject) throws JSONException {
        super(jsonObject);
    }

```java
package com.ocs;

/**
 * An interface for accessor methods. Helpful in providing object
 * conversion and/or persistence functionality.
 * <p>
 * @author Damodar Periwal
 *
 */
public interface GetSet {

/**
     * Gets the value for the given attribute in the current object.
     * @param attribName The name of the attribute
     * @return The value of the attribute
     * @throws Exception
     */
    public Object get(String attribName) throws Exception;

/**
     * Sets the value of the given attribute in the current object.
     * @param attribName The name of the attribute
     * @param value The value to be set
     * @throws Exception
     */
    public void set(String attribName, Object value) throws Exception;
}
```

FIG. 41

```java
package com.ocs;

/**
 * This class encapsulates an object implementing {@link GetSet}
 * interface and serves as an intermediary to intercept
 * getAttribValue and setAttribValue calls to provide the
 * functionality of getting and setting the attribute values of the
 * encapsulate object using its GetSet interface implementation.
 * The main advantage of using this intermediate class is its
 * ability to get the value of an attribute named with a path
 * expression. This class provides an innovative way to traverse
 * the object path to retrieve the value of the specified named
 * attribute from a referenced object, if needed.
 * <p>
 * A path expression specifies the attribute name of a referenced
 * object (or value) in an object graph. For example, suppose an
 * object obj1 has attributes a11 and a12 such that a12 references
 * object obj2 (which has attributes a21, a22, and a23) such that
 * the attribute a23 references an object obj3 (which further has
 * attributes a31, a32, and a33).
 * <p>
 * The following are examples of path expressions with reference
 * to the top level object obj1 described above:
 * <p>
 * a11 (specifies the attribute a11 in obj1)
 * <br>
 * a12 (specifies the attribute a12 referencing obj2 in obj1)
 * <br>
 * a12.a21 (specifies the attribute a21 in obj2 referenced through
 * the attribute a12 in obj1)
 * <br>
 * a12.a23 (specifies the attribute a23 referencing obj3 in obj2
 *        referenced through the attribute a12 in obj1)
 * <br>
 * a12.a23.a33 (specifies the attribute a33 in obj3 referenced
 *         through the attribute a23 of obj2 referenced
 *         through the attribute a12 in obj1)
 * <p>
 * @author Damodar Periwal
 */
public class ObjectContainer {

GetSet containedObject;

public ObjectContainer() {
        super();
    } public ObjectContainer(GetSet containedObject) {
        super();
        this.containedObject = containedObject;
    } public Object getAttribValue(String attribName) throws Exception {
        if (attribName == null) {
            throw new Exception("Null attribute name.");
        }
```

FIG. 42A

```
    Object value = containedObject.get(attribName);
    if (null == value) {
        // If a path expression is involved,
        // get the value from the referenced object
        if (attribName.contains(".")) {
            value = getWithPathExpression(attribName);
        }
    }
    return value;
}

/**
 * Gets the value for a given attribute name involving a path
 * expression.
 * @param attribName An attribute name that involves a path
 *              expression
 * @return The value for the given attribute name or null if
 * the link to the final attribute is broken.
 * @throws Exception
 */
private Object getWithPathExpression(String attribName)
        throws Exception {
    if (attribName.contains(".")) { // It is a path expression
        int dotIndex = attribName.indexOf(".");
        String attribNamePath = attribName.substring(0, dotIndex);
        GetSet referencedObject = (GetSet) containedObject.
            get(attribNamePath);

if (null == referencedObject) {
            // The path link to the desired attribute is broken.
            return null;
        }

// Go further down the path expression
        String remainingAttribNamePath = attribName.substring(
            dotIndex + 1);
        try {
            return new ObjectContainer(referencedObject)
                .getAttribValue(remainingAttribNamePath);
        } catch (Exception ex) {
            throw new Exception("Exception while accessing " +
                remainingAttribNamePath + "; " +
                ex.getMessage());
        }
    } else
        return this.getAttribValue(attribName);
} public void setAttribValue(String attribName, Object value)
        throws Exception {
    containedObject.set(attribName, value);
} public GetSet getContainedObject() {
    return containedObject;
} public void setContainedObject(GetSet containedObject) {
    this.containedObject = containedObject;
}
}
```

FIG. 42B

```java
package com.example.model;

import com.ocs.GetSet;

public class Class1 implements GetSet {
    private int a11;
    private Class2 a12;

public Class1() {
    }

@Override
    public Object get(String name) throws Exception {
        if (name.equals("a11")) {
            return getA11();
        } else if (name.equals("a12")) {
            return getA12();
        }
        return null;
    }
    @Override
    public void set(String name, Object value) throws Exception {
        if (name.equals("a11")) {
            setA11((Integer) value);
        } else if (name.equals("a12")) {
            setA12((Class2) value);
        }
    } public int getA11() {
        return a11;
    } public void setA11(int a11) {
        this.a11 = a11;
    } public Class2 getA12() {
        return a12;
    } public void setA12(Class2 a12) {
        this.a12 = a12;
    }

```java
package com.example.model;
import com.ocs.GetSet;

public class Class2 implements GetSet {
    private int a21;
    private String a22;
    private Class3 a23;

public Class2() {
    }

@Override
    public Object get(String name) throws Exception {
        if (name.equals("a21")) {
            return getA21();
        } else if (name.equals("a22")) {
            return getA22();
        } else if (name.equals("a23")) {
            return getA23();
        }
        return null;
    }
    @Override
    public void set(String name, Object value) throws Exception {
        if (name.equals("a21")) {
            setA21((Integer) value);
        } else if (name.equals("a22")) {
            setA22((String) value);
        } else if (name.equals("a23")) {
            setA23((Class3) value);
        }
    }
    public int getA21() {
        return a21;
    }
    public void setA21(int a21) {
        this.a21 = a21;
    }
    public String getA22() {
        return a22;
    }
    public void setA22(String a22) {
        this.a22 = a22;
    }
    public Class3 getA23() {
        return a23;
    }
    public void setA23(Class3 a23) {
        this.a23 = a23;
    }
}
```

FIG. 44

```
package com.example.model;

import com.ocs.GetSet;

public class Class3 implements GetSet {
    private int a31;
    private int a32;
    private String a33;

public Class3() {
        super();
    }

@Override
    public Object get(String name) throws Exception {
        if (name.equals("a31")) {
            return getA31();
        } else if (name.equals("a32")) {
            return getA32();
        } else if (name.equals("a33")) {
            return getA33();
        }
        return null;
    }

@Override
    public void set(String name, Object value) throws Exception {
        if (name.equals("a31")) {
            setA31((Integer) value);
        } else if (name.equals("a32")) {
            setA32((Integer) value);
        } else if (name.equals("a33")) {
            setA33((String) value);
        }
    } public int getA31() {
        return a31;
    } public void setA31(int a31) {
        this.a31 = a31;
    } public int getA32() {
        return a32;
    } public void setA32(int a32) {
        this.a32 = a32;
    } public String getA33() {
        return a33;
    } public void setA33(String a33) {
        this.a33 = a33;
    }
}
```

FIG. 45

```java
package com.example.model;

import com.ocs.GetSet;

public class OutputClass implements GetSet {
    private int a11;
    private String a12_a22;
    private String a12_a23_a33;

public OutputClass() {
    }

@Override
    public Object get(String attribName) throws Exception {
        if (attribName.equals("a11")) {
            return getA11();
        } else if (attribName.equals("a12_a22")) {
            return getA12_a22();
        } else if (attribName.equals("a12_a23_a33")) {
            return getA12_a23_a33();
        }
        return null;
    }

@Override
    public void set(String attribName, Object value) throws Exception {
        if (attribName.equals("a11")) {
            setA11((Integer) value);
        } else if (attribName.equals("a12_a22")) {
            setA12_a22((String) value);
        } else if (attribName.equals("a12_a23_a33")) {
            setA12_a23_a33((String) value);
        }
    } public int getA11() {
        return a11;
    }
    public void setA11(int a11) {
        this.a11 = a11;
    }
    public String getA12_a22() {
        return a12_a22;
    }
    public void setA12_a22(String a12_a22) {
        this.a12_a22 = a12_a22;
    }
    public String getA12_a23_a33() {
        return a12_a23_a33;
    }
    public void setA12_a23_a33(String a12_a23_a33) {
        this.a12_a23_a33 = a12_a23_a33;
    }

```
/**
 * Initializes objects and tests OCS functionality of the
 * ObjectContainer class.
 * @throws Exception
 */
void useOCS() throws Exception {

// Create an inter-connected object graph (referenced by obj1)
    // and initialize an ObjectContainer object with that
    // object graph.

Class3 obj3 = new Class3();
    obj3.setA31(31);
    obj3.setA32(32);
    obj3.setA33("String33");

Class2 obj2 = new Class2();
    obj2.setA21(21);
    obj2.setA22("String22");
    obj2.setA23(obj3);

Class1 obj1 = new Class1();
    obj1.setA11(11);
    obj1.setA12(obj2);
    ObjectContainer container1 = new ObjectContainer(obj1);

// Create and initialize an OutputClass object which
    // contains a pruned and flattened representation of the
    // object obj1 created above.

OutputClass outputObject = new OutputClass();
    outputObject.setA11((Integer) container1.getAttribValue
            ("a11"));
    outputObject.setA12_a22((String) container1.getAttribValue
            ("a12.a22"));
    outputObject.setA12_a23_a33((String)
            container1.getAttribValue("a12.a23.a33"));

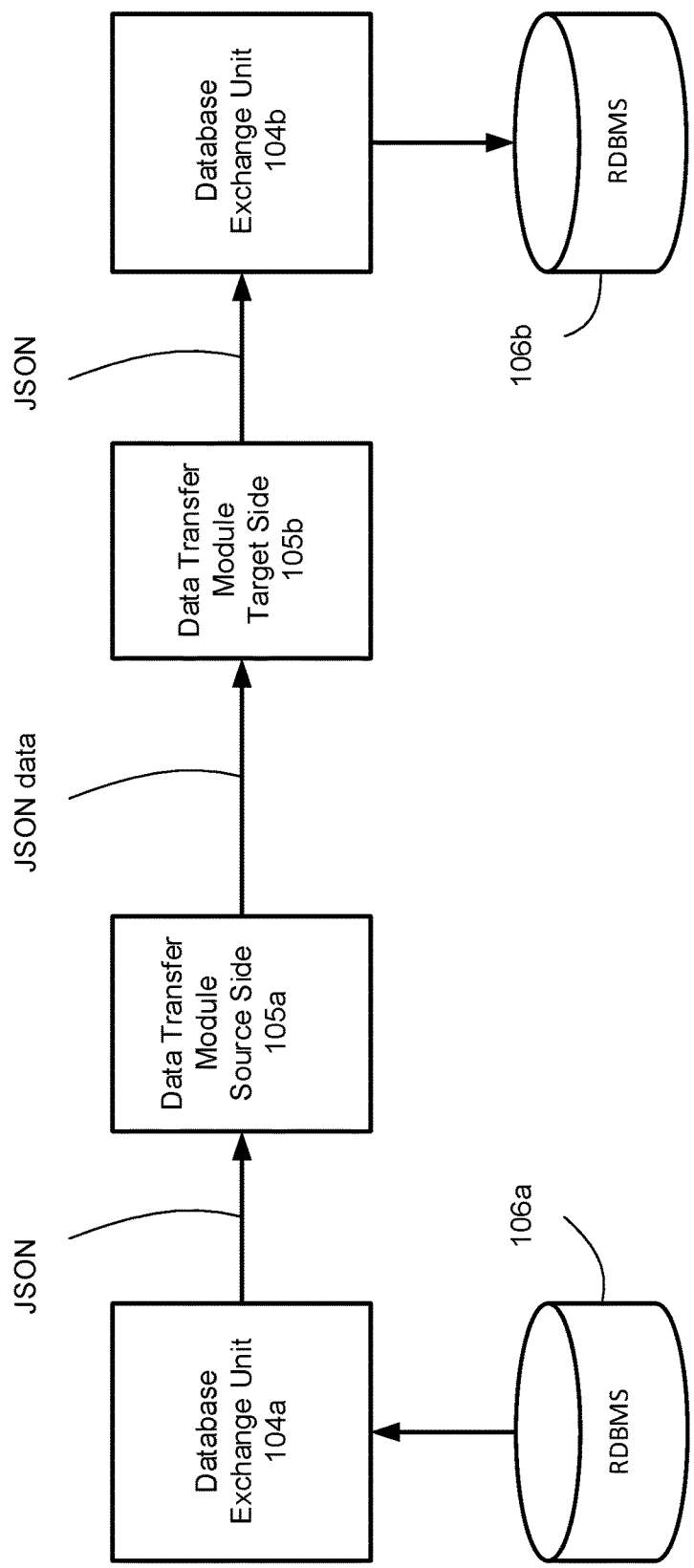

OBJECT MAPPING AND CONVERSION SYSTEM

BACKGROUND

Technical Field

The present invention relates generally to systems and methods for transferring data and commands between computing systems. In particular, the present invention relates to a system and a method of converting JavaScript Object Notation (JSON) objects and regular objects by mapping, pruning and flattening, and persisting such objects in relational systems.

Background Art

With the development and proliferation of computers of increasing performance capability, a number of different languages and programming paradigms have been developed. These languages and programming paradigms are used in conjunction with data that can be stored persistently in a variety of different ways. For example, options for persistent storage include relational databases, file systems and object-oriented databases.

Data is commonly stored in a relational format such as in tables of a relational database. This data is manipulated and maintained by a relational database management system (RDBMS). One particularly attractive attribute of such relational systems is that RDBMSs are able to persistently store data. Relational systems are persistent in the sense that the data is stored in a stable storage environment such that the data is accessible even after the application that created the original data stops executing. Furthermore, there are a number of applications and tools available for the manipulation and maintenance of such data in relational databases. Since relational databases have been in existence for many years, the use and proliferation of such applications and tools are widespread, and sophistication and capabilities of the tools are great.

However, a programming paradigm that has become more widespread is object-oriented programming (OOP). Object-oriented programs utilize objects that contain all the information needed to control and manipulate the objects' own data. Most new applications are being developed in an object-oriented way using object-oriented languages like Java, C#, and Swift. Such applications are easier to write, maintain, and evolve than the applications written in older non-object oriented languages like C because the object-oriented code is simpler and more intuitive. In these applications, a domain model class defines the structure and behavior of business domain entities. Business data is represented, manipulated, and stored through objects that are instances of these classes. Instances of these domain model classes are referred to as domain objects, domain model objects, business objects or regular objects in this specification.

It is very natural and desirable for application developers to represent the business objects in an object-oriented language like Java and at the same time use RDBMS for the persistent storage of those objects. One problem that existed in the art is that no systems and methods existed to bridge the gap between the programming paradigm used for object-oriented systems and the programming paradigm used for relational systems. There were no systems and methods for bridging the gap between the languages used for object-oriented systems such as Java and the languages used in relational systems such as SQL.

Furthermore, there was no easy method for specifying the mapping between such object-oriented systems and relational systems. Thus, to perform translation between these systems has required hand coding of the mapping between object-oriented systems and relational systems, and hand coding is tedious, time-consuming, error-prone and tends to be non-uniform. Therefore, there was a need for a system and method for automatically converting data and commands between object-oriented systems and relational systems.

The present inventor, Damodar D. Periwal, disclosed a system for automatically exchanging data and commands between an object-oriented system and an RDBMS in U.S. Pat. No. 6,163,776, issued Dec. 19, 2000, and assigned to Software Tree, Inc.

JavaScript Object Notation (JSON) is an emerging text format data representation standard. JSON has recently become a popular data interchange format because it is easy to read, write, and understand. The open standard and language-neutral data format of JSON objects makes them easily interchangeable and usable among applications written in different programming languages. An application dealing with JSON objects is typically developed in object-oriented programming language like Java, C#, and Swift. The application sometimes needs to store JSON objects in a persistent storage such that the object data is available in the future as per business needs. It is advantageous and desirable to use a relational database for such storage. A JSON object may be stored (persisted) as plain text in a file or database. However, automatically decomposing and storing its components in individual columns and rows of a database (RDBMS) such that they can be better queried and analyzed was not possible to do earlier without significant programming effort.

In some cases, available objects may be very large and complicated to support a broad range of potential applications. Some applications may require a small portion of the attributes of an object. The excess portion of large, complex objects may consume a lot of memory resources to store and lead to large latencies in loading and moving the objects as called for by the applications that use those objects.

To the extent the time and resources are used for portions of objects that are not required by an application, resources may be wasted, application performance may be degraded, and user experiences may be compromised. There is a need to prune and flatten such objects for more efficient use of resources. In case of a JSON object, storing the whole JSON object in a text format does not accomplish pruning and flattening of the original object which may be desirable in many circumstances.

A JSON object may be used better in an object oriented application if it can first be converted into a regular object, i.e., an instance of a domain model class. On the other hand, data of a regular object may be transferred and consumed more easily if it can first be converted into a JSON object. Pruning and flattening of data may sometimes be desirable when converting it from one representation to another. Conversion of data from one representation to another requires significant programming effort. Flattening of data entails writing complex programming code for traversing the desired branches of an object graph to get the needed data.

SUMMARY

An Object Relational Mapping (ORM) system converts, prunes and flattens JSON objects and objects that are instances of a non-JSON regular class in an object-oriented system, while persisting selected attributes of these objects in a relational system.

The ORM system converts data between an object-oriented system and a relational system having tables defining a relational model. The system includes at least one object class definition defining an object model. An ORM data structure defines a mapping between the object model and the relational model. The ORM data structure is produced from a declarative ORM specification based on an ORM grammar.

The ORM system also uses an object container encapsulating an object and a database exchange unit for converting data through the object container from the object model to the relational model and for converting data through the object container from the relational model to the object model using a reflection facility of a programming language.

An Object Conversion System (OCS) system converts, prunes and flattens JSON objects and objects that are instances of a non-JSON input class in an object-oriented system, to output objects; the OCS system comprising: at least one input object class definition defining an input object model and at least one output object class definition defining an output object model.

The OCS system includes an Object Conversion System (OCS) data structure defining a mapping between the input object model and the output object model, the OCS data structure being produced from a declarative OCS specification based on an OCS grammar.

The OCS system uses an object container encapsulating an input object of the input object model; and an object exchange unit for converting data through the object container from the input object model to the output object model.

The ORM and OCS systems provide ORM and OCS mappings for a subset of the attributes of JSON objects and domain model objects in an object-oriented system to prune the objects. The ORM and OCS systems provide a mechanism for flattening JSON object graphs and domain model object graphs in an object-oriented system.

DESCRIPTION OF THE DRAWINGS

FIGS. 1A-1B shows an embodiment of an Object Relational Mapping (ORM) Grammar.

FIG. 2 shows one embodiment of an ORM Specification for an object model consisting of various classes with collections, relationships and sequence generators.

FIG. 3 shows an embodiment of a table of components of an Object Relational Mapping (ORM) data structure.

FIG. 12 is one embodiment of a table of the structure and semantics of JSON Object data returned by openweathermap.org.

FIG. 13 is an embodiment of a JSON object data for New York weather returned by weather service openweathermap.org.

FIG. 14 is an embodiment of a declarative ORM Specification for attributes of weather JSON object with some of the mapping statements involving path expressions.

FIG. 15 is an embodiment of a flattened version of the JSON object data of FIG. 12.

FIG. 21 is an example of an Object Conversion System (OCS) Grammar in a BNF like format.

FIG. 22 is a table of components of OCS data structure.

FIGS. 37A-37B shows an embodiment of Java source code for an EnhancedJSONObject class.

FIGS. 38A-38B shows an embodiment of Java source code for a JSONObjectContainer class.

FIGS. 39A, 39B and 39C show another embodiment of Java source code for a JSONObjectContainer class.

FIG. 40 shows shows an embodiment of Java source code for the class JSON_Weather.

FIG. 41 shows an embodiment of Java source code for the interface GetSet.

FIGS. 42A-42B show an embodiment of Java source code for the ObjectContainer class.

FIG. 43 shows an embodiment of Java source code for the class Class1 implementing the GetSet interface.

FIG. 44 shows an embodiment of Java source code for the class Class2 implementing the GetSet interface.

FIG. 45 shows an embodiment of Java source code for the class Class3 implementing the GetSet interface.

FIG. 46 shows an embodiment of Java source code for the class OutputClass implementing the GetSet interface.

FIG. 47 shows an embodiment of Java source code for the method useOCS.

FIG. 48 shows an embodiment of data transfer from a source relational database to a target relational database.

DETAILED DESCRIPTION

Figure 4:
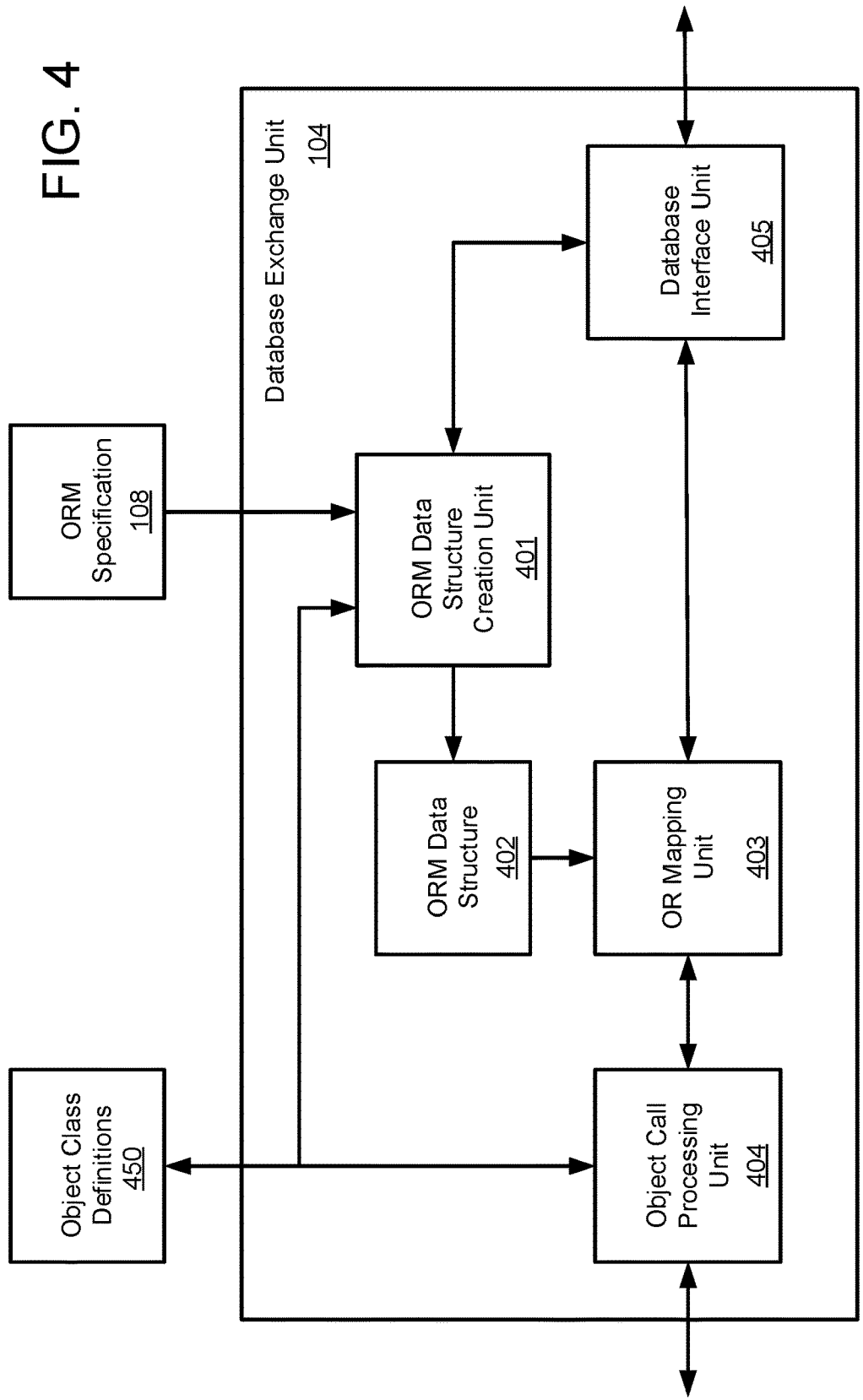
FIG. 4 is a block diagram of one embodiment of a database exchange unit.

Various examples of embodiments are described below with reference to the drawings. The following exemplary embodiments are illustrative and are not to be construed as limiting.

Relational Systems

Relational Systems persist (store) data in tables. A Relational System usually contains many relationships among tables. Relational Systems are generally represented in Relational Database Management Systems (RDBMS). The terms "Relational System", "Relational Database", and "Relational Database Management System (RDBMS)" are used interchangeably.

Relational databases are generally represented by tables with rows and columns of data. Each database column represents a type of data value of a particular database table. Each database row represents a particular record (tuple). For example, the Employee table of a database can have rows representing employees (e.g., Mark Smith, John Doe, and Mary Carter) and columns representing data associated with each employee (e.g., EmployeeId, Name, DateOfBirth, DepartmentId).

Primary Keys represent identifiers for each row in a database table and must be unique from other rows. For example, a primary key for an employee might be his/her employee id or social security number. Foreign Keys represent identifiers that refer to the columns or set of columns in another related table.

Relational Systems are mature technology that is widely used for reliable data storage in numerous commercial and open-source systems. Examples of Relational Systems include Oracle, DB2, SQL Server, MySQL, Sybase, Ingres, and SQLite. There is a large pool of people that are trained and experienced in using RDBMS systems.

Object-Oriented Systems

Object-oriented systems are organized differently than Relational Systems. Object-oriented Systems are composed of Objects and Classes defining those Objects. Objects have data (attributes) and do things in certain ways (behaviors). A system may include multiple types (Classes) of Objects, some of which may be related to each other. Objects may have hierarchal relationships with other objects.

A Class is a template of Objects. A Class defines the Attributes (also known as fields, properties, or members) and behavior (also known as methods) of its Objects. An Attribute describes a state (data) of a Class Object. A Class may be associated with other Classes. Inheritance allows for the creation of a new Class with new Attributes and behavior in addition to the Attributes and behavior of an existing Class.

A Class usually represents a person, place, thing, concept or event that is ordinarily identifiable in the real world (e.g., Employee, Department, etc.). A Class is a template (or blueprint) used to create Objects of that Class. Attributes represent an Object's state (e.g., name and date of birth of an Employee Object). All Objects of a given Class are similar.

An Object is an instance of a Class. An Object contains Attributes that represent the state (data) for that Object. An Object contains all the information (Attributes and behavior) needed for its manipulation. An Object represents a specific person, place, thing, concept or event that is ordinarily identifiable in the real world (e.g., employee Mark Smith). A specific employee Object (e.g., Mark Smith), is an Instance of the Class Employee.

Object-oriented systems utilize Objects that contain all the information needed to control and manipulate the Objects' own data. Object-oriented systems facilitate intuitive modeling of real-world Objects. Object-oriented systems promote the reusability of concepts and code through the use of modular Objects and inheritance of Attributes and behavior from other Objects. Object-Oriented Systems are often easier to develop, understand, and maintain that more traditional software systems. Object-Oriented Systems are usually developed using Object-Oriented Programming (OOP) languages.

Object Relational Mapping (ORM) Systems

Because of the maturity of RDBMS technology, many organizations want to use relational systems to persistently store data from their object-oriented applications. However, the relational model consists of tables, columns, rows, and various integrity constraints like primary and foreign keys. The relational model is different from the object model which uses classes, fields, objects, associations, aggregations, and class hierarchies.

Bridging the gap between object-oriented languages (e.g., Java, C#, C++, and Swift) and relational languages (e.g., SQL and SQL*PLUS) is unintuitive and tedious due to the significant differences in syntax and semantics. There is an inherent mismatch between the relational and the object models. To convert data between an object-oriented application and a relational database can be tedious, time-consuming, and error-prone. The task often involves writing low-level programming code using the SQL language. The resulting program containing both object-oriented code and SQL statements can become verbose and bloated, making development and maintenance costly and complex. The complexity of such programs may lock an organization into a vendor and product.

A class of technology, called Object Relational Mapping (ORM), has evolved to bridge the gap between object models and relational models. U.S. Pat. No. 6,163,776, issued Dec. 19, 2000, and assigned to Software Tree, Inc. (which was subsequently converted into Software Tree, LLC) is expressly incorporated herein by reference. U.S. Pat. No. 6,163,776 discloses a system for automatically exchanging data and commands between an object-oriented system and a relational database management system (RDBMS).

An ORM system such as JDX™ or JDXA™ software from Software Tree, LLC, of Campbell, Calif., simplifies the integration of object-oriented programs with relational databases by providing a more intuitive interface between object-oriented systems and relational systems. It avoids the need to write and maintain large amounts of complex low-level programming code which can be time consuming, tedious, and error-prone. Some embodiments described herein provide a declarative way of defining mapping between object classes and relational tables. Application Programming Interfaces (APIs) may be used by application developers to easily store, update, delete, and retrieve object data from relational databases. An ORM system may use the reflection facility of the underlying language to inspect class structures, to instantiate objects, and to get and set the values of object attributes using accessor methods described herein.

An ORM Grammar is an extensible set of rules, including syntax, for textually describing a mapping between an object-oriented system and a relational system in a declarative way.

An ORM Specification is a textual specification that is based on the ORM Grammar and includes information for defining a mapping between an object-oriented system and a relational system.

There are many advantages of defining a mapping specification textually in a declarative way instead of in a programmatic way or in a graphical way. Any text editor can be used to create a declarative specification. It is often easier to write, comprehend, and modify than program code. Even a non-programmer, e.g., a business person, can write and understand a declarative specification because it does not involve writing or modifying programmatically executable statements. A declarative mapping specification may also be shared easily.

An ORM Data Structure is an in-memory data structure that is based, in part, on an ORM Specification, and contains information about an object-relational mapping. The terms ORM data structure, ORM data structures, ORM Data Structure, and ORM Data Structures are used interchangeably.

A Database Interface Unit is a unit used to retrieve and store data, including metadata, in the relational database. Database drivers following JDBC or ODBC standards specifications may be used for a Database Interface Unit.

An ORM Data Structure Creation Unit generates the ORM Data Structure using an ORM Specification. In one embodiment, the ORM Data Structure Creation Unit parses the ORM Specification as per the ORM Grammar specified and builds the ORM Data Structure.

An object-relational (OR) Mapping Unit is a unit for performing the object-relational mapping using the ORM Data Structure, user objects based on Object Class Definitions, and relational data from the Database Interface Unit.

In an alternative embodiment, a Mapping Code Generation Unit generates the code for the Mapping Unit based on the ORM Data Structure, or directly from the declarative ORM specification, to perform the mapping functions as described herein. Because this is based on a declarative ORM specification, it has many of the advantages of the preferred embodiment. In some embodiments, automatic code generation by the Mapping Code Generation Unit provides a ORM Mapping Unit with higher performance than a standard unit dependent on an ORM Data Structure.

An Object Call Processing Unit intercepts Application Programming Interface (API) level calls for object manipulation (e.g., query, insert, update, delete etc.) and executes the calls using the OR Mapping Unit.

A Database Exchange Unit is a unit that automatically converts data between the object model and the relational model using the ORM Data Structure. A Database Exchange Unit operates to translate data from the object model to the relational model, and vice versa, in accordance with the ORM specification. The Database Exchange Unit preferably comprises an Object Call Processing Unit, an ORM Data Structure Creation Unit, an OR Mapping Unit, a Database Interface Unit, and an ORM Data Structure.

The declarative ORM Specification provides operational rules for the Database Exchange Unit.

FIGS. 1A and 1B show one embodiment of an ORM Grammar.

In one embodiment, the ORM Grammar is based on a Backus normal form (BNF) format. However, variations and alternatives to that format may be used.

The ORM-INFO settings are used to provide details on the source of the ORM mapping information and some operational parameters for the OR-Mapping engine.

The ORMId keyword denotes the Object Relational Mapping id of a mapping specification. The default ORMId is the string "defaultORMId".

An ORMFile keyword is used to specify the OR-Mapping information for all the persistent classes belonging to the application domain. The <filename> could be an absolute path, or a path relative to where the application or app server has started.

A DBTYPE keyword is used to specify a DATABASE-TYPE that indicates the type of backend database that is used. In some embodiments, the values may be one of the following: SQLITE, SQL2000, MSACCESS, SYBASE, INFORMIX, ORACLE12, ORACL, IBMDB2, INTERBASE, HARMONIA, JBMS, CLOUDSCAPE, DERBY, INGRES, POINTBASE, JDATASTORE, MYSQL, DAFFODILDB, and GENERIC. The ORM system uses this information during schema generation to generate appropriate database definition language (DDL) statements for the backend database.

A JDBC_DRIVER keyword specifies the JDBC driver to be loaded by the ORM system. The system uses org.sqldroid.SQLDroidDriver as the default JDBC driver for the Android platform.

A DATABASE keyword is used to specify the uniform resource locator (URL), which includes database name, user name and password) of the database to be connected to, optionally followed by ORM specific information.

<ENDDATABASE-SPEC> is a delimiter to mark the end of <DATABASE-SPEC>.

A <DATABASE-SPEC> specifies the database and the JDBC driver related information to be used by the ORM system.

A <PRIMARY-KEY-SPEC> identifies the attribute names whose combined values uniquely identify a particular object. For a collection object, it specifies the attributes whose values are the same for all the objects in the collection. A couple of examples of <PRIMARY-KEY-SPEC> follow:

PRIMARY_KEY pub_id
PRIMARY_KEY title_id lorange

The first primary key specification defines a primary key with one attribute—pub_id. The second primary key specification defines a primary key with two attributes—title_id and lorange.

A <REFERENCE-KEY-SPEC> identifies the attribute names whose combined values uniquely identify a particular object. This may be an alternate way of identifying objects of a particular class. A <REFERENCE-KEY-SPEC> is not allowed for collection classes.

An <IMPLICIT-ATTRIB-SPEC> identifies a primitive attribute whose value should implicitly be initialized by the ORM system with the value of a corresponding primitive attribute of a related object based on a defined RELATIONSHIP. This is helpful if the application developer does not want to worry about explicitly initializing the "primary or foreign key" attribute values. <attribType> could be any of the following primitive types: char, boolean, byte, short, int, long, float, double, java.lang.String, java.lang.Character, java.lang.Boolean, java.lang.Byte, java.lang.Short, java.lang. Integer, java.lang. Long, java.lang. Float, java.lang. Double, java.math.BigInteger, java.math.BigDecimal, java.util.Date, java.sql.Date, java.sql.Time, java.sql.Timestamp. The <attribType> should match the type of the <attribName> attribute in the actual class definition.

After specifying an attribute as IMPLICT_ATTRIB, if it is used in a RELATIONSHIP specification in the same class or in a related class, the ORM system automatically deduces the initialization strategy of this implicit attribute from the value of the corresponding attribute of the related object.

A <VIRTUAL-ATTRIB-SPEC> identifies an entity (virtual attribute) that may not be explicitly defined as an attribute in the class. By default, the ORM system tries to use set <AttribName>, get <AttribName> methods for these attributes. However, if these methods are not defined, the ORM system uses the following methods to get and set the values of such virtual attributes:

Object getAttribValue (String attribName) void setAttribValue(String attribName, Object value)

<attribType> could be any of the following primitive java types: char, boolean, byte, short, int, long, float, double, java.lang.String, java.lang.Character, java.lang.Boolean, java.lang.Byte, java.lang.Short, java.lang.Integer, java.lang.Long, java.lang.Float, java.lang.Double, java.math.BigInteger, java.math.BigDecimal, java.util.Date, java.sql.Date, java.sql.Time, java.sql.Timestamp.

Virtual Attributes may be used to specify the primary key (in <PRIMARY-KEY-SPEC>).

Virtual attributes can participate in a RELATIONSHIP specification.

An <attribName> involving a path expression can be used to identify a nested attribute of a related class. For example, if a class A1 references another class A2 with its attribute a12 and if A2 references another class A2 with its attribute a23 and if the class A3 has an Integer attribute a33 then the mapping for the nested attribute a33 in the context of class A1 may be defined using a path expression (a12.a23.a33) as follows:

VIRTUAL_ATTRIB a12.a23.a33 ATTRIB_TYPE int
SQLMAP FOR a12.a23.a33 COLUMN_NAME A33

A <VIRTUAL-COMLEXATTRIB-SPEC> identifies a complex (non-primitive) entity (virtual complex attribute) that may not be explicitly defined as an attribute in the class. By default, the ORM system tries to use set <AttribName>, get <AttribName> methods for these attributes. However, if these methods are not defined, the ORM system uses the following methods to get and set the values of such virtual complex attributes:

Object getAttribValue (String attribName)
void setAttribValue(String attribName, Object value)

<attribType> could be a name of another mapped class. For example, one can specify a mapping for a non-primitive attribute a12 of type ClassA2 as follows:

VIRTUAL_COMPLEXATTRIB a12 ATTRIB_TYPE ClassA2

Through <SQLMAP-SPEC>, one can refine the mapping of a class attribute to SQL column in one of the following ways—use a column name different from the attribute name, use an SQL data type different from the default SQL data type for the attribute type, allow the column to be nullable, and specify a column to be an auto initialized column such that its value is automatically initialized by the database when a new record is inserted.

Allowing mapping of an attribute name to a different column name may be handy if the existing column name is cryptic and we want a more meaningful attribute name at the class definition level. Semantic knowledge of the data may be used to improve the storage efficiency for an attribute by specifying a more refined SQL type. For example, a String attribute (zipCode) may be mapped to varchar (10) instead of default varchar (255). A multi-word <sqlType> may be specified in a pair of single quotes. An auto initialized column (for example, AUTOINCREMENT column in SQLite database) may be used to create unique primary keys automatically when a new row is inserted in the table.

Use dot notation (<complexAttribName>.<attribName>) to define SQLMAP for an 'inline'ed attribute. Here are some examples of <SQLMAP-SPEC>:

SQLMAP FOR prInfo COLUMN_NAME pr_info SQLTYPE text
SQLMAP FOR zip SQLTYPE varchar(10)
SQLMAP FOR pic SQLTYPE 'BLOB SUB_TYPE 1' NULLABLE
SQLMAP FOR addr.address1 COLUMN_NAME addr1
SQLMAP FOR id SQLTYPE 'INTEGER PRIMARY KEY AUTOINCREMENT'

Through <RDBMS-GENERATED-ATTRIBS-SPEC>, one can list those class attributes whose corresponding column values are automatically generated and set by the underlying database system. Examples of such columns could be IDENTITY columns in SQL Server, or AUTOINCREMENT columns in SQLite or columns initialized by a named sequence in Oracle. the ORM system does not include such columns in the INSERT and UPDATE statements generated for storing or updating the instances of the containing class. However, the query operations do fetch these attribute values.

By default, the ORM system treats all those attributes, which are neither static, nor transient, nor volatile to be persistent. However, by using <IGNORE-ATTRIBS-SPEC>, you can override that by explicitly specifying a list of 'regular' attributes that the ORM system should ignore for persistence. This may be helpful in situations where you don't want an attribute to be stored in the database but do want it to be serialized in case you are transferring the containing object to another subset. In the following example of <IGNORE-ATTRIBS-SPEC>, the three attributes a, b, and c will be ignored by the ORM system for persistence IGNORE a b c <RELATIONSHIP-SPEC> is used to provide details for a complex attribute. Every non-transient, non-ignored complex attribute must have a <RELATIONSHIP-SPEC> defined.

A Non-embedded complex attribute references a regular class or a collection class identified by <targetClassName>. If <targetClassName> is prepended with a '!' (an exclamation mark), the ORM system will not check for the equality of the attribute class name and the referenced class name. This is like casting the runtime data type for the attribute and is handy if an attribute type is defined as an interface but the actual runtime instance of the attribute would be of a different object class.

EMBEDDED keyword means that the value of a complex attribute is embedded in a large binary column of the same table where the rest of the primitive attributes are stored. This may be an optimized way for storing a referenced object if that referenced object does not need to be retrieved in any other context.

INLINE keyword means that the attributes of a contained object (referenced by the complex attribute) can be stored in the columns of the same table to which the containing class is mapped. This does not require the use of foreign key attributes. However, you must initialize the corresponding complex attribute with the default (no arguments) constructor of the contained class in the default constructor (no arguments) of the containing class. You can also specify <SQLMAP-SPEC> for these 'inline'ed attributes by using their name with dot notation (<complexAttribName>.<attribName>).

BYVALUE keyword implies that the referenced object (may be a collection object) does not have an independent existence without the existence of the containing object. When a containing object is stored, all the objects referenced through its BYVALUE complex attributes are also stored in the database. If a containing object is deleted, its BYVALUE referenced objects should also be deleted.

<referencedKeyName> specifies the name of a reference key of the class <targetClassName>. By default, referencing is done to the PrimaryKey of the target class.

The list of <attribName> is an ordered enumeration of the source attributes in the current class, which are used to find the target class objects through the referenced key. The data types of the source attributes should be compatible with the data types of the attributes defining the reference key in the target class.

INVERSE keyword specifies that this particular relationship is an inverse reference from a complex attribute of the defining (target) class to an owning class. The owning class cannot be a collection. However, the target class object may be a single object or a collection. A relationship for an owning complex attribute <owningAttribName> from the owning class to the target class has to be defined. If such an INVERSE specification is defined, the ORM system will automatically initialize the inverse reference from the referenced target object(s) to the owning object during any query. For insert, update, and delete operations, the INVERSE relationships are not followed to avoid unnecessary operations and potentially infinite loops. Following are some examples of <RELATIONSHIP-SPEC>:

---

RELATIONSHIP titles REFERENCES ArrayTitle BYVALUE WITH pub_id
RELATIONSHIP job REFERENCES Job REFERENCED_KEY PrimaryKey WITH job_id
RELATIONSHIP pet REFERENCES !PetRoot WITH petId
RELATIONSHIP pubInfo REFERENECES PubInfo INLINE

---

Here, the first specification means that the complex attribute 'titles' references an object of type ArrayTitle (which is a collection (array) of Title objects). The referenced object is contained in the current object by value. The attribute pub_id of the containing class is used to identify the (default primary key of the) referenced object.

The second example specifies that the complex attribute 'job' references an object of class 'Job' with the referencing object's attribute 'job_id' which should match the primary key attribute of the class 'Job'.

In the third example, the 'pet' attribute is of interface type Pet. PetRoot is a base class for the actual runtime objects which implement 'Pet' interface.

In the fourth example, the attributes of the contained object pubInfo (class PubInfo) will be stored in the same table as the one used for the attributes of the containing (parent) class.

A <CLASS-SPEC> encapsulates all the Object-Relational Mapping information about one class. The className may include a package name. For JSON objects, the class may be a subclass of JSONObjectContainer class and the mapping for the relevant JSON attributes may be defined using <VIRTUAL-ATTRIB-SPEC>.

The <tableName> specifies the name of the relational table, which holds the instances of this class. The default <tableName> is the same as the <className>. Other specifications have been explained earlier.

It is mandatory to specify <PRIMARY-KEY-SPEC> for a class.

An <ORDERBY-SPEC> of a <COLLECTION-CLASS-SPEC> specifies an ordered list of attributes whose values are used to sequence the objects in a collection during retrieval. ORDERBY_DESC keyword means that descending values should do the ordering.

A <COLLECTION-CLASS-SPEC> encapsulates all the Object-Relational Mapping information about a collection class. A collection is actually a pseudo-class; there may not be an actual class by that name in the program.

The COLLECTION_TYPE specifies how the objects in the collection are combined together—in an array, in a vector, or in a Java collection like ArrayList.

Any complex attribute with a RELATIONSHIP to a collection class of type JAVACOLLECTION, its class must implement it.

The <elementClassName> specifies the class whose instances form the collection. Even the instances of a subclass of the <elementClassName> class may participate in a collection.

The mandatory <PRIMARY-KEY-SPEC> specifies the attributes which are the basis for realizing a collection. The values of these attributes are the same for all the objects in a collection.

The <elementTableName> specifies the name of the relational table, which holds the instances of the collection objects. The default table is the same as the table for <elementClassName> class. Here is an example of <COLLECTION-CLASS-SPEC>:

COLLECTION_CLASS ArrayRoySched COLLECTION_TYPE ARRAY ELEMENT_CLASS RoySched
PRIMARY_KEY title_id
ORDERBY royalty
;

In the above example, an ARRAY collection of the instances of class RoySched is being defined. The instances will be retrieved in the order of the value for the attribute royalty.

A <SEQUENCE-SPEC> defines a sequencer, which can provide chunks of persistently unique sequence numbers.

<maxIncrementValue> is used to do sanity-check against requests which may erroneously ask for a large chunk of sequences which may quickly reduce the availability of new sequence numbers.

Optional <startVal> specifies the starting sequence number provided through this sequencer. The default is 1.

A sequencer should be initialized in the metadata tables before being used in a program.

The seqencer mechanism is a different and more efficient way of generating unique (primary) keys than the feature of autoincrement columns provided by some databases. Here are some examples of <SEQUENCE-SPEC>:

SEQUENCE seqFoo MAX_INCREMENT 100
SEQUENCE seqBar MAX_INCREMENT 1000 START_WITH 10001

A <REMARK-SPEC> is used to provide a remark or comment in an ORM Specification. Any line starting with REM or "ll" is considered a remark (comment) line and it is ignored. For example:

REM this is a comment
// This is another comment

<ORM-SPEC> denotes an Object-Relational Mapping specification (or ORM Specification) and consists of <DATABASE-SPEC> followed by any combination of <CLASS-SPEC>, <COLLECTION-CLASS-SPEC>, <SEQUENCE-SPEC> and <REMARK-SPEC>. This is what an <ORMFile> contains.

FIG. 2 shows one embodiment of an ORM Specification for an object model consisting of various classes with collections, relationships and sequence generators. The text is indented for better readability.

FIG. 3 is a table that describes one embodiment of an ORM data structure. The ORM data structure stores information about object relational mapping in an ORM System.

In some embodiments, the ORM data structure includes column information, table information, attribute information, complex attribute information, virtual attribute information, virtual complex attribute information, reference and primary key information, class information, collection class information, and database information.

ColumnInfo for a particular column of a table in a relational system includes information such as the name of that column, and the SQL type for that column.

TableInfo for a particular table in a relational system includes the table name and a list including each columnInfo associated with the columns in that table.

AttribInfo for a particular attribute in an object system includes the name and type of a class attribute.

VirtualAttribInfo for a particular virtual attribute includes its name and type.

ComplexAttribInfo for a particular complex attribute includes information about the referenced object, or collection of objects, the referencing attributes, and the containment of the referenced object.

VirtualComplextAttribInfo, similar to ComplexAttribInfo, includes information about a complex virtual attribute.

ReferenceKeyInfo includes information about the primary and reference keys of a class.

ClassInfo for a particular class includes the className, TableInfo reference, AttribInfo list, VirtualAttribInfo list, ComplexAttribInfo list, and VirtualComplexAttribInfo list, and ReferenceKeyInfo list for that class.

CollectionClassInfo includes ClassInfo information, collection types, containment type, and order by attributes.

DatabaseInfo includes uniform resource locator (url), object relational mapping ID, ClassInfo list, TableInfo list, and list of database connections.

The ORM Data Structure is created by an ORM Data Structure Creation Unit using an ORM Specification describing object relational mapping. The ORM Specification is parsed as per the ORM Grammar and each construct of the ORM Grammar is used to create the ORM Data Structure. For example, each <CLASS-SPEC> creates an instance of ClassInfo. Each <COLLECTION-CLASS-SPEC> creates an instance of CollectionClassInfo. The reflection facility of the language may be used to create the instances of AttribInfo. An <IGNORE-ATTRIBS-SPEC> is used to ignore the mappings for specified attributes. <PRIMARY-KEY-SPEC> and <REFERENCE-KEY-SPEC> are used to create instances of ReferenceKeyInfo. A <RELATIONSHIP-SPEC> is used to create instances of ComplexAttribInfo. A <VIRTUAL-ATTRIB-SPEC> creates an instance of VirtualAttribInfo. A <VIRTUAL-COMPLEX-ATTRIB-SPEC> creates an instance of VirtualComplexAttribInfo. Default instances of ColumnInfo may be created corresponding to the instances of AttribInfo or VirtualAttribInfo. A <SQLMAP-SPEC> may override the default information in a ColumnInfo instance.

Once the internal data structures have been built using data from the ORM Specification, each class is fully understood in terms of its different components and how they can be stored and retrieved using the Object Class Definitions. An ORM system may use an ORM data structure to create a relational schema (e.g., tables and constraints) to persist mapped data in an RDBMS.

FIG. 4 is one embodiment of a Database Exchange Unit 104.

An ORM Data Structure Creation Unit 401 receives the ORM specification 108 and generates ORM data structure 402.

An Object Call Processing Unit 404 processes object calls from applications by communicating with the OR Mapping unit 403. The OR Mapping unit 403 uses the ORM data structure 402 to communicate with the target objects using object class definitions 450 and with the database through a Database Interface Unit 405.

Figure 5:
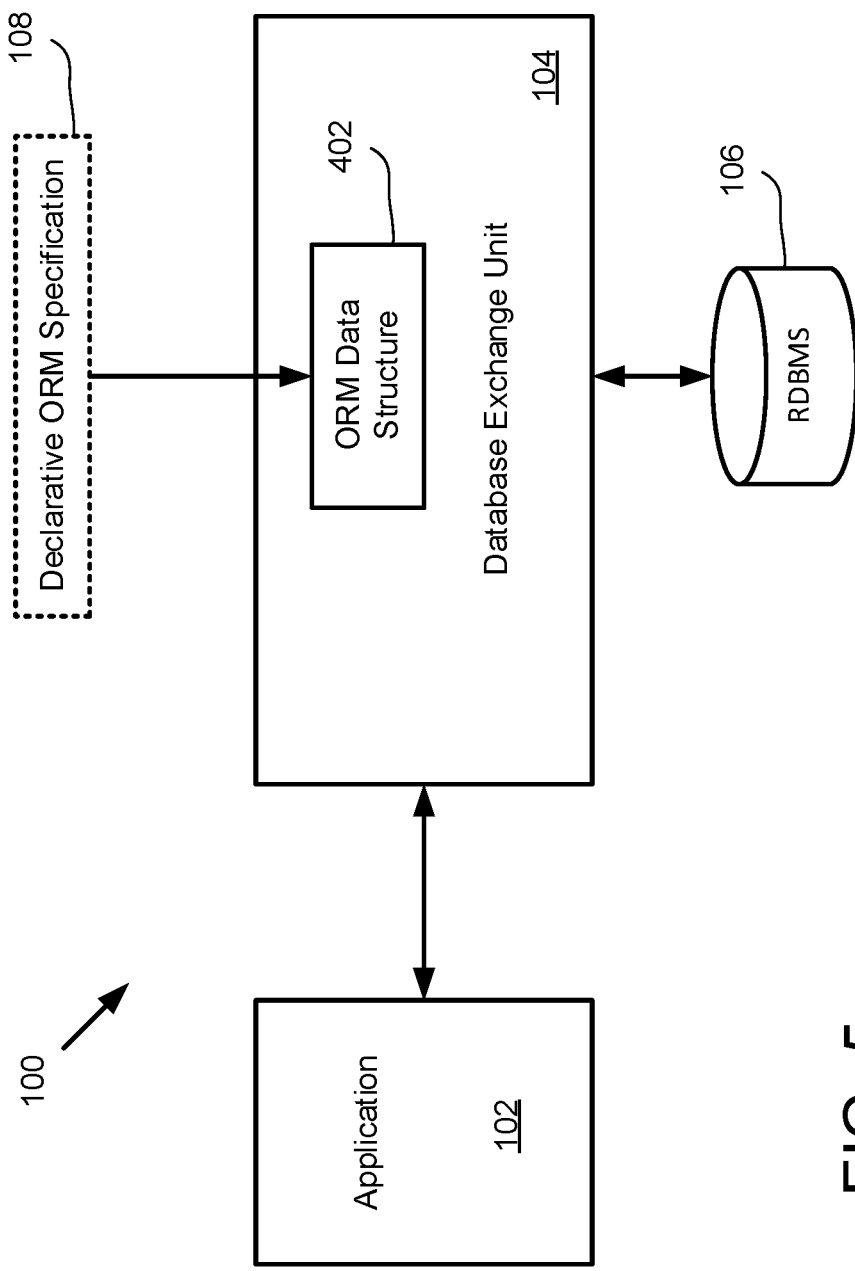
FIG. 5 is one embodiment of an ORM System using an ORM Data Structure produced from a declarative ORM Specification and interacting with an Application and an RDBMS.

FIG. 5 is a block diagram of an ORM System having a database exchange unit 104 using an ORM Data Structure 402 produced from a declarative ORM Specification 108 and interacting with an Application 102 to exchange data with a RDBMS 106.

Figure 6:
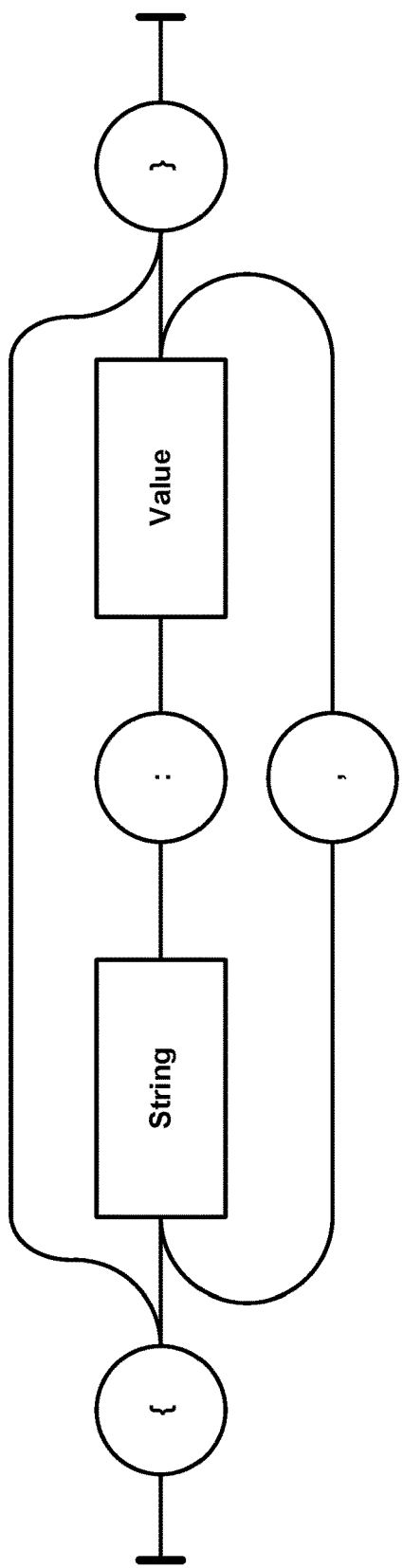
FIG. 6 is a diagram of a syntax of a JavaScript Object Notation (JSON) object.

FIG. 6 illustrates the format of a JavaScript object notation (JSON) object.

A JSON object is an unordered set of name-value pairs. An object begins with a left brace ("{") and ends with a right brace ("}"). A colon is placed between each name in string format, and the corresponding value for each of the name-value pairs. Each name-value pair is separated by a comma. The name-value pairs of a JSON object are attributes. Types of values include, but are not limited to, numbers, arrays, strings, booleans, objects and null values.

Figure 7:
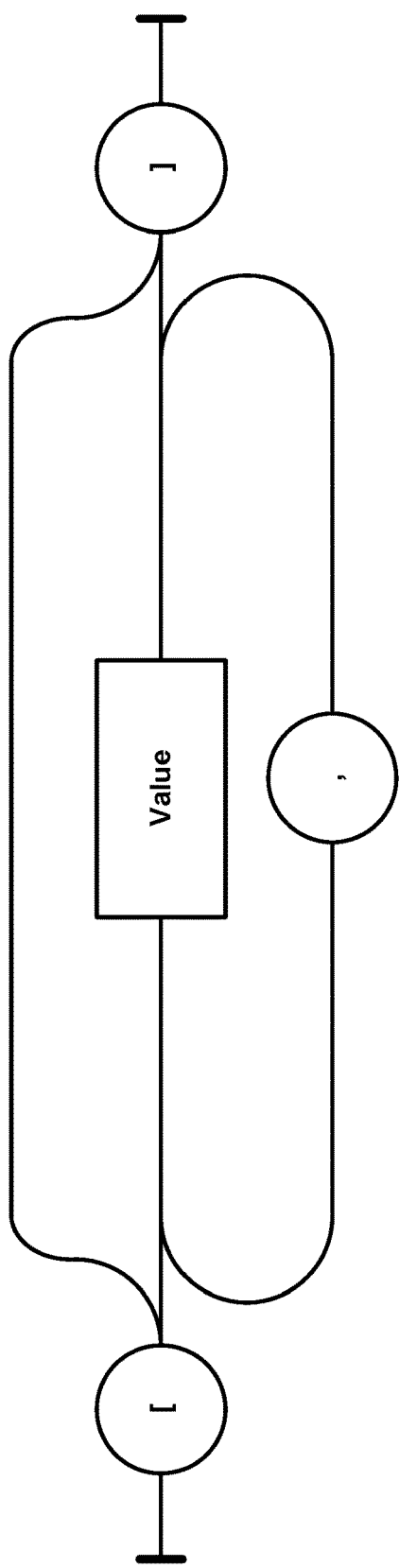
FIG. 7 is a diagram of a syntax of a JSON array.

FIG. 7 illustrates a format for a JSON array where a sequence of values are seperated by a comma and enclosed between a left and right bracket.

Figure 8:
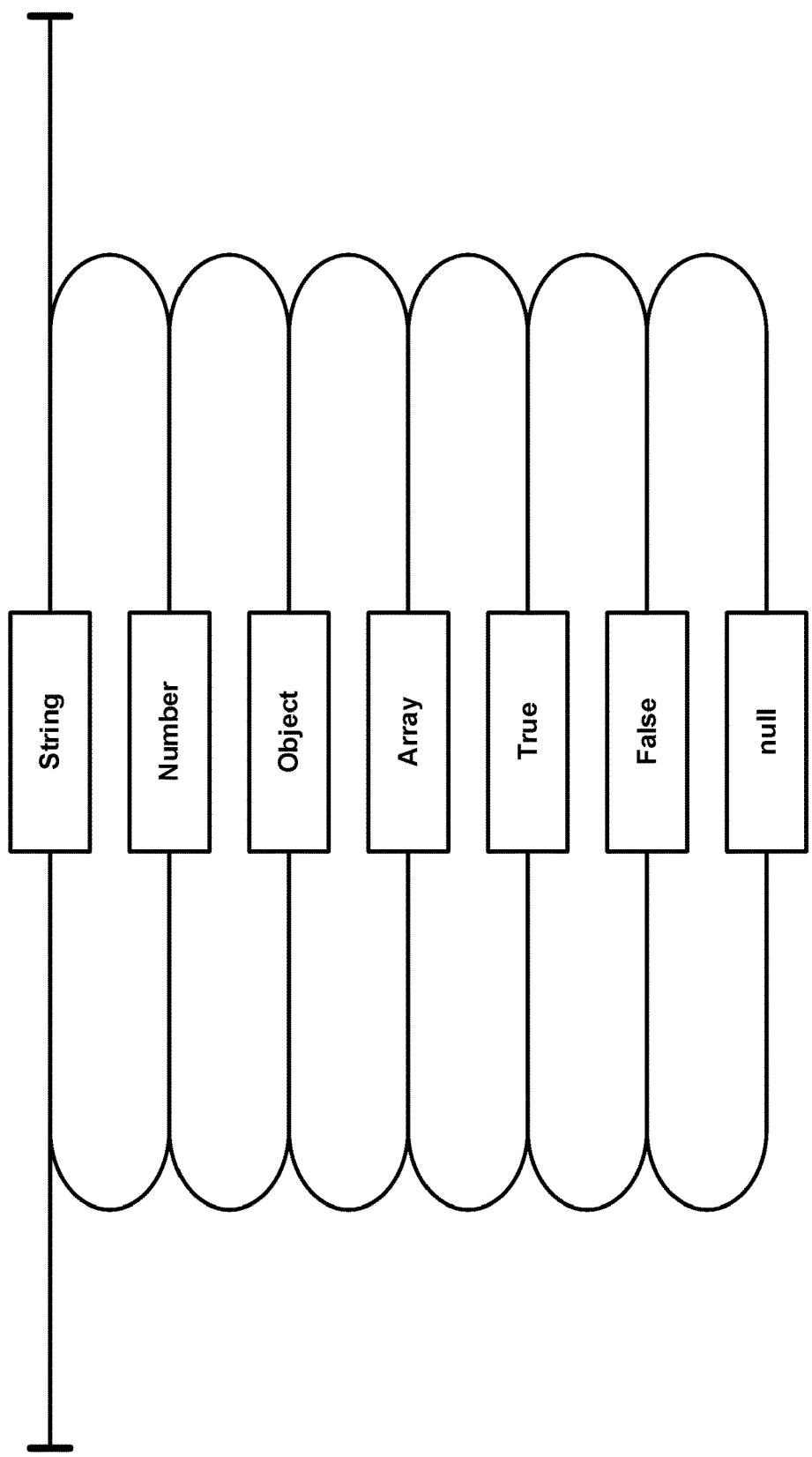
FIG. 8 is a diagram of a syntax of a JSON value.

FIG. 8 illustrates a format for a JSON value where the value may be a string, number, object, array, a true or false boolean, or a null.

Figure 9:
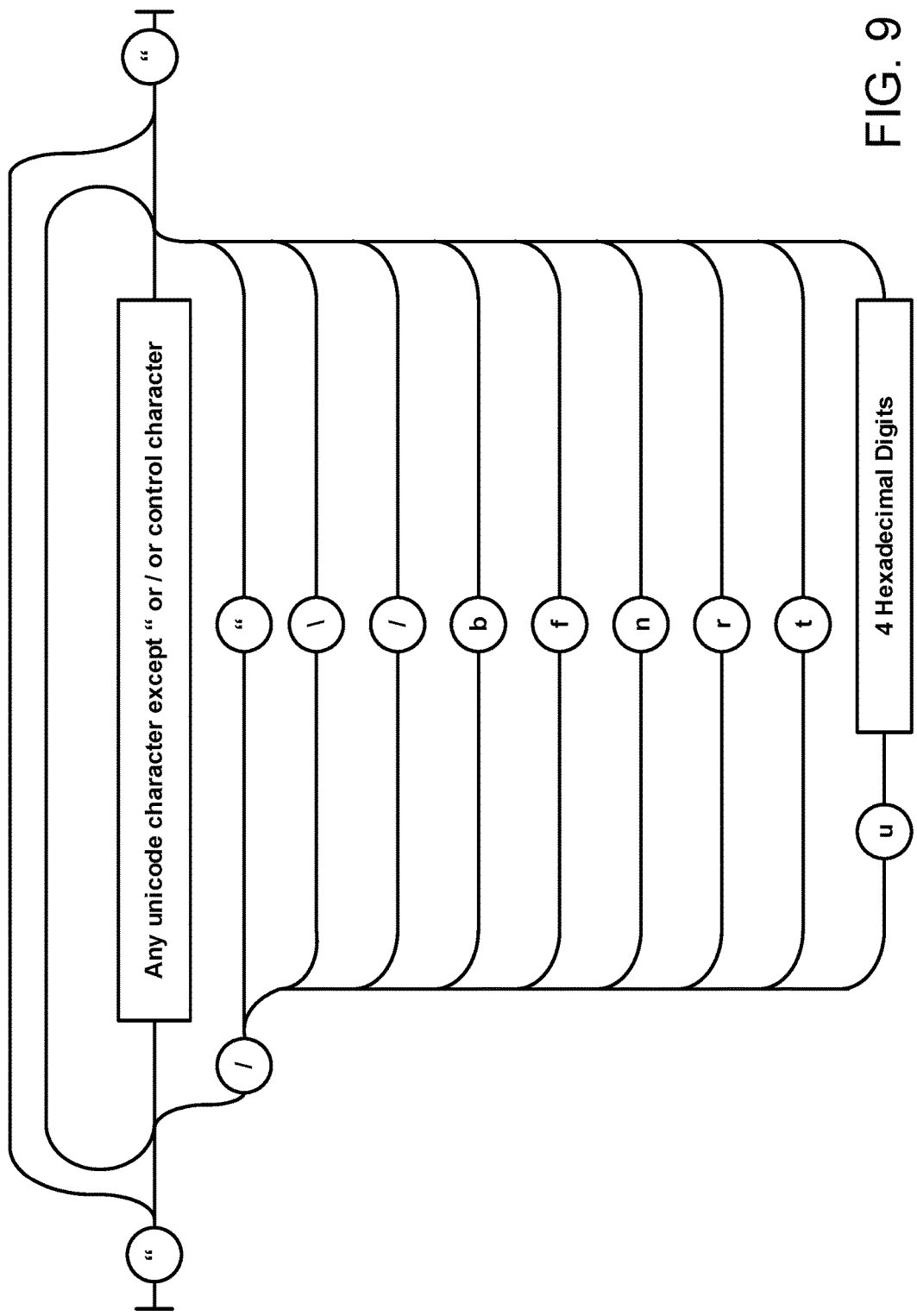
FIG. 9 is a diagram of a syntax of a JSON string.

FIG. 9 illustrates a format for a JSON string enclosed between quotation marks. An escape character ("\") is used to insert a following control character within the quotation marks. The control character may include a quotation mark, reverse solidus, solidus, backspace, formfeed, newline, carriage return, horizontal tab, and the character associated with a four digit hexadecimal code.

Figure 10:
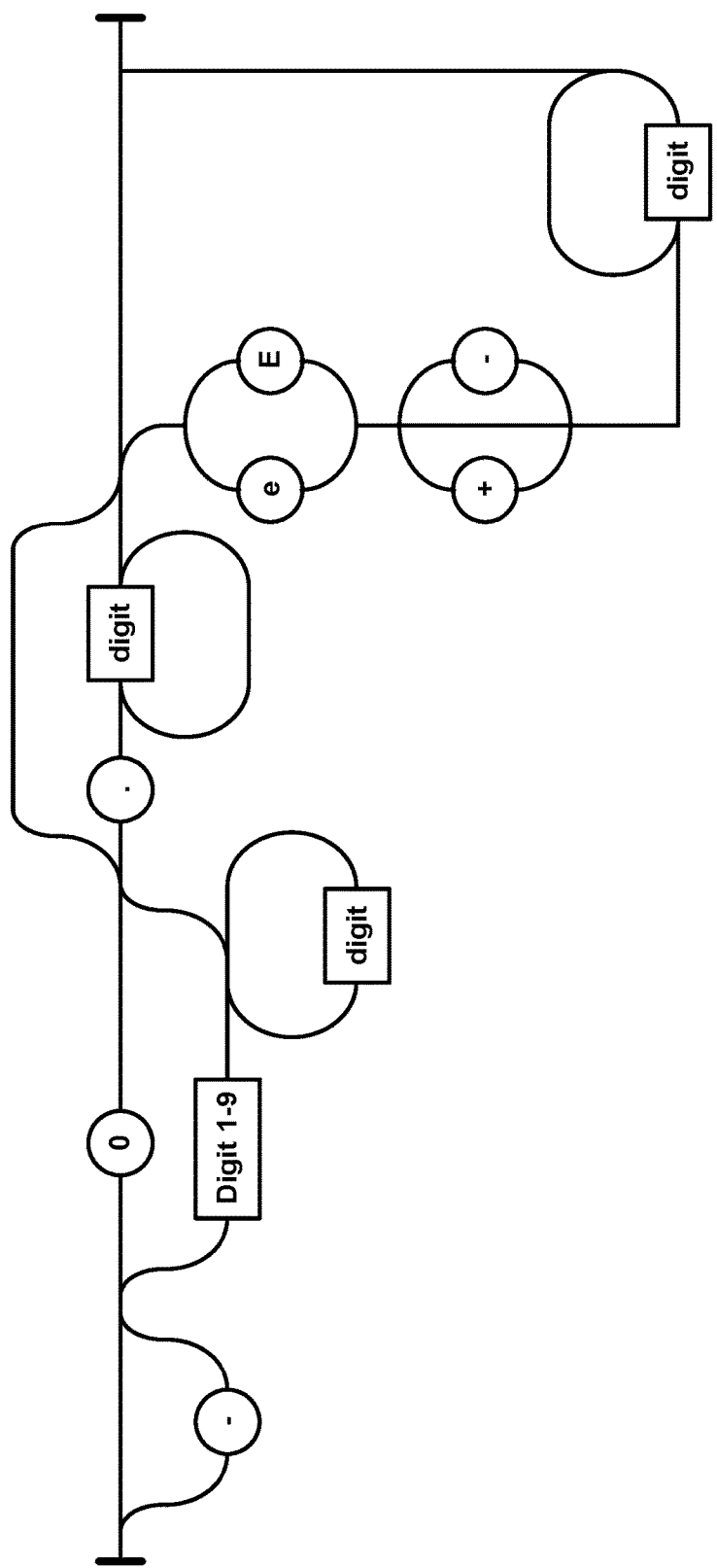
FIG. 10 is a diagram of a syntax of a JSON number.

FIG. 10 illustrates a format for a JSON number where the number may start with an negative sign ("−"), at least one digit, with an optional decimal point followed by at least one digit, and an optional exponent indicator ("e" or "E") followed by and optional sign indicator ("+" or "−") then followed by at least one digit for the exponent.

An attribute may also be referred to as a field, property, or member. An attribute may be primitive with a simple value (of type integer, for example) or it may be complex value pointing to an object or a collection of objects.

In many languages, a collection of name-value pairs may be realized as an object, record, struct, dictionary, hash table, keyed list or associative array. In many languages, an ordered list of values may be realized as an array, vector, list or sequence.

JSON objects deemed to be having the same set of attribute name/value pairs may be considered to belong to a JSON object class. An instance of the JSON object class, that is a JSON object belonging to a JSON object class, may have the values of one or more such attributes missing or null. ECMAScript 6 (ES6) specifies a way to define a JSON object class.

Figure 11:
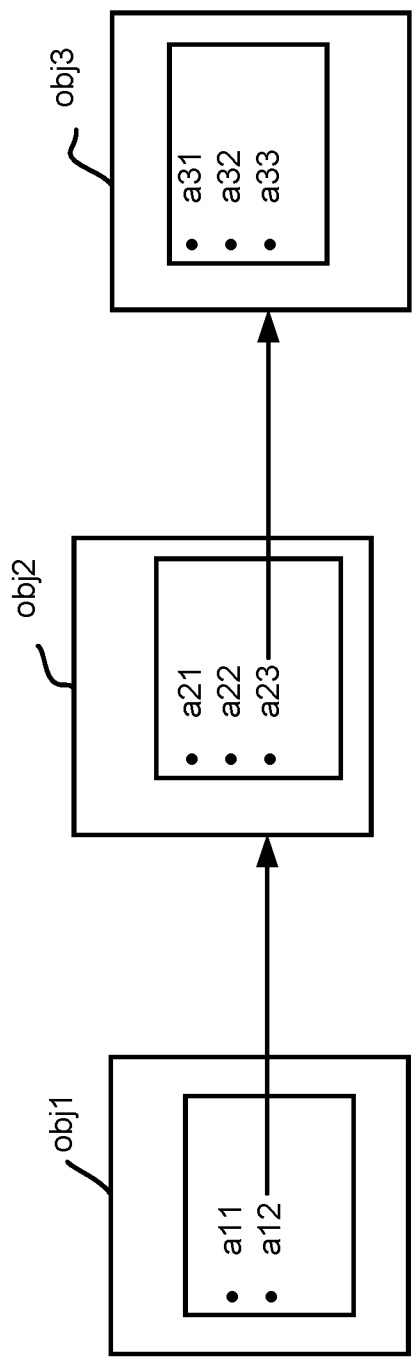
FIG. 11 is an embodiment of a JSON object graph.

FIG. 11 illustrates three linked JSON objects.

A path expression may be used to traverse the three linked JSON objects, obj1, obj2 and obj3 to access a nested attribute. Attributes a11 and a12 are contained in JSON object obj1. Attributes a21, a22 and a23 are contained in JSON object obj2. Attributes a31, a32 and a33 are contained in JSON object obj3.

The following are examples of path expressions with reference to the top level object obj1 illustrated in FIG. 11:

all (specifies the attribute all in obj1)
a12 (specifies the attribute a12 referencing obj2 in obj1)
a12.a21 (specifies the attribute a21 in obj2 referenced through the attribute a12 in obj1)
a12.a23 (specifies the attribute a23 referencing obj3 in obj2 referenced through the attribute a12 in obj1)
a12.a23.a33 (specifies the attribute a33 in obj3 referenced through the attribute a23 of obj2 referenced through the attribute a12 in obj1)

In the present invention, the path expressions are used to specify object relational mapping for a desired selected subset of nested attributes in a JSON object or a regular object graph. Since one can uniquely specify a particular attribute in an object graph using a path expression, that path expression can serve as the attribute name for defining its mapping to relational system.

A path expression specifies the attribute name of a referenced object or attribute (or its value) in an object graph. A path expression identifies a nested named attribute of an underlying JSON object or a nested named attribute of an underlying instance of a class ("regular object") in an object-oriented system.

JSON has become a popular data interchange format because it is easy to read, write, and understand. The open standard and language-neutral data format of JSON objects makes them easily interchangeable and usable among applications written in different programming languages. Also, JSON is lightweight and more succinct compared to other popular data interchange formats like XML. Many new applications and services have started publishing and consuming data in JSON format. For example, the weather service portal openweathermap.org provides weather data in JSON format, and the geographical database services portal Geonames.org provides useful information about different places, such as weather, time zone, and zip codes, in JSON format. Many Yahoo web services provide data in JSON format.

The web services and other applications that provide data in JSON format for various independent applications typically tend to provide more data than a particular data consuming application may need. Providing an over-inclusive set of data may be done to make the task of developing a JSON data-producing web service or application easier, because it would be very difficult if not impossible to customize data outputs to meet the exact needs of a dynamically changing set of evolving applications that consume the JSON data. Hence, on the consuming application side, there is a need to selectively use a subset of the JSON object data rather than the entirety of the data provided. The usage of such selective data subset may include display, business logic, messaging, and storage.

An application often needs to store JSON objects in a persistent storage so that the data is available in the future as needed. A relational database is often used for such storage. Since the applications dealing with JSON objects are typically developed in object-oriented programming languages, an ORM system, as described herein, will often simplify and accelerate the conversion of data from an object-oriented system to a relational system for persistent storage.

A JSON object may be stored (persisted) as plain text in a file or database but automatically decomposing and storing its components in individual columns and rows of a database (RDBMS) such that they can be better queried and analyzed was not possible to do earlier without significant programming effort. Also, storing the whole JSON object in a text format does not accomplish pruning and flattening of the original object which may be desirable in many circumstances.

A JSON object is an unordered set of attribute name/value pairs. An attribute may be primitive with a simple value (of type integer, string, etc.) or it may be complex pointing to an object or a collection of objects.

A path expression uses a chain of attribute names to specify the attribute name of a referenced (nested) object (or value) in an object graph. A nested object may also be called a contained object or a linked object. Typically, a dot-notation (using the character ('.') is employed as a delimiter between each attribute name to specify the path expression. In some embodiments, the path expression references a nested JSON object. In other embodiments, the path expression references nested objects that are instances of a class. A path expression may be applied to other types of nested objects. In other embodiments, an arrow ("→") or some other predetermined set of characters is used to serve as a delimiter between attributes in the path expression.

Virtual Attribute: The present invention uses a concept of a Virtual Attribute to facilitate mapping specification for an attribute identified with a path expression or for an attribute of a JSON object which does not have a formal domain model class definition.

A Virtual Attribute can also be used to define mapping for an entity that may not be explicitly defined as an attribute in the class of a target object but has the corresponding accessor methods defined. The mapping specification for a Virtual Attribute may be defined declaratively using the keyword VIRTUAL_ATTRIB.

The ORM Data Structure may be enhanced to have a data structure VirtualAttribInfo for a Virtual Attribute such that VirtualAttribInfo is a subclass of AttribInfo and provides additional functionality of tracking the Virtual Attribute value for an object keyed to the object in a hashtable If needed, the ORM system generates tables with columns for Virtual Attributes where the values of those attributes can be stored and retrieved from.

With respect to the objects shown in FIG. 11, one can specify a mapping for an integer attribute a33 contained in the obj3 shown as follows:

VIRTUAL_ATTRIB a12.a23.a33 ATTRIB_TYPE int
SQLMAP FOR a12.a23.a33 COLUMN_NAME A33

The above declarative mapping statements indicate that the attribute identified by the path expression a12.a23.a33 is a virtual attribute. The data type of this attribute is int (integer), and the values of this attribute should be stored under the relational table column named A33. Thus, these mapping statements define a relationship between an object-oriented system and a relational system.

The ORM System does the following two things associated with the attribute a12.a23.a33: (1) While saving a JSON object obj1 in the database, it has to retrieve the value of the attribute a33 from the object obj3 referenced by the attribute a23 of the object obj2 referenced by the attribute a12 of the top-level object obj1; and (2) While retrieving a JSON object corresponding to the original obj1 object from the database, it has to create a top-level attribute named a12.a23.a33 and assign the value from the database to that attribute.

The object structure for name value pairs may change from the original JSON object before it was saved in the database and the later JSON object which was created by the ORM system from the database. Compare the hierarchical structure of the nested objects in FIG. 13 and the flat structure in FIG. 15. However, the value of the attribute name a12.a23.a33 returned by both objects is the same even though the objects have different structures.

Virtual Complex Attribute: The present invention uses a concept of a Virtual Complex Attribute to facilitate mapping specification for a complex (non-primitive) attribute identified with a path expression or for an attribute of a JSON object which does not have a formal domain model class definition. A Virtual Complex Attribute can also be used to define mapping for a Complex Attribute that may not be explicitly defined as an attribute in the enclosed class but has the corresponding accessor methods defined. The mapping specification for a Virtual Complex Attribute may be defined declaratively using the keyword VIRTUAL_COMPLEXATTRIB.

The ORM Data Structure may be enhanced to have a data structure VirtualComplexAttribInfo for a Virtual Complex Attribute such that VirtualComplexAttribInfo is a subclass of ComplexAttribInfo and provides additional functionality of tracking the Virtual Complex Attribute value for an object keyed to the object in a hashtable. (as opposed to a regular complex attribute where such regular complex attribute is typically defined explicitly in a domain model class), With respect to the objects shown in FIG. 11, one can specify a mapping for a non-primitive attribute a12 contained in obj1 as follows:

VIRTUAL_COMPLEXATTRIB a12 ATTRIB_TYPE ClassA2

The above declarative mapping statement, which would be specified in the mapping context for the containing class of obj1, indicates that the attribute identified by a12 is a virtual complex attribute, the data type of this complex attribute is ClassA2, where ClassA2 may be a regular domain object model class or a derivative of JSONObjectContainer class or ObjectContainer class as explained below.

With respect to the objects shown in FIG. 11, one can specify a mapping for a non-primitive attribute a12.a23 contained in obj1 as follows:

VIRTUAL_COMPLEXATTRIB a12.a23 ATTRIB_TYPE ClassA3

The above declarative mapping statement, which would be specified in the mapping context for the containing class of obj1, indicates that the attribute identified by the path expression a12.a23 is a virtual complex attribute, the data type of this complex attribute is ClassA3, where ClassA3 may be a regular domain object model class or a derivative of JSONObjectContainer class or ObjectContainer class.

The term "Virtual Attribute" may be used to refer to Virtual Attribute and Virtual Complex Attribute collectively.

In a preferred embodiment, the system includes the following software framework components:

JSONObject class: This class provides a modifiable set of name/value mappings normally used to instantiate and manipulate a regular JSON object. This class is typically supplied in Software Development Kits (SDKs) for most programming platforms like Java, .NET, and Android. If an explicit JSONObject or similar class is not supplied in an SDK, one may use a hash table or a dictionary construct to implement the functionality of a JSONObject class. An instance of any JSON object class may programmatically be implemented as an instance of this JSONObject class.

EnhancedJSONObject class: This is a subclass of the core class JSONObject described earlier. This class provides the added capability of looking up the value of a named attribute (also known as a field, property, member) from the underlying JSON object such that if the named attribute is a path expression specifying a attribute name of a referenced object, it can traverse the object path to retrieve the value of the specified named attribute from the appropriate referenced object. A representative implementation of such a class is given in FIGS. 37A and 37B.

JSONObjectContainer class: This abstract class serves as abase class for persisting or converting JSONObject instances of a domain specific class which may he defined as a subclass of this class. The object relational mapping or the object conversion mapping for that domain specific class is defined using a VIRTUAL_ATTRIB specification for each selected attribute (that needs to be persisted or converted) of the corresponding JSON object. This class uses an encapsulated enhanced JSONObject instance (of the class EnhancedJSONObject described above) to manipulate object attributes. This class also provides a method to return the underlying JSONObject. A representative implementation of such a class is given in FIGS. 38A and 38B.

If, in the derived domain specific class, you want to define additional attributes which are not part of the encapsulated JSONObject, you must also define the corresponding setter/getter methods for those additional attributes in the derived class. You should also define any non-default mapping information for those additional attributes in the mapping specification.

Basically, this is how this class helps in saving and retrieving the attribute values of a JSONObject using an underlying ORM or Object Conversion System (OCS), described below. To facilitate the object construction and composition, a basic JSONObject is represented in an instance of the subclass EnhancedJSONObject. That instance of EnhancedJSONObject is encapsulated into an instance of a subclass of JSONObjectContainer. The subclass of JSONObjectContainer represents a domain model class and is used for defining ORM or OCS specification. The VIRTUAL_ATTRIB statements in the context of the ORM or OCS specification for the domain model class are used to provide the names and types of the relevant attributes of the underlying JSONObject.

GetSet interface: This interface defines the accessor (get and set) methods to get or set the value of a given attribute of the associated object. A representative definition of a GetSet interface is given in FIG. 41.

ObjectContainer class: This class encapsulates an object implementing the GetSet interface (defining the get and set methods) and serves as an intermediary to intercept getAttribValue and setAttribValue calls to provide the functionality of getting and setting the attribute values of the encapsulated object using its GetSet interface implementation. The main advantage of using this intermediate class is its ability to get the value of an attribute named with a path expression. This class provides an innovative way to traverse the object path to retrieve the value of the specified named attribute from a referenced object, if needed. For an ORM or OCS system, this ObjectContainer class can be used to serve as a base class for a domain model specific class that implements the GetSet interface. The object relational mapping or object conversion mapping for a domain model class attribute involving a path expression class is defined using a VIRTUAL_ATTRIB specification. For regular attributes whose names do not involve path expressions, the mapping may be defined normally. A representative implementation of an ObjectContainer class is given in FIGS. 42A and 42B.

Accessor methods: In some embodiments, an ORM or OCS system uses a getter method on the domain model class to retrieve the value of a particular attribute of an object. In some embodiments, the getter method name is "get" (or "getAttribValue") which takes an attribute name as a parameter. Sometimes, the getter method name is patterned like get<AttributeName> (e.g., getCity for an attribute name city). Whichever appropriate getter method is defined in a class for an attribute, it may be determined by the ORM or OCS system using the reflection facility of the programming language. Subsequently, that method is used reflectively by the ORM or OCS system to get the value of the attribute of an object to be persisted or converted. Similarly, a setter method (e.g., set( ) setAttribValue( ) or setCity( )) is used reflectively to set the value of an attribute when an ORM or OCS system retrieves an object from the database or another source. The setter and getter methods are collectively called as accessor methods. For regular domain model classes with explicitly defined attributes, an ORM or OCS system may use the reflection facility to directly get or set the attribute values without using any accessor methods.

Virtual Attribute, Virtual Complex Attribute, and Accessor Method: A regular attribute refers to an attribute defined explicitly in a domain model class in the object-oriented system. However, an attribute specified through a VIRTUAL_ATTRIB or VIRTUAL_COMPLEXATTRIB specification does not need to be explicitly declared in the underlying class. The present invention can work with any accessor methods of the underlying class that can get or set the value of a virtual attribute. In addition to using the virtual attribute facility for path expressions, it can also be used to get and set arbitrary values in an object graph as long as the appropriate accessor method provides the required behavior. For example, suppose the following mapping is defined for the class of object obj1 described above:
    VIRTUAL_ATTRIB a12 a23 a33 ATTRIB_TYPE int
    SQLMAP FOR a12_a23_a33 COLUMN_NAME A33
    Now, if the class defines the following methods, we can still achieve the object flattening effect:

```
int getA12_a23_a33( ){
    return this.a23.a33;
}
void setA12_a23_a33(int value) {
    this.a33=value;
}
```

The above technique of defining accessor methods to get and set arbitrary values in an object graph provides an innovative and powerful way to further refine object flattening and pruning functionality. Such a technique may be used to get values from an array or list of linked objects. For example, one may define a mapping specification for an attribute axx in the second object of an array pointed to by the a14 field as follows:
    VIRTUAL_ATTRIB
        axxFromSecondArrayElementOfA14 ATTRIB_TYPE String
    SQLMAP FOR axxFromSecondArrayElementOfA14
        COLUMN_NAME AXX Now, the class may define the following accessor methods to be invoked automatically by the ORM or OCS system to provide the desired functionality:

```
String getAxxFromSecondArrayElementOfA14( ) {
    // Some other syntax may be used to get the desired
        value return this.a14[1].axx;}
void    setAxxFromSecondArrayElementOfA14(String
    value) {this.axx=value;
}
```

Primary Keys

Primary keys uniquely identify persistent objects. A primary key may consist of only one attribute, or it may consist of multiple attributes (composite primary key). A primary key value may be readily available from the data source (e.g., input JSON object) from which a persistent object is created. If the primary key value is not available from the data source, it may be generated as part of the persistence mechanism. One simple way is to use a unique sequence value generated by a database system (e.g., AUTOINCREMENT columns of a SQLite database). In that case, a Virtual Attribute corresponding to the unique sequence value may be declared in the mapping specification and that Virtual Attribute may be used to specify the primary key (in <PRIMARY-KEY-SPEC>). Another alternative could be to declare a Virtual Attribute for the primary key and also declare that a UUID value be automatically generated and assigned to that attribute during persistence. Here are a few examples of handling primary keys:

The following declarative mapping specification indicates that the primary key of the persisted object comprises the name and dt attributes, which are parts of the original JSON Weather object.
    CLASS com.example.model.JSON_Weather TABLE WEATHER
        VIRTUAL_ATTRIB name ATTRIB_TYPE java.lang.String
        VIRTUAL_ATTRIB dt ATTRIB_TYPE int
        VIRTUAL_ATTRIB main.temp ATTRIB_TYPE double
        PRIMARY_KEY name dt
        SQLMAP FOR main.temp COLUMN_NAME temp_kelvin
        . . .
    ;

The following declarative mapping specification indicates that the value of the id attribute, comprising the primary key, will automatically be generated by the database system with an AUTOINCREMENT column. This primary key value is generated independently of the input JSON Weather object.

CLASS com.example.model.JSON_Weather TABLE WEATHER
        VIRTUAL_ATTRIB id ATTRIB_TYPE java.lang.Integer
        VIRTUAL_ATTRIB name ATTRIB_TYPE java.lang.String
        VIRTUAL_ATTRIB dt ATTRIB_TYPE int
        VIRTUAL_ATTRIB main.temp ATTRIB_TYPE double
        PRIMARY_KEY id
        SQLMAP FOR id SQLTYPE 'INTEGER PRIMARY KEY AUTOINCREMENT'
        RDBMS_GENERATED id
        SQLMAP FOR main.temp COLUMN_NAME temp_kelvin
        ...
    ;

Persisting (Saving) JSON object values in the database:

The ORM system picks the persistent attributes specified in the ORM Specification for an input JSON object and saves their values in the database. For saving the value of a persistent attribute of a JSONObjectContainer subclass object in the database, the ORM system, using the reflection facility of the implementation language like Java, invokes a getter method of the JSONObjectContainer (sub)class passing the name of the attribute as a parameter. That name of the attribute may be a name meant for an attribute at the top level JSON object or it could be a path expression for an attribute in the JSON object graph.

In any case, the getter method of JSONObjectContainer class invokes the get method of the encapsulated object of the class EnhancedJSONObject (see FIGS. 37A and 37B). This EnhancedJSONObject object will first use the regular method (named opt( ) in the FIG. 37B) to retrieve the value of the attribute. If that is not successful and the attribute name involves path expression, it will invoke the method getWithPathExpression( ) to get the value of the desired attribute by properly traversing the path in the object graph. Essentially, the getWithPathExpression( ) method keeps going deeper into the object graph one link at a time as follows:

The name of the linking attribute is the substring parsed up to the first delimiter (e.g., a dot) of the path expression and the remaining substring is the name of the attribute to be looked up in the linked object pointed to by the linking attribute. If the lookup of the attribute name in the linked object fails then the remaining substring is treated as a path expression with respect to the linked object. This process to look up the desired value in the object graph continues until one is found or a dead end is reached.

For example, if the getter method of the JSONObjectContainer corresponding to obj1 shown above in FIG. 11 is invoked for the attribute name a12.a23.a33, one embodiment of how the attribute value can be found is described below:

First, the get ( ) method on the encapsulated EnhancedJSONObject object will be called from the JSONObjectContainer object.

In the EnhancedJSONObject object representing obj1, the get( ) method will try to lookup the value of the attribute a12.a23.a33. The lookup will fail because there is no attribute by the name of a12.a23.a33 in obj1. So a call to getWithPathExpression( ) method is made with a12.a23.a33 as the parameter.

The getWithPathExpression( ) method determines the parameter is a path expression. A referenced object obj2 is then retrieved from obj1 corresponding to the attribute name a12 (which is a substring of the path expression a12.a23.a33 parsed up to the first delimiter). The get( ) method for the attribute name a23.a33 (the remaining substring) is invoked on a newly created EnhancedJSONObject from obj2.

The lookup for the attribute name a23.a33 fails on obj2 because there is no attribute by the name a23.a33 in obj2. A call to getWithPathExpression( ) method is then made for the EnhancedJSONObject corresponding to obj2 with the attribute name a23.a33 as the parameter. In getWithPathExpression( ) method, a referenced object obj3 is retrieved from obj2 corresponding to the attribute name a23 (which is a substring of the path expression a23.a33 parsed up to the first delimiter). The get( ) method for the attribute name a33 (the remaining substring which is not a path expression) is invoked on a newly created EnhancedJSONObject from obj3. This call will successfully return a value of the attribute a33 in the object obj3. The value of attribute a33 will be returned to the ORM system which invoked the getter method for the attribute name a12.a23.a33 on the JSONObjectContainer object corresponding to obj1. If the obj3 JSON object does not have any value corresponding to attribute name a33, a null value is returned to the ORM system. The ORM system stores the value of the a33 attribute, thus retrieved, in the table column A33.

Because of the use of the path expressions in this innovative way, the values of the attributes in the linked objects of the object graph are all stored together in one database table. The subsequent retrieval of the object from the database will create a JSON object without any links. This process results in flattening of the original JSON object.

In the context of an OCS system, a similar approach may be used to retrieve the value of a source attribute of an input JSON object and that value may be used to initialize a target attribute of an output (JSON or non-JSON) object.

In case a non-primitive attribute of JSON object graph is mapped through a VIRTUAL_COMPLEXATTRIB statement, the contained values of that non-primitive complex attribute may be stored a) in the same table by 1) inlining those values in multiple columns or 2) serializing those values in a blob column or b) in a different table using an existing or a generated foreign key value. Thus, mapping of non-primitive attributes can also help in flattening the object graph to a controlled level.

If any attributes of the original JSON object graph were not specified in the ORM specification, their values would not be saved in the database. The non-persistence of one or more attributes from an original JSON object graph is referred to as pruning. The application may not have a need for those attribute values to be saved. The elimination of unnecessary attributes may help reduce unnecessary processing overhead and save disk space.

Retrieving JSON object values from the database:

After retrieving a set of desired column values from a selected database row, an ORM System instantiates an object of the target JSONObjectContainer subclass. This instantiation may be done by using the reflection facility of the implementation language like Java. Then, for each retrieved value of a persistent attribute of the JSONObjectContainer subclass object, the ORM system, using the reflection facility of the implementation language, invokes a setter method of the JSONObjectContainer class passing the name and the value of the attribute as parameters. The setter method of JSONObjectContainer in turn invokes the put method on the encapsulated object of the class EnhancedJ- SONObject (see FIGS. 37A and 37B), This EnhancedJ-SONObject object invokes the inherited put method of the super class JSONObject which sets the value of the given attribute in the underlying JSONObject to the passed value. Thus, a JSONObject is initialized from the attribute values saved in the database.

The application can retrieve the pure JSON object (of type JSONObject) by calling the getJSONObject( ) method of the JSONObjectContainer class. It should be noted that any value retrieved for an attribute defined using a path expression would be assigned to an attribute named as such in the JSONObject. For example, if an attribute value of 100 was saved for a virtual attribute a12.a23.a33, then newly created JSON object will have a top-level attribute by the name of a12.a23.a33 and its value will be set to 100. Note that the original object structure of obj1 referencing obj2 referencing obj3 will not be present in the retrieved JSONObject. Thus, the JSONObject will be flattened as compared to the original object structure. Also, if any attributes of the original object graph were not specified in the ORM specification, their values would not have been saved and they would not be created in the object retrieved from the database. In a preferred embodiment, the attributes are deliberately omitted from the retrieved object because those attributes are not needed by the application that accesses that object. The newly created JSONObject may be more compact than the original JSONObject to the extent this process prunes unnecessary data from the original JSONObject.

Figure 18:
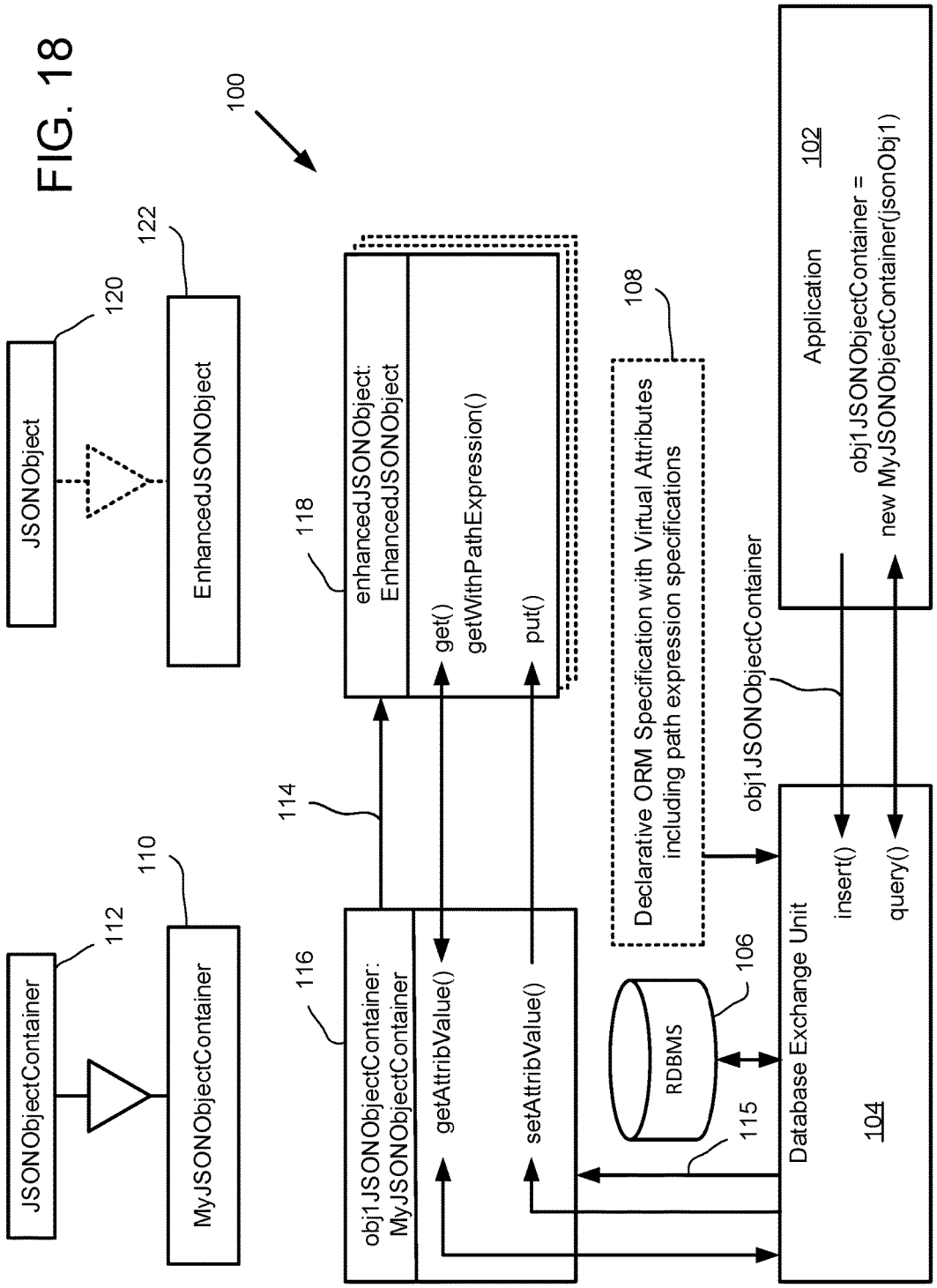
FIG. 18 is an ORM System using Virtual Attributes, a JSONObjectContainer class and EnhancedJSONObject class.

The schematic diagram in the following FIG. 18 summarizes the high-level usage of various classes described above for persisting JSON objects.

Persisting (Saving) attribute values of regular (non-JSON) objects in the database:

The ORM system picks the persistent attributes specified in the ORM Specification for an input object and saves their values in the database. For saving the value of a persistent attribute of an ObjectContainer subclass object in the database, the ORM system, using the reflection facility of the implementation language like Java, invokes a getter (e.g., getAttribValue) method of ObjectContainer (sub)class passing the name of the attribute as a parameter. That name of the attribute may be a simple name meant for an attribute at the top level object or it could be a path expression meant for an attribute contained deep into the object graph. In any case, the getter method of ObjectContainer class invokes the standard get method of the encapsulated object implementing the GetSet interface (see FIG. 41). If that is not successful and the attribute name involves path expression, it will invoke the method getWithPathExpression( ) to get the value of the desired attribute by properly traversing the path in the object graph. Essentially, the getWithPathExpression( ) method keeps going deeper into the object graph one link at a time as follows: The name of the linking attribute is the substring parsed up to the first delimiter (e.g., a dot) of the path expression and the remaining substring is the name of the attribute to be looked up in the linked object pointed to by the linking attribute. If the lookup of the attribute name fails in the linked object then the remaining substring is treated as a path expression with respect to the linked object and the look up for the desired value continues until one is found or a dead end is reached. In case a dead end is reached, a null value is returned to the ORM system.

The ORM system will store the value of the desired persistent attribute, thus retrieved, in the appropriate table column.

In the context of an OCS system, a similar approach may be used to retrieve the value of a source attribute of a regular input object and that value may be used to initialize a target attribute of an output (JSON or non-JSON) object.

Retrieving regular object values from the database:

After retrieving a set of desired column values from a selected database row, an ORM System instantiates an object of the target ObjectContainer subclass. This instantiation may be done by using the reflection facility of the implementation language like Java. Then, for each retrieved value of a persistent attribute of the ObjectContainer subclass object, the ORM system, using the reflection facility of the implementation language, invokes a setter method (e.g., setAttribValue) of the ObjectContainer class passing the name and the value of the attribute as parameters. The setter method of ObjectContainer in turn invokes the set method on the encapsulated object of the class implementing the GetSet interface (see FIG. 41) to set the value of the given attribute in the encapsulated object to the passed value. That is how a regular object is initialized from the attribute values saved in the database. The application can retrieve the encapsulated domain model object by calling the getContainedObject( ) method of the ObjectContainer class.

It should be noted that if the target object being retrieved is a regular object (i.e., a non-JSON object) then any attribute value previously saved in the database using a path expression should be retrieved in a attribute named normally for the object system (typically a regular attribute name of a class cannot be path-expression; it is a simple name). Such attribute name can be defined declaratively in the mapping specification as part of a class that is different than the original class under whose mapping the VIRTUAL_ATTRIB specification was defined. This may be achieved by enhancing the ORM Grammar and associated processing to incorporate elements similar to <OUPUT-CLASS-SPEC> and <VIRTUAL OUTPUT-ATTRIB-SPEC> defined in the OCS Grammar. This is similar to defining a table column name for the attribute name. For example, if an attribute value of 100 was saved for a virtual attribute a12.a23.a33, of an object of class Class1 then the newly created object may be of a different class Class2 and have an attribute by the name of a12_a23_a33 whose value will be set to 100. An exemplary mapping specification could be the following:

CLASS Class1 OUTPUT_CLASS Class2 TABLE TABLE1
  VIRTUAL_ATTRIB a12.a23.a33 ATTRIB_TYPE int
  VIRTUAL_OUTPUT_ATTRIB a12_a23_a33
  . . .
;

In particular, the original object structure of obj1 referencing obj2 referencing obj3 will not be present in the retrieved object of Class2. Also, if any attributes of the original object graph were not specified in the ORM specification, their values would not have been saved and they would not be created in the object retrieved from the database. Presumably, the application did not have the need for those attribute values to be saved. That will also result in the newly created object (of class Class2) to be more compact as it would have shed the unnecessary data from the original object of Class1. This results in the flattening of the original object graph with the new object keeping only the attribute values of real interest.

Figure 20:
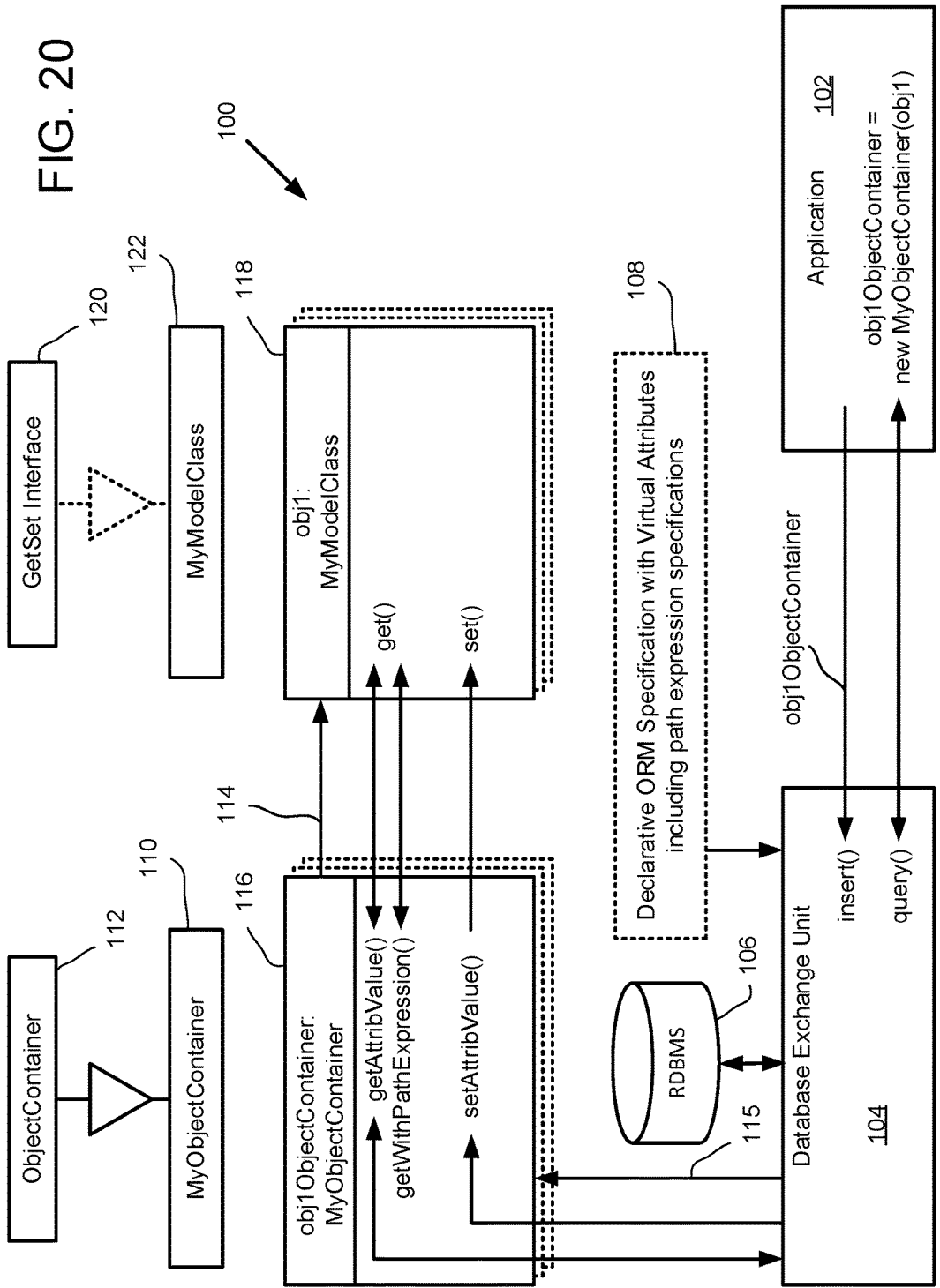
FIG. 20 is an ORM System using an ObjectContainer class, GetSet interface, and Virtual Attributes.

The schematic diagram in the following FIG. 20 summarizes the high-level usage of various classes described above for persisting regular (non-JSON) objects.

FIG. 12 illustrates the structure and semantics of a JSON object returned by the weather service openweathermap.org.

The first column indicates the name of a name-value pair and the second column provides a description of the value associated with that name-value pair. The third column indicates whether that name value pair must be included in that type of JSON object.

FIG. 13 illustrates an example of a JSON object according to the structure and semantics defined in FIG. 12.

This JSON object includes attributes having values describing weather conditions at a particular time and place.

An example of a flat JSON attribute is "name" which refers to the city name, here "New York." An example of nested JSON objects is "main" which includes several JSON objects, including "temp," "pressure," and "humidity". The path expression "main.temp" would refer to the attribute "temp" referenced by the attribute "main."

Some weather-related applications may only use a subset of the weather related data. For example, the application for this example is designed to report the temperature, pressure, humidity and wind speed in a particular city and the time such information was received. In this case, much of the data in the illustrated JSON object is not relevant for that application. Time and space may be wasted in accessing, storing, and moving the unused data in this JSON object.

For this particular application, it would be useful to prune the JSON object so that only the portions of the object that the application uses would be maintained. Other applications may use all of the JSON object attributes, or a different subset of the JSON object attributes.

For this particular application, it would be useful to also flatten the JSON object so that values associated with nested attributes, such as the temperature, may be referred to directly without traversing a nested object every time it is accessed.

FIG. 14 illustrates an example of Declarative ORM Specification for attributes of the weather JSON object involving path expressions.

FIG. 15 illustrates an example of a JSON object that is the result of pruning and flattening the JSON object of FIG. 13.

This new JSON object is pruned in that it only has name-value pairs for the time, city name, temperature, pressure, humidity and wind speed. None of the other name-value pairs has been included in this new JSON object.

This new JSON object is flattened in that there is only one level of hierarchy for temperature, pressure, humidity and wind speed. The path expression embedded in the name of any of these attributes is no longer necessary to traverse a nested object in the now flattened JSON object, but the information associated with the path expression embedded in the name might be used by the application for some other purpose. Alternatively, the name of the attribute of the new JSON object corresponding to a path expression may also be flattened, for example, by using a VIRTUAL_OUTPUT_ATTRIB specification. So, for example, "main.temp" may be simplified to "temp" in the flattened JSON object. Other strategies may be used to change the name.

Some applications may prune some attributes and flatten other attributes of the JSON object. Other applications may prune some attributes and not flatten any attributes of the JSON object. Yet other applications may flatten some attributes but not prune any attributes of the JSON object.

Thus, in one embodiment of the system, a selective subset of JSON object attributes may be persisted. A leaner JSON object may be extracted from a larger and more complex JSON object. This may be useful when an application retrieves the more complex JSON object from a generic source over which the application developer does not have much control. Different subsets of the same JSON object may be extracted and flattened in different ways according to various ORM specifications for that JSON object depending on the purpose of the extracted data. For example, one weather related application of the weather JSON object may require only location and temperature information, and another weather related application may require only location and wind information. A first ORM specification may extract the location and temperature information for the first application and a second ORM specification may extract location and wind information for the second application. Thus one set of data may be repurposed in multiple ways.

The above example illustrated pruning and flattening a JSON object. In another embodiment, an instance of a class in an object-oriented system (a regular object) may be pruned and flattened as described herein.

For the same reasons why relational databases are considered preferred storage for object model data, they are also considered preferred storage for JSON object data. However, JSON data is an ad-hoc collection of name/value pairs; there are usually no formal schema or domain model class definitions for JSON object data.

As illustrated in the Weather example, there is a need to flatten and store a selective subset of the JSON object data where such data may be spread across nested objects. Traditional ORM technologies do not provide a way to flatten data in nested objects. One reason is that the traditional ORM technologies typically deal with explicitly defined domain model classes which declare their attributes in the class definitions. Since JSON objects don't have explicit class definitions enumerating their attributes, the information about their attributes cannot be gathered using the reflection facility of a programming language.

Figure 16:
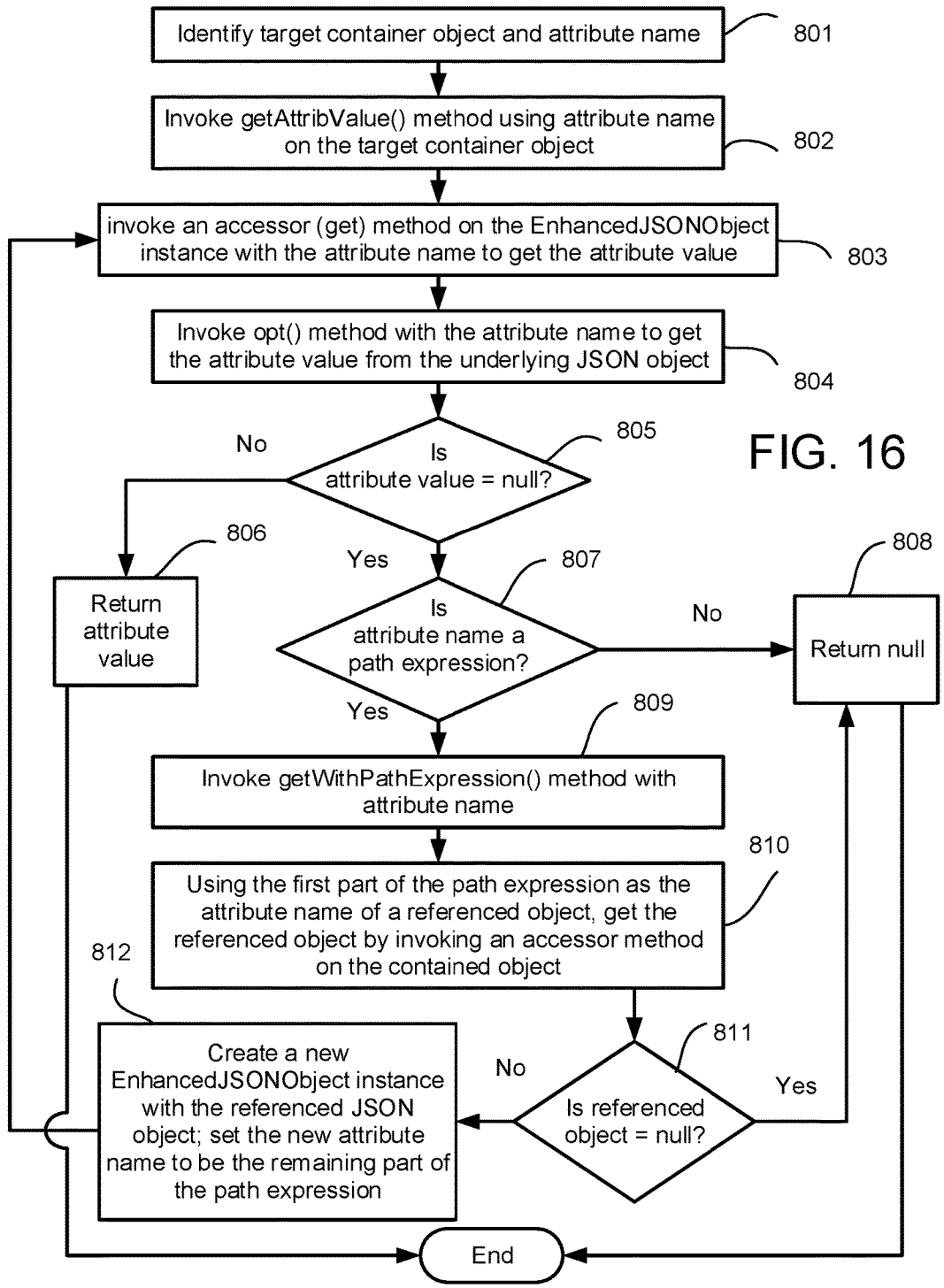
FIG. 16 is a flow chart of a method of processing a JSON path expression using a container object and an EnhancedJSONObject object.

FIG. 16 is a flow chart showing one embodiment of a method for parsing a path expression for a JSON Object.

In step 801, a target container object and attribute name is identified.

In step 802, the getAttribValue( ) method is invoked using attribute name on the target container object.

In step 803, an accessor (get) method is invoked on the EnhancedJSONObject instance with the attribute name to get the attribute value.

In step 804, an opt( ) method is invoked with the attribute name to get the attribute value from the underlying JSON object In step 805, if the attribute value is null, step 807 is performed. Otherwise, step 806 is performed.

In step 806, the value is returned and the process is completed.

In step 807, if the attribute name is a path expression, step 809 is performed. Otherwise the step 808 is performed.

In step 808, the null value is returned and the process is completed.

In step 809, the getWithPathExpression( ) method with attribute name is invoked using the part of the identified attribute name before the first delimiter (e.g., ".").

In step 810, using the first part of the path expression as the attribute name of a referenced JSON object, get the referenced JSON object by invoking an accessor method on the contained object In step 811, if the referenced object is null, the null value is returned and the process is completed. Otherwise the next step 812 is performed.

In step 812, a new EnhancedJSONObject is created with the referenced JSON object.

Next, step 803 is performed wherein the attribute name is the part of the remaining portion of the attribute name that is after the first delimiter (e.g., ".").

Figure 17:
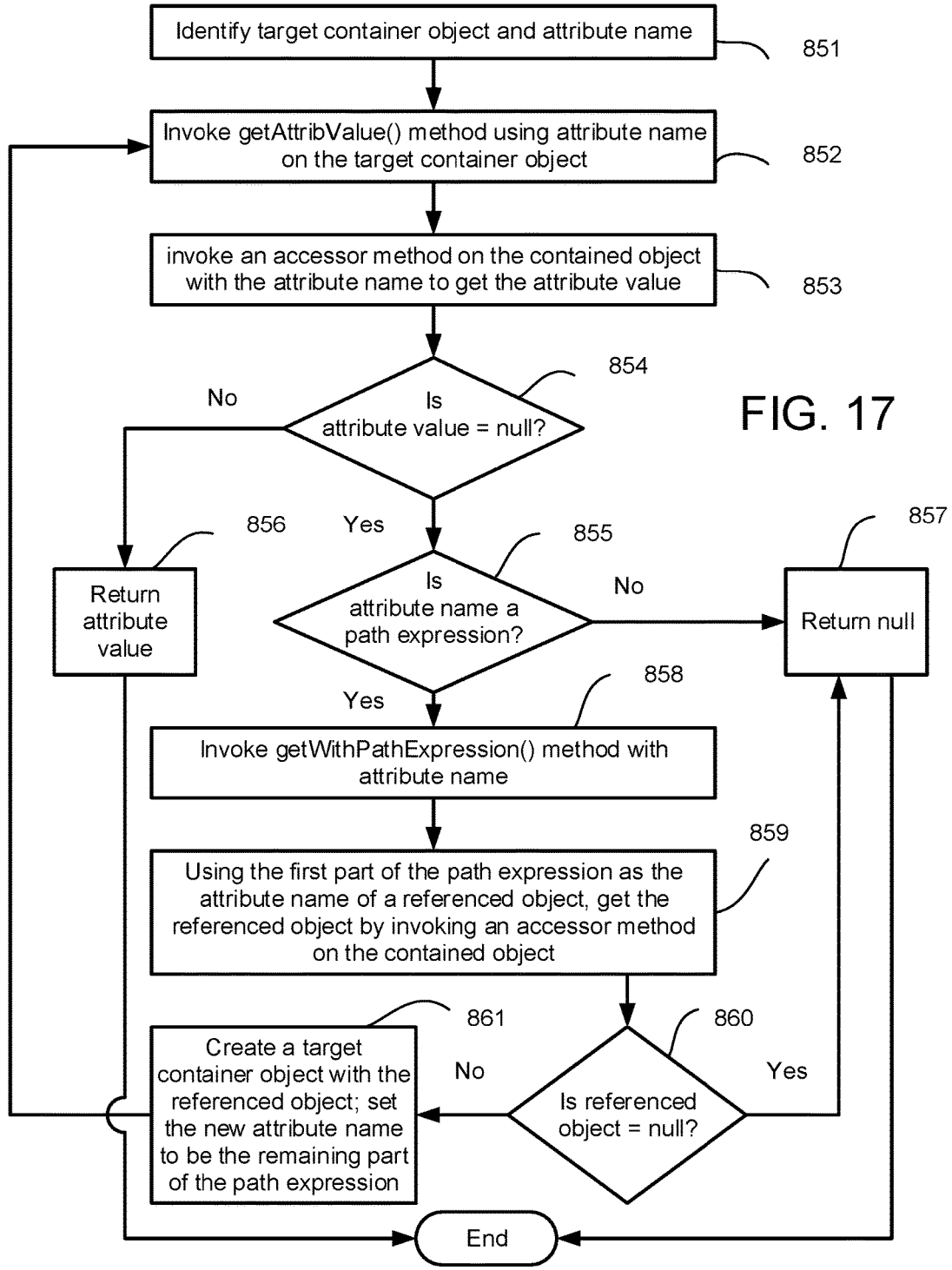
FIG. 17 is a flow chart of a method of processing a path expression using a container object.

FIG. 17 is a flow chart showing one embodiment of a method for parsing a path expression for a contained object.

In step 851, a target container object and attribute name is identified.

In step 852, the getAttribValue( ) method is invoked using attribute name on the target container object In step 853, an accessor method is invoked on the contained object with the attribute name to get the attribute value.

In step 854, if the attribute value is null, step 855 is performed. Otherwise, step 856 is performed.

In step 856, the value is returned and the process is completed.

In step 855, if the attribute name is a path expression, step 858 is performed. Otherwise the step 857 is performed.

In step 857, the null value is returned and the process is completed.

In step 858, the getWithPathExpression( ) method with attribute name is invoked using the part of the identified attribute name before the first delimiter (e.g., ".").

In step 859, using the first part of the path expression as the attribute name of a referenced object, get the referenced object by invoking an accessor method on the contained object In step 860, if the referenced object is null, step 857 is performed. Otherwise the step 861 is performed.

In step 861, a target container object is created with the referenced object; the new attribute name is set to be the remaining part of the path expression.

Next, step 852 is performed wherein the attribute name is the part of the remaining portion of the attribute name that is after the first delimiter (e.g., ".").

FIG. 18 illustrates an embodiment of an ORM System for persisting a JSON object in a relational system.

The ORM system 100 includes an application 102. In some embodiments, the application is software running on a general-purpose computing device, such as a desktop computer, notebook computer, mobile phone, or tablet. In other embodiments, the application is software running on a machine, such as an embedded system for a self-driving car, or a control system for a robotic device.

The ORM system 100 includes a Database Exchange Unit 104. In some embodiments, the ORM System 104 is configured to perform object relational mapping according to some disclosures in U.S. Pat. No. 6,163,776, combined with additional features described herein.

The Database Exchange Unit 104 is communicatively coupled to an RDBMS 106 to store and retrieve information in the relational system.

The Database Exchange Unit 104 includes ORM Data Structure produced from a declarative ORM Specification 108. In some embodiments, the ORM Specification 108 includes Virtual Attributes. In other embodiments, the ORM Specification includes Virtual Attributes and Path Expressions.

The Database Exchange Unit 104 is configured to use the reflection facility of the underlying programming language to find the name of the mapped class 110 corresponding to the object passed from the application 102. The mapped class 110 is a subclass of the JSONObjectContainer class 112.

Initially, the application 102 determines a JSON object, jsonObj1, should be persisted in the RDBMS 106.

The application 102 creates a container object obj1JSONObjectContainer 116 of the corresponding JSONObjectContainer subclass (MyJSONObjectContainer) for JSON object jsonObj1.

obj1JSONObjectContainer 116 creates an instance 118 of an EnhancedJSONObject class of the corresponding jsonObj1 and its reference 114 is saved in obj1JSONObjectContainer 116.

The application 102 invokes the insert( ) method of the Database Exchange Unit 104 by passing the object obj1JSONObjectContainer 116 as a parameter.

Upon invoking the insert( ) method, control is passed to the Database Exchange Unit 104.

The Database Exchange Unit 104 receives the object obj1JSONObjectContainer, which references the JSON object jsonObj1 to be persisted in the RDBMS 106.

The Database Exchange Unit 104 uses reflection to find the name of the container class MyJSONObjectContainer 110 corresponding to obj1JSONObjectContainer 116.

The Database Exchange Unit 104 finds in ORM Data Structure the ClassInfo and TableInfo objects for the container class MyJSONObjectContainer 110 corresponding to obj1JSONObjectContainer 116.

For each VirtualAttribInfo object (corresponding to VIRTUAL_ATTRIB specification) in the ClassInfo object, The ORM system 104 gets the attribute value by invoking getAttribValue( ) method on obj1JSONObjectContainer 116 passing the name of the attribute.

FIG. 16 illustrates how the attribute value for a given attribute name can be retrieved by obj1JSONObjectContainer 116 by invoking get( ) method on an EnhancedJSONObject instance 118. If the attribute name involves a path expression, the FIG. 16 depicts traversal of the JSON object graph using new instances of EnhancedJSONObject with referenced JSON objects until the attribute value is found or a dead end is reached resulting in returning null for the attribute value.

obj1JSONObjectContainer 116 returns to the ORM system 104 the attribute value found in the previous step.

ORM system 104 uses the value of the JSON object attribute thus retrieved from obj1JSONObjectContainer 116 to initialize the corresponding column value of a row of the mapped database table created for obj1JSONObjectContainer 116.

After the column values of a database table row are initialized with the attribute values corresponding to all the VirtualAttribInfo objects, the table row is saved in the RDBMS 106, preferably by using a SQL INSERT statement, and thus the original jsonObj1 object values are persisted in the RDBMS.

FIG. 18 illustrates one embodiment of an ORM System for retrieving a JSON object from a relational system.

The application 102 invokes a query method on the Database Exchange Unit 104 passing the name of the mapped class (e.g., MyJSONObjectContainer) and a search condition to retrieve a list of qualified objects.

Upon invoking the query( ) method, control is passed to the ORM System 104.

The Database Exchange Unit 104 finds in ORM Data Structure the ClassInfo and TableInfo objects for the mapped class MyJSONObjectContainer 110.

The Database Exchange Unit 104 Issues a query statement (preferably an SQL SELECT statement with an appropriate WHERE clause) against the mapped database table to retrieve the desired rows from RDBMS 106.

For each selected row from the database, Database Exchange Unit 104 instantiates an object (obj1JSONObjectContainer) of the mapped class MyJSONObjectContainer 110 specified in the query. This instantiation may be done using a reflection facility of the underlying programming language. As part of creation of obj1JSONObjectContainer, an EnhancedJSONObject instance (enhancedJSONObject) corresponding to an empty JSONObject object jsonObj1 is created and a reference to enhancedJSONObject is saved in obj1JSONObjectContainer.

For each VirtualAttribInfo object (corresponding to VIRTUAL_ATTRIB specification) in the ClassInfo object, The Database Exchange Unit 104 does the following:

Invokes the settAttribValue( ) method on obj1JSONObjectContainer and passes it the parameters of the mapped attribute name and the corresponding column value from the selected row; such invocation may be done using a reflection facility of the underlying programming language.

obj1JSONObjectContainer, in turn, invokes the put( ) method on enhancedJSONObject to initialize the value of the named attribute of the corresponding JSONObject instance (jsonObj1).

The Database Exchange Unit 104 thus initializes obj1JSONObjectContainer with all the mapped attribute values such that the corresponding JSONObject instance jsonObj1 encapsulated by enhancedJSONObject is initialized with those values.

The Database Exchange Unit 104 retrieves jsonObj1 from obj1JSONObjectContainer using the method getJSONObject( ) of the MyJSONObjectContainer class 110.

The Database Exchange Unit 104 puts each JSON object (jsonObj1) thus built from each selected row in a list and returns the list of those objects to the application 102 as a response to the query( ) call.

Figure 19:
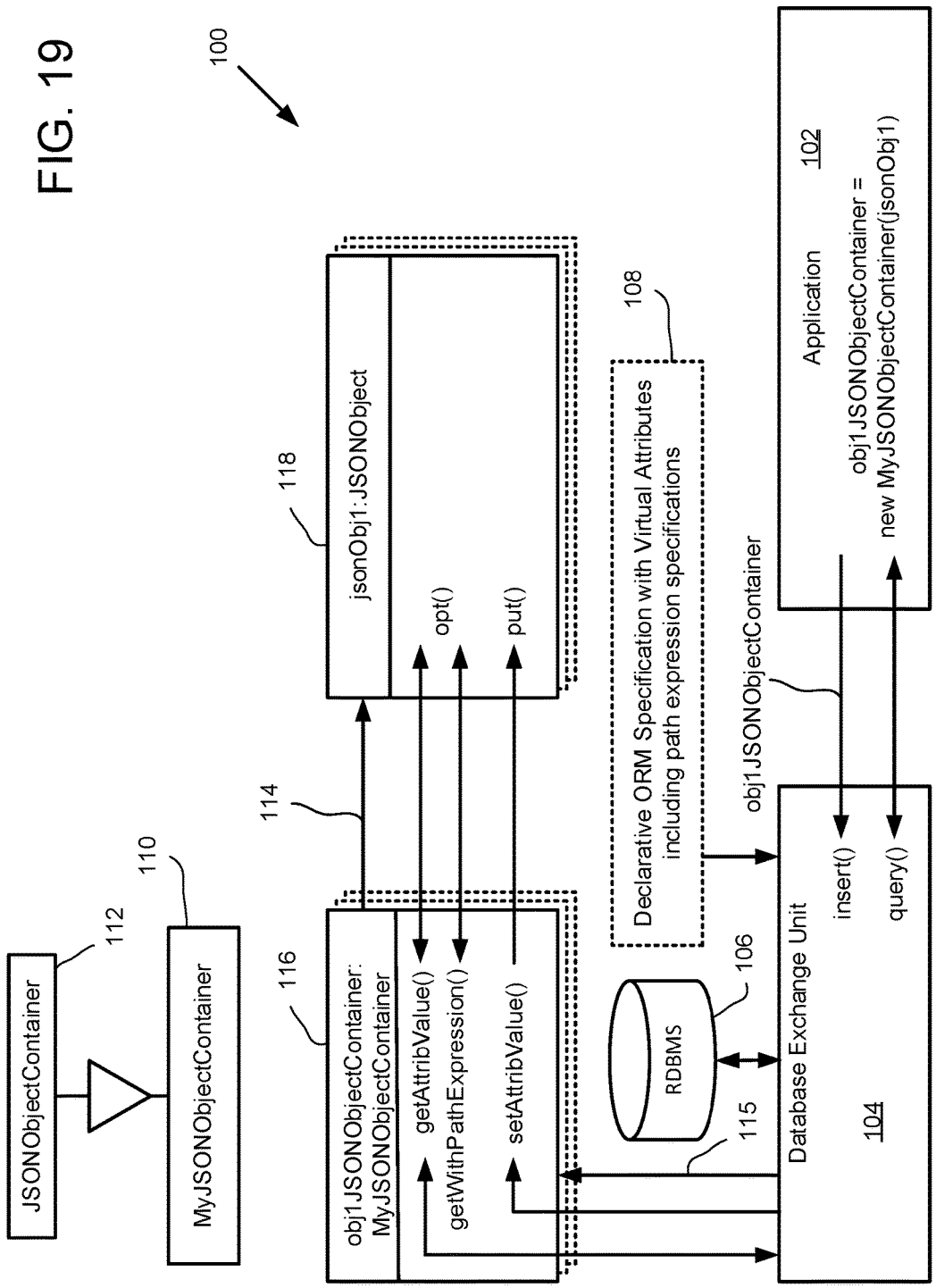
FIG. 19 is an ORM System using Virtual Attributes, a different implementation of JSONObjectContainer class which does not need to use an EnhancedJSONObject class.

FIG. 19 illustrates another embodiment of an ORM system 100. The ORM system 100 is similar to the one shown in FIG. 18. However, this embodiment does not access the jsonObj1 through an EnhancedJSONObject object for a getWithPathExpression( ) method. Instead, the obj1JSONObjectContainer 116 includes the getWithPathExpression( ) method so that it can directly access the jsonObj1 object.

FIG. 20 illustrates another embodiment of an ORM system 100. The ORM system 100 is similar to the one shown in FIG. 18. However, in this embodiment, the contained object is not a JSON object, but it is a domain class object. The object obj1ObjectContainer of the class MyObjectContainer retrieves the attribute values of a domain class object using an accessor method (of the GetSet interface) and the getWithPathExpresssion method as depicted in FIG. 17.

Object Conversion System (OCS)

In some embodiments, an Object Conversion System (OCS) is used as an object conversion machine that receives an input object (JSON or non-JSON) and produces a pruned and/or flatter object (JSON or non-JSON) as output by extracting only the specified attributes from the input object based on an Object Conversion (mapping) Specification (OCS Specification) for such a conversion. A non-JSON object may be an instance of a domain model class. Some terms used in the disclosure herein:

OCS Grammar: An extensible set of rules, including syntax, for textually describing a mapping between two object-oriented systems in a declarative way.

OCS Specification: A textual specification that is based on an OCS Grammar and includes information for defining a mapping between two object-oriented systems.

There are many advantages of defining a mapping specification textually in a declarative way instead of in a programmatic way or in a graphical way. Any text editor can be used to create a declarative specification. It is often easier to write, comprehend, and modify than program code. Even a non-programmer, e.g., a business person, can write and understand a declarative specification because it does not involve writing or modifying programmatically executable statements. A declarative mapping specification may also be shared easily.

An OCS Data Structure Creation Unit is preferably routines or tools to generate the OCS Data Structure using an OCS Specification. In one embodiment, the OCS Data Structure Creation Unit parses the OCS Specification as per the OCS Grammar specified and builds the OCS Data Structure.

An Object Conversion Unit (OCU) performs the conversion of objects between two object models using OCS Data Structure.

An Object Call Processing Unit intercepts Application Programming Interface (API) level calls for object manipulation (convert, etc.) and executes those using an Object Conversion Unit.

An Object Exchange Unit executes in accordance with the OCS specification, and is the programs/routines that operate to convert data amongst object models. The Object Exchange Unit preferably comprises an Object Call Processing Unit, an OCS Data Structure Creation Unit, an Object Conversion Unit, and an OCS Data Structure.

An OCS system uses an Object Exchange Unit to perform the object conversion between two object models. A declarative OCS Specification provides an operational formula for an Object Exchange Unit.

FIG. 21 is one embodiment of OCS Grammar. An OCS Grammar is an extensible set of rules, including syntax, for textually describing a mapping between two object-oriented systems in a declarative way.

FIG. 22 is a table that shows one embodiment of an OCS Data Structure. In a preferred embodiment, the OCS Data Structure is based on an OCS Specification, and contains information about a mapping between two object-oriented systems.

This embodiment includes, OCS Data Structure including OutputAttribInfo, VirtualOutputAttribInfo, OutputClassInfo, AttribInfo, InputAttribInfo, ComplexAttribInfo, VirtualComplexAttribInfo, VirtualInputComplexAttribInfo, ClassInfo, InputClassInfo, ReferenceKeyInfo, CollectionClassInfo, OCSinfo and QueryInfo.

AttribInfo or InputAttribInfo for a particular attribute in an object system includes its name and type.

VirtualAttribInfo or VirtualInputAttribInfo for a particular virtual attribute includes its name and type.

ComplexAttribInfo for a particular complex attribute includes information about the referenced object, or collection of objects, the referencing attributes, and the containment of the referenced object.

VirtualComplextAttribInfo, similar to ComplexAttribInfo, includes information about a complex virtual attribute.

OutputAttribInfo or VirtualOutputAttribInfo for a particular attribute in an object system includes its name and type.

OutputClassInfo includes the target class name, OutputAttribInfo list, and OutputVirtualAttribInfo list.

ReferenceKeyInfo includes information about the primary and reference keys of a class.

ClassInfo or InputClassInfo for a particular source class includes the className, OutputClassInfo, AttribInfo list, VirtualAttribInfo list, ComplexAttribInfo list, VirtualComplexAttribInfo list, and ReferenceKeyInfo list for that class.

CollectionClassInfo includes ClassInfo information, collection types, containment type, and order by attributes.

QueryInfo includes information about making a query call to fetch objects: query name, query URL, InputClassInfo, query parameters, etc.

OCSInfo includes uniform resource locator (url), OCS id, InputClassInfo list, OutputClassInfo list, and QueryInfo list.

OCS Data Structure is created by an OCS Data Structure Creation Unit using an OCS Specification describing object conversion mapping. The OCS Specification is parsed as per the OCS Grammar and each construct of the OCS Grammar is used to create the OCS Data Structure. For example, each <INPUT-CLASS-SPEC> creates an instance of ClassInfo or InputClassInfo. Each <INPUT-ATTRIB-SPEC> is used to create an instance of AttribInfo or VirtualAttribInfo. The reflection facility of the language may also be used to create the instances of AttribInfo Each <OUTPUT-CLASS-SPEC> creates an instance of OutputClassInfo. Each <OUTPUT-ATTRIB-SPEC> is used to create an instance of OutputAttribInfo or VirtualOutputAttribInfo. Each <COLLECTION-CLASS-SPEC> creates an instance of CollectionClassInfo An <IGNORE-ATTRIBS-SPEC> is used to ignore the mappings for specified attributes. <PRIMARY-KEY-SPEC> and <REFERENCE-KEY-SPEC> are used to create instances of ReferenceKeyInfo. <RELATIONSHIP-SPEC> is used to create the instances of ComplexAttribInfo. A <VIRTUAL-ATTRIB-SPEC> creates an instance of VirtualAttribInfo. A <VIRTUAL-COMPLEX-ATTRIB-SPEC> creates an instance of VirtualComplexAttribInfo. Default instances of OutputAttribInfo may be created corresponding to the instances of AttribInfo or VirtualAttribInfo. A <VIRTUTAL-OUTPUT-ATTRIB-SPEC> may override the default information in an OutputAttribInfo instance. A <QUERY-SPEC> creates an instance of QueryInfo containing the pertinent information for making a query to get input objects.

Once the internal data structures have been built using data from the OCS Specification, each input and output class is fully understood in terms of its different components and how they can be used for converting data.

In the present invention, the path expressions may be used to specify mapping for a desired selected subset of attributes in an object (JSON or non-JSON) graph. Since one can uniquely specify a particular attribute in an object graph using a path expression, that path expression can serve as the attribute name for defining its mapping. The present invention uses a concept of a Virtual Attribute to facilitate mapping specification for an attribute identified with a path expression or for an attribute of a JSON or non-JSON object. The mapping specification for a Virtual Attribute may be defined declaratively using the keywords VIRTUAL_ATTRIB, VIRTUAL_INPUT_ATTRIB, or VIRTUAL_OUTPUT_ATTRIB. The OCS Data Structure uses the data structure of VirtualAttribInfo for such a Virtual Attribute such that VirtualAttribInfo is a subclass of AttribInfo and provides additional functionality of tracking the Virtual Attribute value for an object keyed to the object in a hashtable. Here is an exemplary grammar for defining an OCS specification for classes comprising the object-oriented systems. For a more detailed example of an exemplary OCS Grammar, please see FIG. 21.

INPUT_CLASS <InputClassName>[OUTPUT_CLASS <OutputClassName>]
VIRTUAL_ATTRIB <InputAttribName> ATTRIB_TYPE <Type>
[VIRTUAL_OUTPUT_ATTRIB <OutputAttribName>]-
;

In the above grammar, <InputClassName> specifies the name of a class (JSON or non-JSON) whose instances need to be converted by the OCS. For JSON objects to be input, the name of a corresponding subclass of JSONObjectContainer class may be specified as <InputClassName>. For regular domain objects to be input, the name of a related subclass of ObjectContainer class may be specified as <InputClassName>.

<OutputClassName> is the name of the target (JSON or non-JSON) class that should be instantiated and initialized by the OCS. For JSON objects to be output, the name of a corresponding subclass of JSONObjectContainer class may be specified as <OutputClassName>. A non-JSON output class may be a class implementing the GetSet interface or a subclass of the ObjectContainer class. If <OutputClassName> is not explicitly specified, the OCS may create a regular JSON object.

<InputAttribName> is the name of an attribute of the class identified by <InputClassName>. An <InputAttributeName> may be a path expression. Every attribute of the class <InputClassName> need not be specified in an OCS Specification. The unspecified attributes would be ignored during the conversion process, resulting in a pruning effect for the incoming object.

<OutputAttribName> is the name of the attribute to be created in the target object corresponding to the <InputAttribName> of the class <InputClassName>. If <OutputAttribName> is not specified, the default attribute name in the target object would be the same as <InputAttribName>. If an <OutputClassName> is specified, its accessor methods should be able to handle the configured <OutputAttribName> s or the default <InputAttribName>s of the specified attributes.

An OCS Specification can have specifications for one or more input classes.

The following is an example of an OCS Specification. Let us suppose that an original object obj1 created with the JSON data retrieved from the weather service openweathermap.org is an instance of class com.example.model.JSON_Weather. If the objects of that class need to be converted into a regular JSON object, the conversion specification may be defined as follows:

INPUT_CLASS com.example.model.JSON_Weather
VIRTUAL_ATTRIB name ATTRIB_TYPE java.lang.String
VIRTUAL_OUTPUT_ATTRIB cityName
VIRTUAL_ATTRIB dt ATTRIB_TYPE int VIRTUAL_OUTPUT_ATTRIB date
VIRTUAL_ATTRIB main.temp ATTRIB_TYPE double
VIRTUAL_OUTPUT_ATTRIB temperature
VIRTUAL_ATTRIB main.pressure ATTRIB_TYPE double
VIRTUAL_ATTRIB main.humidity ATTRIB_TYPE double
VIRTUAL_ATTRIB wind.speed ATTRIB_TYPE double
;

With the above specification, an object obj1 of class com.example.model.JSON_Weather would be converted into a regular JSON object (since no <OutputClassName> is specified) obj2 with the following attribute names: cityName, date, temperature, main.pressure, main.humidity, and wind.speed corresponding to the attributes name, dt, main.temp, main.pressure, main.humidity, and wind.speed in the original object obj1. All other attributes of obj1 that are not specified in the conversion specification would be ignored during the conversion.

Here is a possible API (Application Programming Interface) that can be provided by OCS or OCU for such a conversion:

Object convert(Object inputObject);

One embodiment of the (API) "convert" may be implemented as follows. The OCU would inspect the inputObject to obtain its class name and then look up the corresponding conversion specification information from the OCS Data Structure based on the given OCS Specification. Then, the OCU would instantiate an output object of the specified (or default) output class corresponding to the input class of the inputObject. This instantiation may be achieved using the reflection facility of a programming language. Next, the OCU would selectively pick and retrieve the value of each of the attributes of inputObject specified through <ATTRIB-SPEC>s and initialize the corresponding output attributes of the output object with those values. The retrieval of an attribute value from inputObject may be achieved using the reflection facility of a programming language. If the attribute name of an inputObject is specified as the path expression in the OCS Specification, then the previously described EnhancedJSONObject or something similar, for example the ObjectContainer class described in FIGS. 42A and 42B, may be used to retrieve the value of the corresponding attribute. The initialization of the output attribute value of the output object may be achieved using the reflection facility of a programming language or by using a standard put method of a JSONObject. The output object thus created and initialized will be returned as the converted object.

The ObjectContainer class described in FIGS. 42A and 42B may be used by the OCU to encapsulate the mapped input class object implementing the GetSet interface such that the reflective calls made by the OCU to the generic method getAttribValue( ) of the ObjectContainer object to get an attribute value will be delegated properly to the underlying input class object to be converted. The ObjectContainer's getAttribValue( ) method will also appropriately take care of any attributes named with a path expression by calling the method getWithPathExpression( ).

Figure 23:
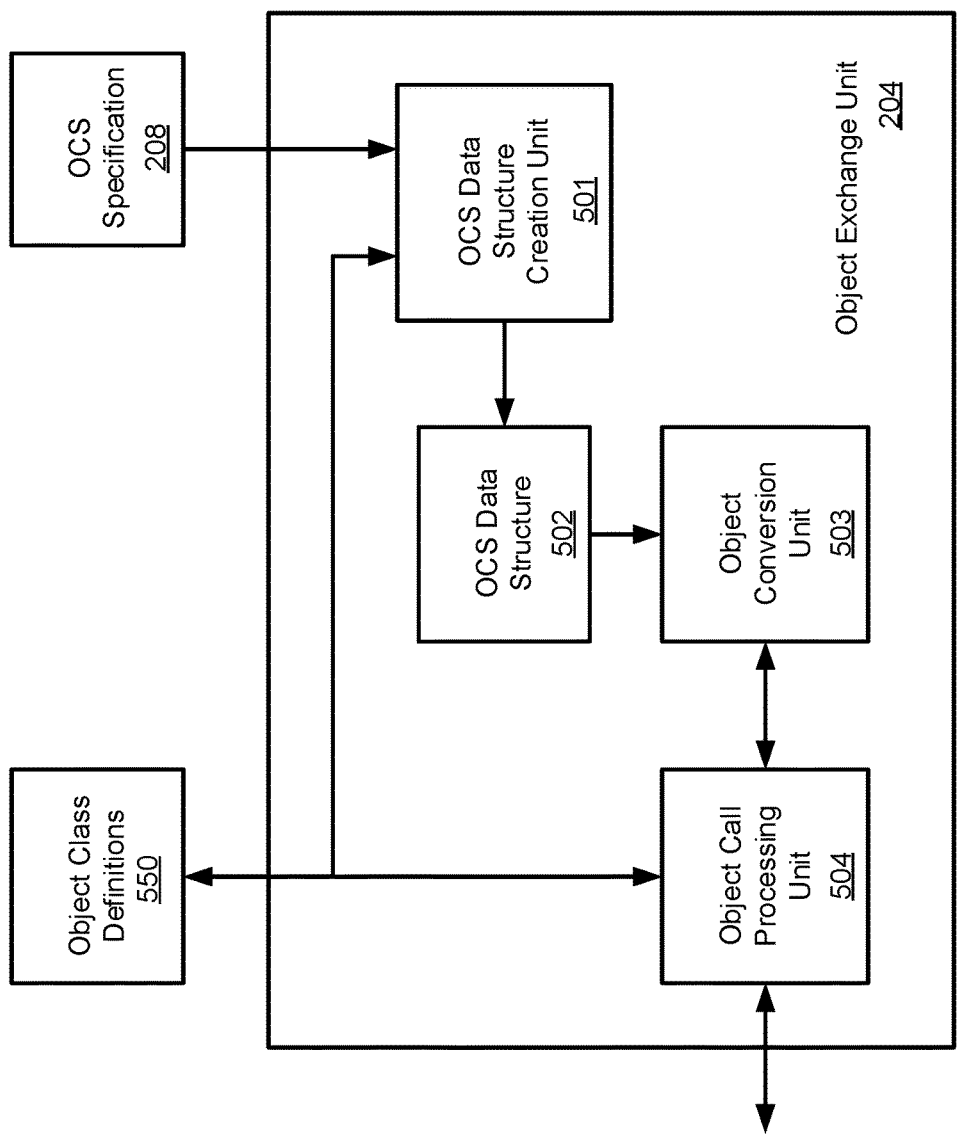
FIG. 23 is a block diagram of an object exchange unit.

FIG. 23 is one embodiment of an Object Exchange Unit 204.

An OCS Data Structure Creation Unit 501 receives the OCS specification 208 and generates OCS data structure 502.

An Object Call Processing Unit 504 processes object calls from applications by communicating with the Object Conversion Unit 503. The Object Conversion Unit 503 uses the OCS data structure 502 to communicate with the target objects using object class definitions 550. In some embodiment, an Object Call Processing Unit 504 may be combined with the Object Conversion Unit 503.

Figure 24:
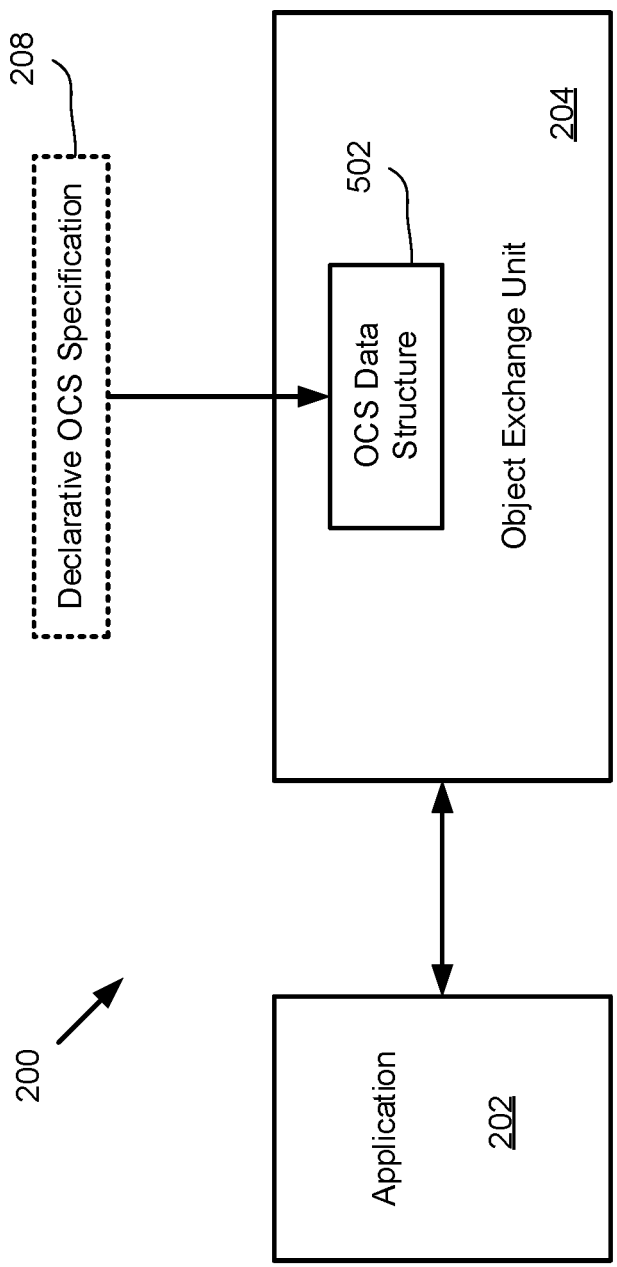
FIG. 24 is a high level illustration of an OCS System using an OCS Data Structure produced from a declarative OCS Specification and interacting with an Application.

FIG. 24 is a block diagram of an OCS System using an OCS Data Structure produced from a declarative OCS Specification and interacting with an Application.

Figure 25:
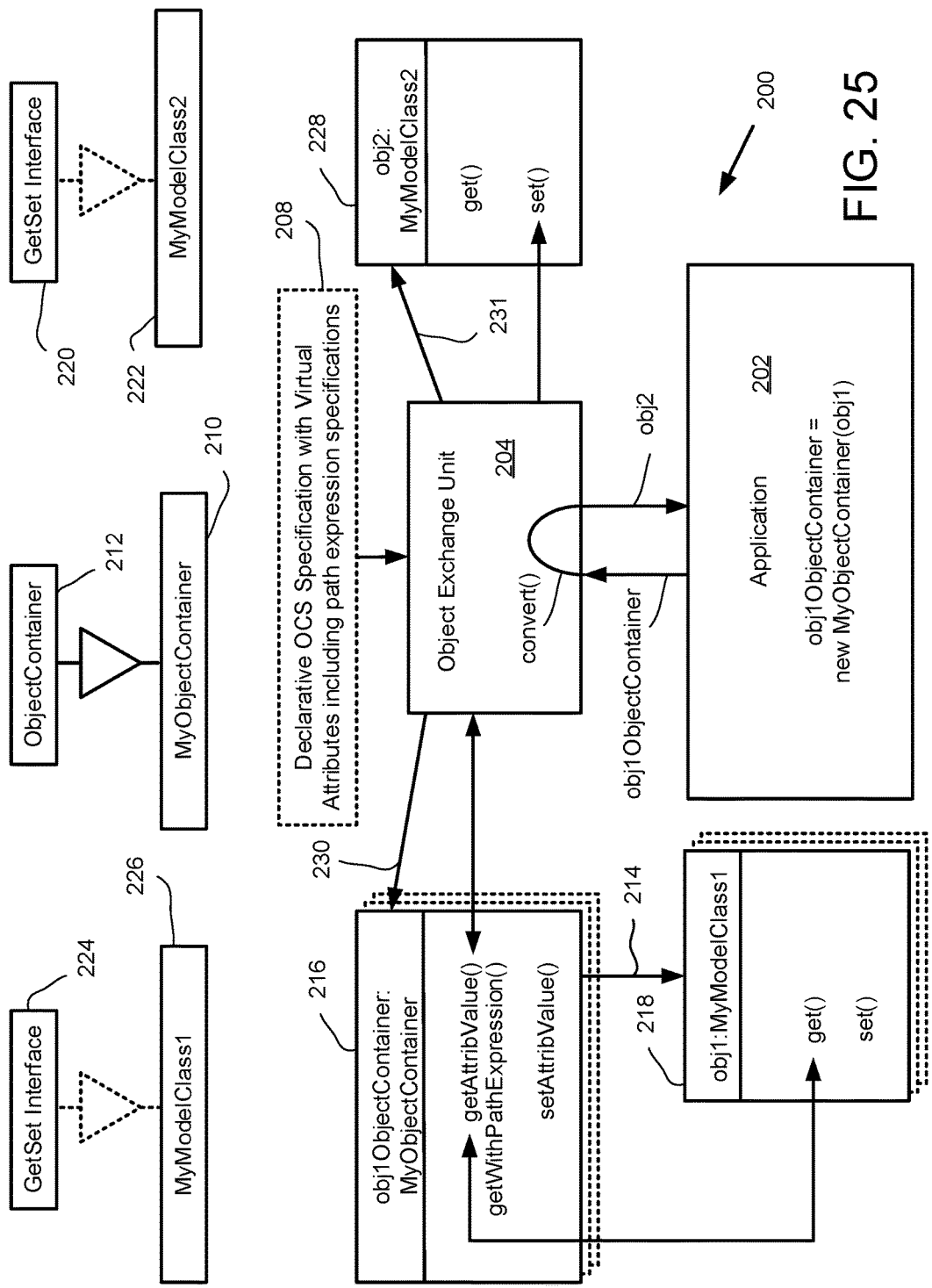
FIG. 25 is an OCS System performing conversion of a contained domain model object into another domain model object using a declarative OCS Specification with path expressions.

FIG. 25 illustrates an embodiment of an object conversion system (OCS) 200.

The OCS system 200 includes an application 202. In some embodiments, the application 202 is software running on a general purpose computing device, such as a desktop computer, notebook computer, mobile phone, or tablet. In other embodiments, the application may be software running on special-purpose hardware, such as embedded systems for a self-driving car, or control systems for robotic devices. While previous illustrations have discussed embodiments that use weather information, it will be clear to one skilled in the art that the application is not limited to any particular information.

The application 202 creates or gets an object obj1 218 to be converted into obj2 228 of a domain model class MyModelClass2 222 as per an OCS specification 208.

The application 202 creates obj1ObjectContainer 216 of the corresponding ObjectContainer 212 subclass MyObjectContainer 210 for obj1.

The application 202 invokes the convert( ) method on the OCS passing the previously created object obj1ObjectContainer.

The OCS finds the name of the mapped input class (MyObjectContainer) corresponding to the object obj1ObjectContainer. A reflection facility may be used to find the class of an object.

The OCS finds the mapping information object inputClassInfo, an instance of ClassInfo or InputClassInfo, for the mapped input class (MyObjectContainer) in the OCS data structure.

The OCS also finds the associated mapping information object outputClassInfo, an instance of ClassInfo or OutputClassInfo, for the mapped output class MyModelClass2 in the OCS data structure.

The OCS creates an empty object obj2 228, an instance of the output class MyModelClass2.

For each of the AttribInfo or InputAttribInfo or VirtualAttribInfo or VirtualInputAttribInfo object (e.g., attribInfo1) in inputClassInfo, the OCS does the following:

Invokes the getAttribValue( ) method with the name of the attribute on the object obj1ObjectContainer 216; such invocation may be done using a reflection facility of the underlying programming language.

The getAttribValue( ) method of obj1ObjectContainer 216 gets the value of the named input attribute of the object obj1 using its accessor method (get) as explained in FIG. 17. If a path expression is involved in the name of the attribute, getAttribValue( ) method takes care of getting the corresponding value of the nested attribute using the getWithPathExpression( ) method.

Identifies the OutputAttribInfo object, attribInfo2, corresponding to attribInfo1.

The value of the input attribute previously retrieved is used to initialize the corresponding output attribute of obj2 228 by using its accesor method (e.g., set( ).

After all the values of the configured input attributes of obj1 218 are retrieved and correspondingly assigned to the output attributes of obj2 228, the convert( ) method returns the object obj2 228 to the application 202.

If the mapping specification does not specify mappings for all the attributes of the input object, the resulting object obj2 will represent a pruned state of the input object obj1.

If the mapping specification involves path expression for one or more nested attributes of the input object, the resulting object obj2 will represent a flattened state of the input object obj1.

Other embodiments of ORM and OCS data structure may include other information and may be organized differently within the scope and spirit of this disclosure.

Figure 26:
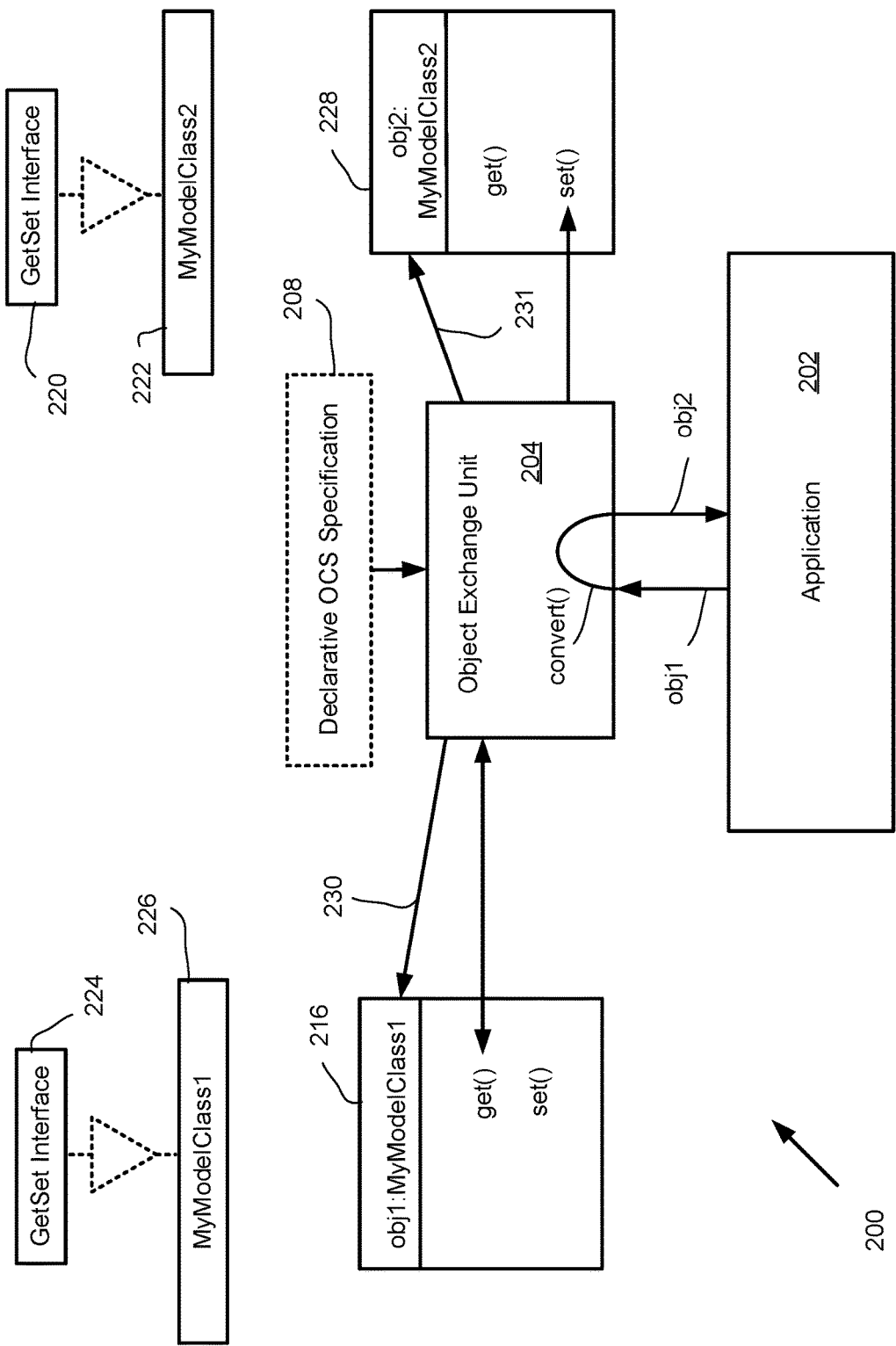
FIG. 26 is an OCS System performing conversion of a domain model object into another domain model object using a declarative OCS Specification.

FIG. 26 illustrates another embodiment of an object conversion system (OCS).

This embodiment of the object conversion system converts, flattens and/or prunes an input domain model object to create an output domain model object. This embodiment works similarly to that shown in FIG. 25, however in this embodiment, the Application 202 passes obj1 to the Object Conversion System 204 without a container.

The object conversion system invokes a get method directly on the instance obj1 of domain model class MyModelClass1 226.

After the object conversion system receives the selected attribute values of obj1, and invokes the set( ) method for the selected attributes to assign the outputs to the instance obj2 of the domain model class MyModelClass2 222, the object obj2 is returned to the Application 202.

Figure 27:
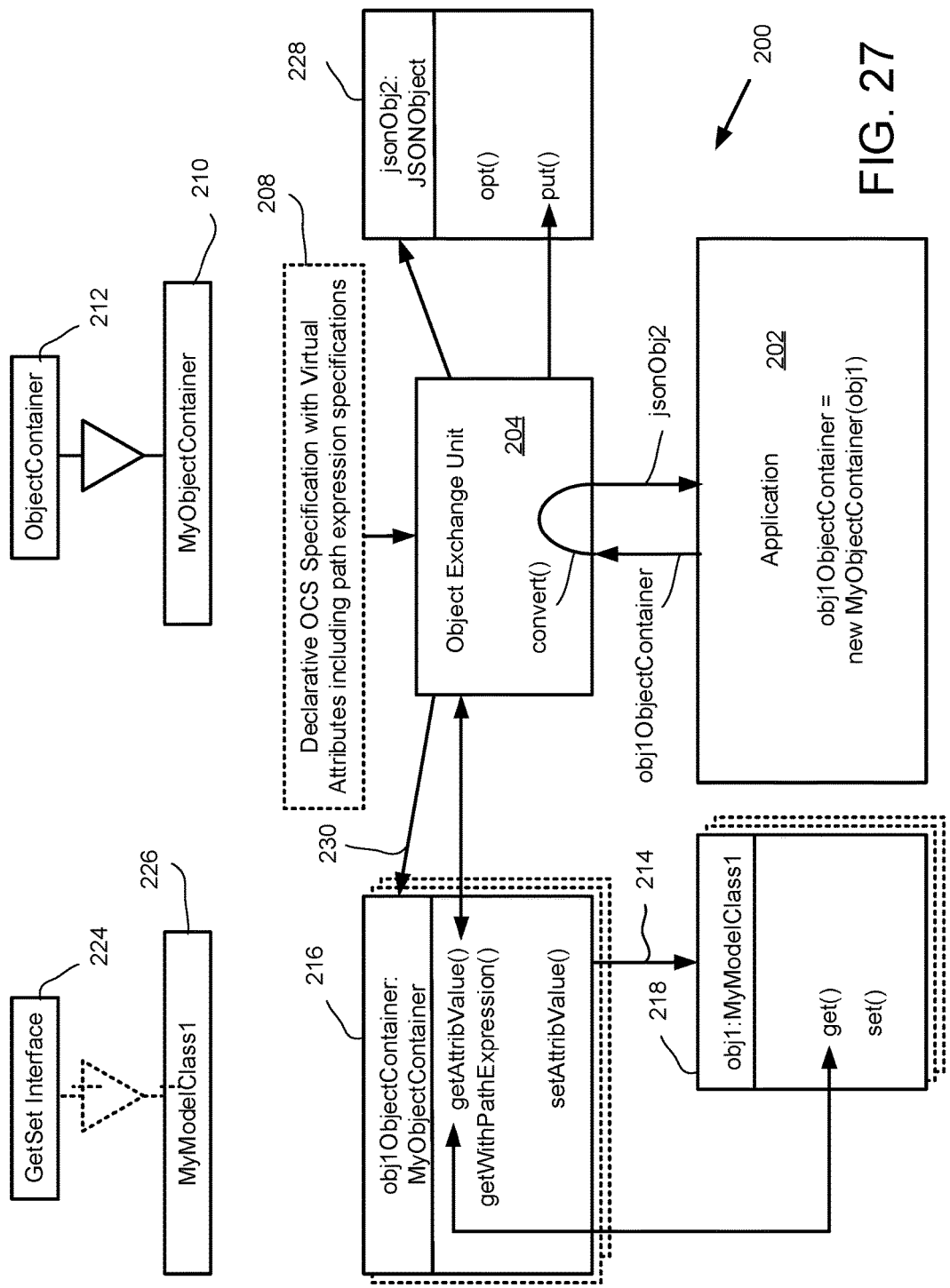
FIG. 27 is an OCS System performing conversion of a contained domain model object into a JSON object using a declarative OCS Specification with a path expression.

FIG. 27 illustrates another embodiment of an object conversion system (OCS).

This embodiment of the object conversion system converts, flattens and/or prunes an input domain model object to create an output JSONObject.

On the input side of the OCS System, this embodiment works similarly to that shown in FIG. 25, with regard to the Application generating a contained object obj1ObjectContainer, and the OCS system accessing the obj1 on MyModelClass1 through the container.

On the output side of the OCS System, the OCS system creates a jsonObj2 and then invokes a put( ) method for each configured input attribute to update the JSONObject directly and then jsonObj2 is passed to the Application.

Figure 28:
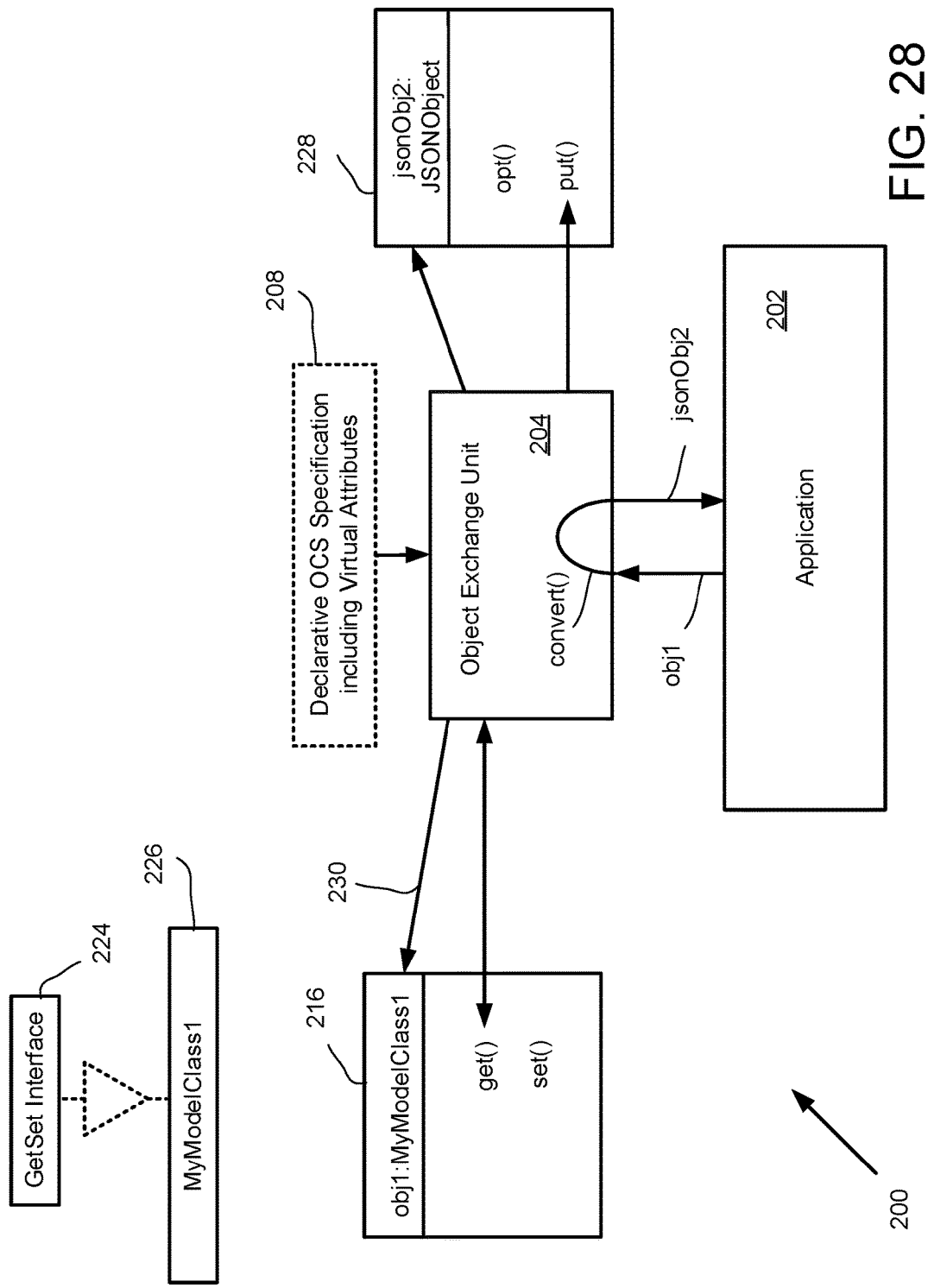
FIG. 28 is an OCS System performing conversion of a domain model object into a JSON object using a declarative OCS Specification.

FIG. 28 illustrates another embodiment of an object conversion system (OCS).

This embodiment of the object conversion system converts, flattens and/or prunes an input domain model object to create an output JSONObject.

On the input side of the OCS System, this embodiment works similarly to that shown in FIG. 26, with regard to the Application passing obj1 to the Object Conversion System 204 without a container. The object conversion system then invokes a get method directly on the instance of obj1 on domain model class MyModelClass1.

On the output side of the OCS System, the OCS system works similar to the embodiment shown in FIG. 27. The OCS System creates a jsonObj2 and then invokes a put( ) method for each configured input attribute to update the JSONObject directly and the OCS System passes jsonObj2 to the Application.

However in this embodiment, the Application 202 passes obj1 to the Object Conversion System 204 without a container.

On the output side of the OCS System, the OCS system invokes a put( ) method to update the JSONObject directly and then jsonObj2 is passed to the Application.

Figure 29:
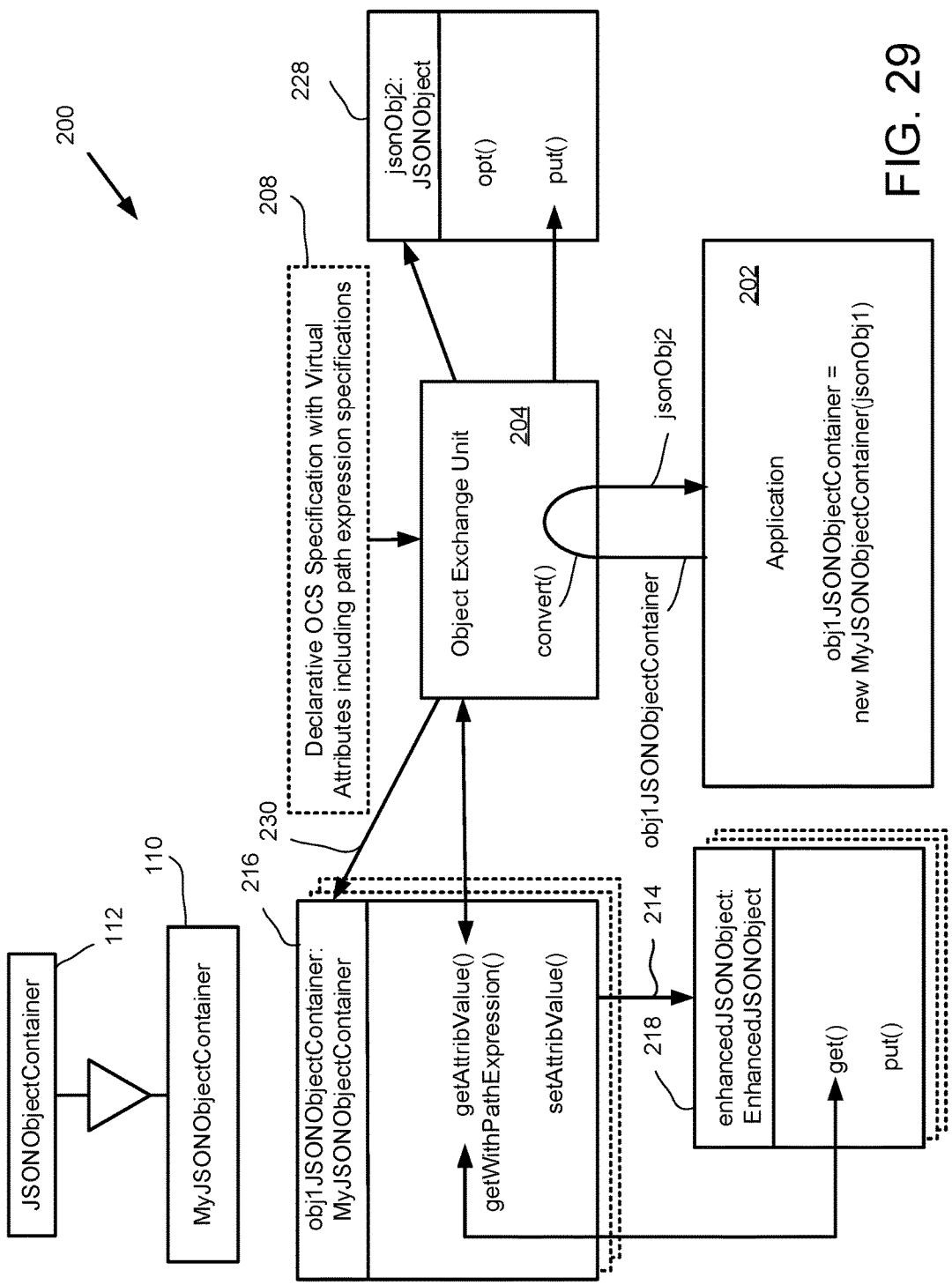
FIG. 29 is an OCS System performing conversion of a contained JSON object into a JSON object using a declarative OCS Specification with a path expression.

FIG. 29 illustrates another embodiment of an object conversion system (OCS).

This embodiment of the object conversion system converts, flattens and/or prunes an jsonObj1 to create an output jsonObj2.

On the input side of the OCS System, the Application creates a container object obj1JSONObjectContainer, and the OCS system accesses the JSON object jsonObj1 through the container.

On the output side of the OCS System, the OCS system invokes a put( ) method to update the JSONObject directly and then jsonObj2 is passed to the Application.

Figure 30:
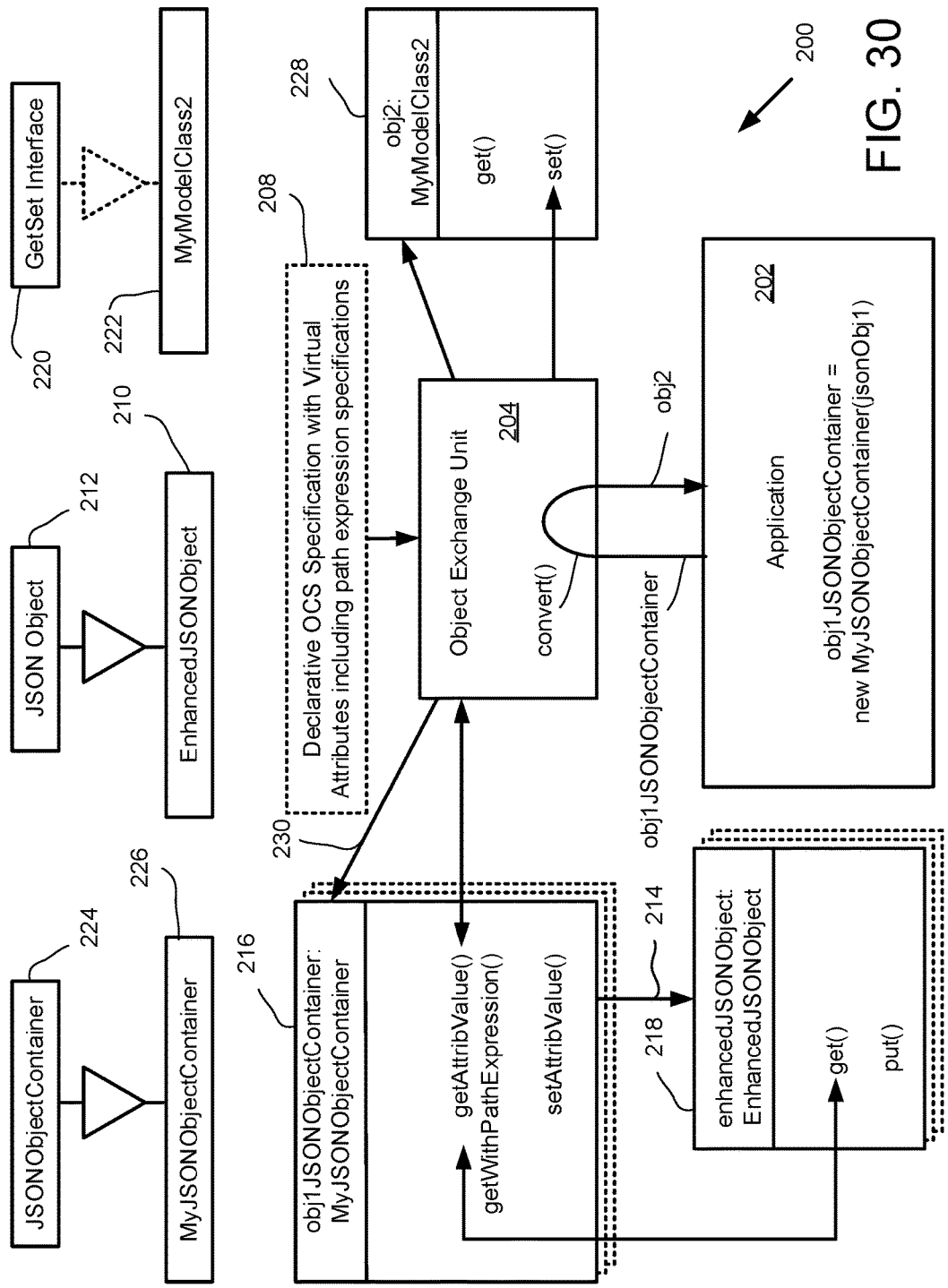
FIG. 30 is an OCS System performing a conversion of a contained JSON object into a domain class object using a declarative OCS Specification with a path expression.

FIG. 30 illustrates another embodiment of an OCS system where a JSON object is converted into a domain model object.

An application creates or gets a JSON object (jsonObj1) that needs to be converted into an instance of a domain model class MyModelClass2 as per an OCS specification.

The application creates an instance (obj1JSONObjectContainer) of the corresponding JSONObjectContainer subclass (MyJSONObjectContainer) for jsonObj1.

As part of creation of obj1JSONObjectContainer, an EnhancedJSONObject instance (enhancedJSONObject) corresponding to jsonObj1 is instantiated and its reference is saved in obj1JSONObjectContainer.

The application invokes the convert( ) method on the OCS passing the previously created object obj1JSONObjectContainer.

The OCS finds the name of the mapped input class (MyJSONObjectContainer) corresponding to the object obj1JSONObjectContainer. A reflection facility may be used to find the class of an object.

The OCS finds the mapping information object inputClassInfo, an instance of ClassInfo or InputClassInfo, for the mapped input class (MyJSONObjectContainer) in the OCS data structure.

The OCS also finds the associated mapping information object outputClassInfo, an instance of ClassInfo or OutputClassInfo, for the mapped output class MyModelClass2 in the OCS data structure.

The OCS creates an empty object obj2, an instance of the output class MyModelClass2.

For each of the AttribInfo or InputAttribInfo or VirtualAttribInfo or VirtualInputAttribInfo object (let's call it attribInfo1) in inputClassInfo, the OCS does the following:

Invokes the getAttribValue( ) method with the name of the attribute on the object obj1JSONObjectContainer; such invocation may be done using a reflection facility of the underlying programming language.

The getAttribValue( ) method of obj1JSONObjectContainer invokes the get( ) method on enhancedJSONObject to get the value of the named input attribute of the JSON object jsonObj1. If a path expression is involved in the name of the attribute, enhancedJSONObject takes care of getting the corresponding nested value using the getWithPathExpression( ) method. See FIG. 8A for the details of how path expression may be evaluated.

Identifies the OutputAttribInfo object, attribInfo2, corresponding to attribInfo1

The value of the input attribute previously retrieved is used to initialize the corresponding output attribute of obj2 object by using its accesor method (e.g., set( ).

After all the values of the configured input attributes of jsonObj1 are retrieved and correspondingly assigned to the output attributes of obj2, the convert( ) method of OCS returns the object obj2 to the caller application.

If the mapping specification does not specify mappings for all the attributes of the input JSON object, the resulting object obj2 will represent a pruned state of the input object jsonObj1.

If the mapping specification involves path expression for one or more nested attributes of the input JSON object, the resulting object obj2 will represent a flattened state of the input object jsonObj1 such that the value of a nested attribute will be assigned to a top-level attribute of the resulting object obj2.

This concludes the description of how an OCS can perform conversion of a JSON object into a potentially leaner and flatter domain model object.

FIGS. 43-46 provide examples of some inter-connected input and output classes. Furthermore, FIG. 47 provides a representative implementation of how the ObjectContainer class may be used to retrieve values involving path-expressions. The OCU and the OR Mapping Unit could use similar methodologies, possibly using the reflection facility of the underlying programming language, to invoke getAttribValue( ) and setAttribValue( ) method calls, for retrieving attribute values and setting attribute values as per an OCU Specification or an ORM Specification.

Object Augmentation: The present invention may also be used to augment objects with extra attributes, which were not present in the original objects. For example, in the mapping specification for a subclass of the JSONObjectContainer class (say MyJSONObjectContainer), one may define a VIRTUAL_ATTRIB specification for an attribute (e.g. newAttrib), which is not originally present in the corresponding input JSON object. Further, in the MyJSONObjectContainer class, one may define an explicit getter method (e.g., getNewAttrib( ), which returns the relevant value for the newAttrib attribute based on some business logic. Now, the ORM system will save the newAttrib value in the database along with the values of the other specified attributes of the input JSON object. While retrieving the saved object from the database, the ORM system will use either an explicitly defined setNewAttrib( ) method or use the default setAttribValue( ) method to initialize the value of newAttrib attribute in the output object. Hence the new output object will have the extra newAttrib attribute, which was not present in the original input JSON object. By providing multiple VIRTUAL_ATTRIB specifications, one may augment the output JSON objects with multiple extra attributes.

A similar mechanism may be used for an OCS system to create extra attributes in the output objects.

The following multiple application scenarios (architectures) may be supported by the invention:

Scenario 1: Application supplies the original object and makes the conversion call to OCS: In this architectural scenario, the user application somehow (a) creates or (b) retrieves the original object obj1 (JSON or non-JSON) and then invokes the OCS with obj1 as a parameter. The OCS converts obj1 into obj2 based on the OCS Specification and returns obj2 to the application. The application uses obj2 as per the business logic.

Scenario 2: Application makes an OCS call and OCS pulls the original object from a designated source and does the conversion: In this architectural scenario, the user application makes a call to the OCS with relevant parameters, such that the OCS pulls the original object obj1 ((JSON or non-JSON) from a designated source, which may be in a cloud, as per the supplied parameters, converts obj1 into obj2 based on the OCS Specification, and returns obj1 and/or obj2 to the application. The application uses obj1 and/or obj2 as per the business logic. This OCS call may also return a list of objects if the designated source supplies multiple objects.

In both of the above scenarios, before being returned to the application, obj1 or obj2 may optionally be persisted into a relational database based on an ORM mapping specification.

Figure 31:
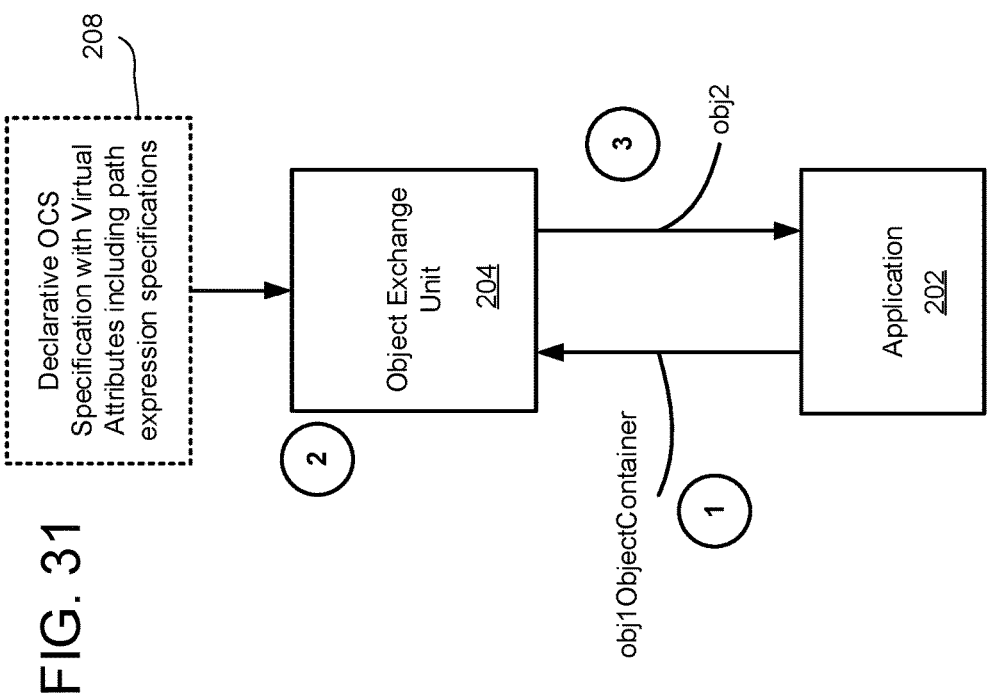
FIG. 31 is an OCS System performing a conversion of a contained domain class object into a domain class object using a declarative OCS Specification.

FIG. 31 shows scenario 1; an OCS is initialized with a declarative OCS Specification; the application creates the original object (obj1), makes the conversion call to the OCS System, and then uses the converted object (obj2).

Figure 32:
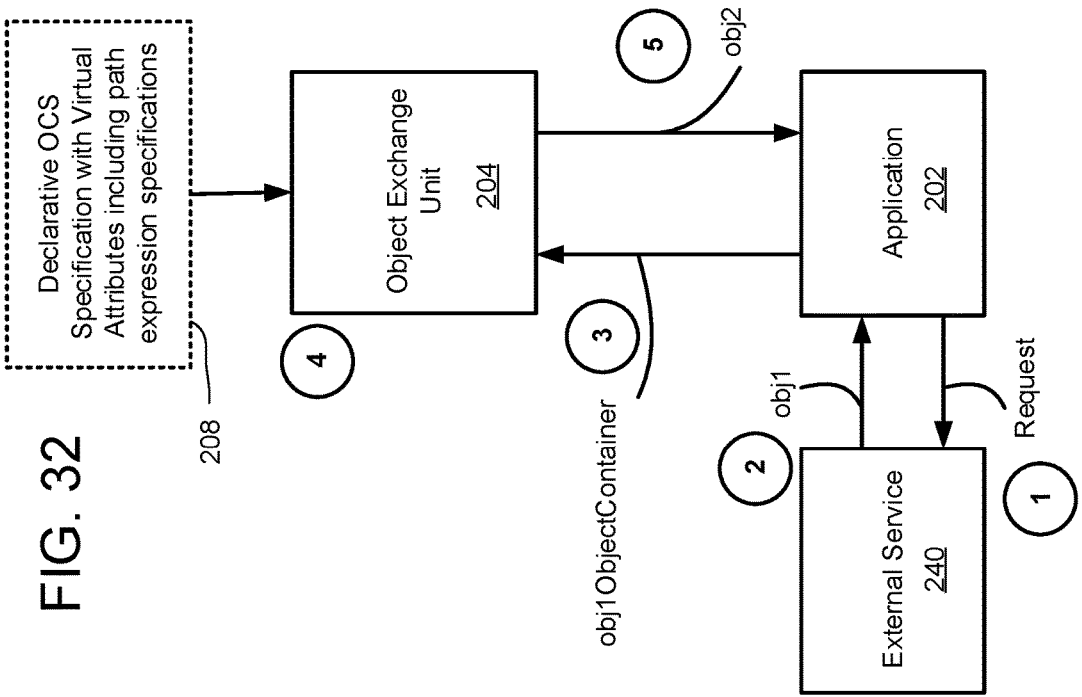
FIG. 32 is an OCS System performing a conversion of a contained domain class object into a domain class object using a declarative OCS Specification with a path expression and an External Service providing the domain class object.

FIG. 32 shows an OCS is initialized with a declarative OCS Specification; the application retrieves the original object (obj1) from an external service, makes the conversion call to the OCS, and then uses the converted object (obj2).

Figure 33:
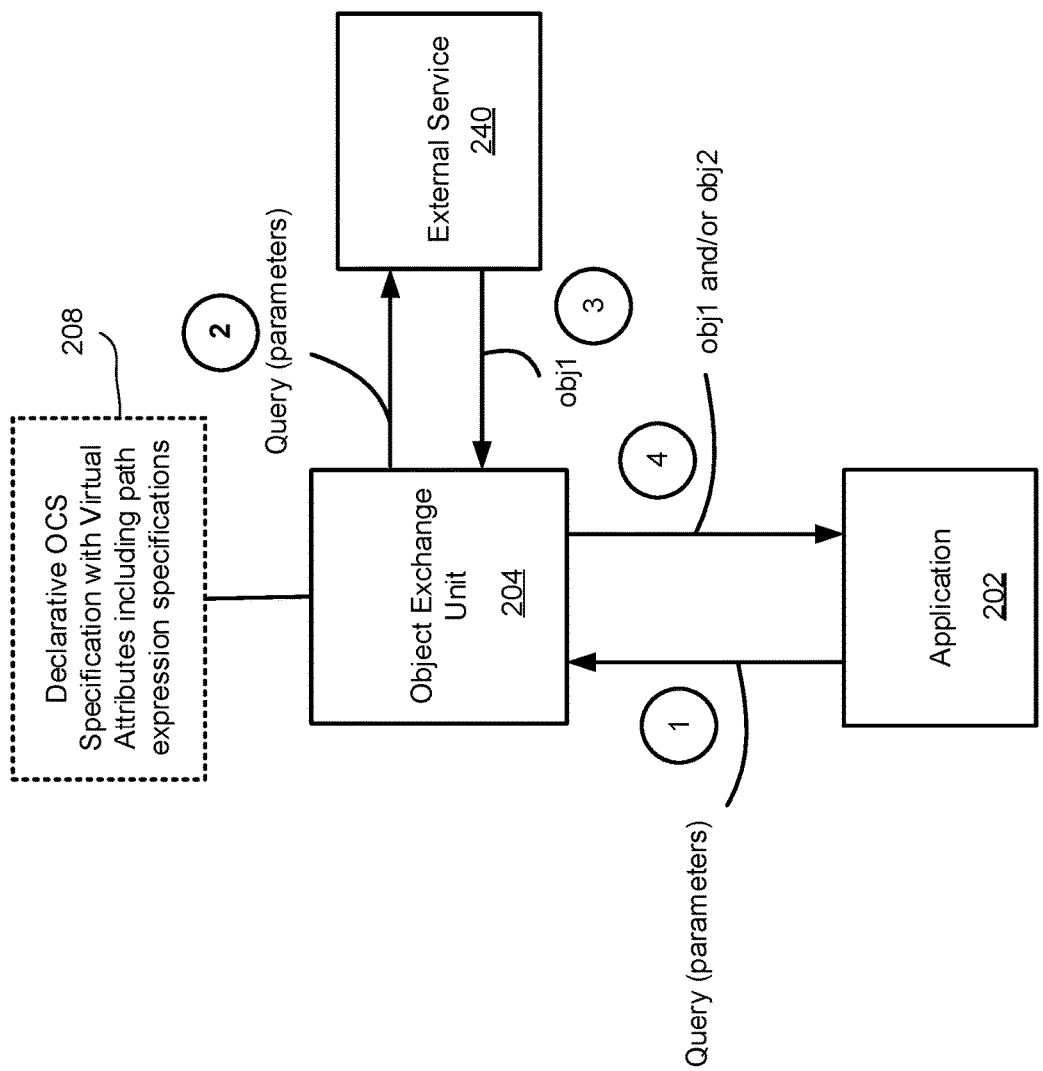
FIG. 33 is an OCS System coupled to receive queries from an application and accessing an External Service to query an object for subsequent conversion.

Now, in scenario 1, as explained before, OCS may expose an API like the following:
　　Object convert(Object inputObject);

FIG. 33 shows scenario 2; an OCS is initialized with a declarative OCS Specification; the application makes a query call to the OCS with appropriate parameters; the OCS retrieves the original object (obj1) from an external service using the passed parameters; the OCS converts obj1 to obj2 and then returns obj1 and/or obj2 to the application; the application uses the retrieved object (obj1) and/or the converted object (obj2).

For scenario 2, where the OCS pulls the original object (JSON or non-JSON) by issuing a query to a designated source using appropriate URL and parameter values, we can provide a query method as follows:
　　List query(String queryName, String inputClassName,
　　　　List params);

Here, the queryName identifies a pre-defined query for the given class named inputClassName. The pre-defined query specifies the query URL and other parameters to make the call to some service (e.g., a web service or a RESTful service) to get the required objects. Such query may be specified in the declarative OCS Specification for the class inputClassName.

A query method may also be defined to take the query string (URL) and other associated information as parameters to the query method instead of taking a pre-defined queryName as a parameter. For example:
　　List query(String queryURL, String inputClassName, List
　　　　params);

The params parameter specifies any parameter values which may need to be provided at runtime for the query call. These params typically serve as the values to be replaced in the query URL for placeholders like "?". An example of such parameter could be a city name for a weather service call. If the query does not require any parameter value, params may be null or empty.

The OCS uses the query with appropriate parameter values to pull the required objects from the appropriate source (e.g., a web service or a RESTful service) and then applies the <ATTRIB-SPEC>s of the inputClassName class to convert the pulled objects into objects of outputClassName class. The resulting list of one or more objects of outputClassName class are returned to the user application as a return value of this query API.

For example, to retrieve the JSON_Weather data using the RESTful API provided by openweathermap.org, one may define a <QUERY-SPEC> in the <CLASS-SPEC> for JSON_Weather as follows:
　　INPUT_CLASS com.example.model.JSON_Weather
　　　　VIRTUAL_ATTRIB name ATTRIB_TYPE java.lang.String
　　　　VIRTUAL_OUTPUT_ATTRIB cityName
　　　　VIRTUAL_ATTRIB dt ATTRIB_TYPE int VIRTUAL_OUTPUT_ATTRIB date
　　　　VIRTUAL_ATTRIB main.temp ATTRIB_TYPE double
　　　　VIRTUAL_OUTPUT_ATTRIB temperature
　　　　VIRTUAL_ATTRIB main.pressure ATTRIB_TYPE double
　　　　VIRTUAL_ATTRIB main.humidity ATTRIB_TYPE double
　　　　VIRTUAL_ATTRIB wind.speed ATTRIB_TYPE double
　　　　QUERY_NAME OpenWeatherQuery QUERY_URL api.openweathermap.org/data/2.5/weather?q='?'
　　;

And then an application can retrieve the weather information for the city Paris using the following API call:
　　query("OpenWeatherQuery", "com.example.model.JSON_Weather", params);

where the city name "Paris" is passed as the only element in a list referenced by the params parameter. This call will return a list of one JSON object with attribute names cityName, date, temperature, main.pressure, main.humidity, and wind.speed which are initialized from the weather object data retrieved by the OCS by using a URL of api.openweathermap.org/data/2.5/weather?q=Paris.

This API call of query will be processed by the OCS in the following way:

First, based on the OCS Data Structure created from the OCS Specification for the class com.example.model.JSON_Weather, the query string corresponding to the query OpenWeatherQuery is retrieved. Then the value of the city name "Paris" passed through the params parameter is used to create the following query URL to pull the weather object data from openweathermap.org:

api.openweathermap.org/data/2.5/weather?q=Paris

The returned data, in JSON format in this case, is used to create an object (jsonWeather) of class com.example.model.JSON_Weather which internally uses an EnhancedJSONObject to be able to retrieve values of attributes specified with path expressions. Also an instance, targetObject, of the configured target class (in this case the default class JSONObject) is created.

Then the value of every mapped attribute of the newly created jsonWeather object of class com.example.model.JSON_Weather is retrieved and used to initialize the corresponding value of the target attribute in the targetObject as per the OCS Specification.

Finally, the targetObject is put in a list and returned to the user application as a result of the query API call.

In summary, the present invention can be used as an object pruning and flattening machine such that it converts a complex and/or large object into a simpler and/or flatter object based on the mapping specification for such a conversion.

OCS and ORM

Moreover, as mentioned earlier, in both of the above scenarios, before being returned to the application by OCS, obj1 or obj2 may optionally be persisted into a relational database based on an ORM mapping specification.

In a preferred embodiment, an OCS and/or ORM declarative mapping specification is used to avoid depending on manually-generated executable programming statements to incorporate one or more mapping schemes. Manually-generated code generally requires specialized programming knowledge, time consuming implementation processes, and can be prone to coding errors.

In a preferred embodiment, the OCS and/or ORM declarative mapping specification is embodied in one or more text-based specification file. Reviewing this file allows one to have a full, clear picture of the mapping specification. Alternatively, one or more declarative mapping specifications may be embodied in application program source code using Java annotations, or C# attributes, for example. However, there may be no practical way to incorporate such annotations or attributes for legacy or third-party classes for which no source code is available.

In alternative embodiments, automatic code generation based on a declarative mapping specification may be used to generate at least a portion of the code for one or more mapping units and/or exchange units. Automatic code generation may simplify the time consuming code writing process, and reduce coding errors, but would generally require code regeneration every time the declarative specification is modified.

In a preferred embodiment, the runtime exchange of data uses a reflection facility of a programming language.

Figure 34:
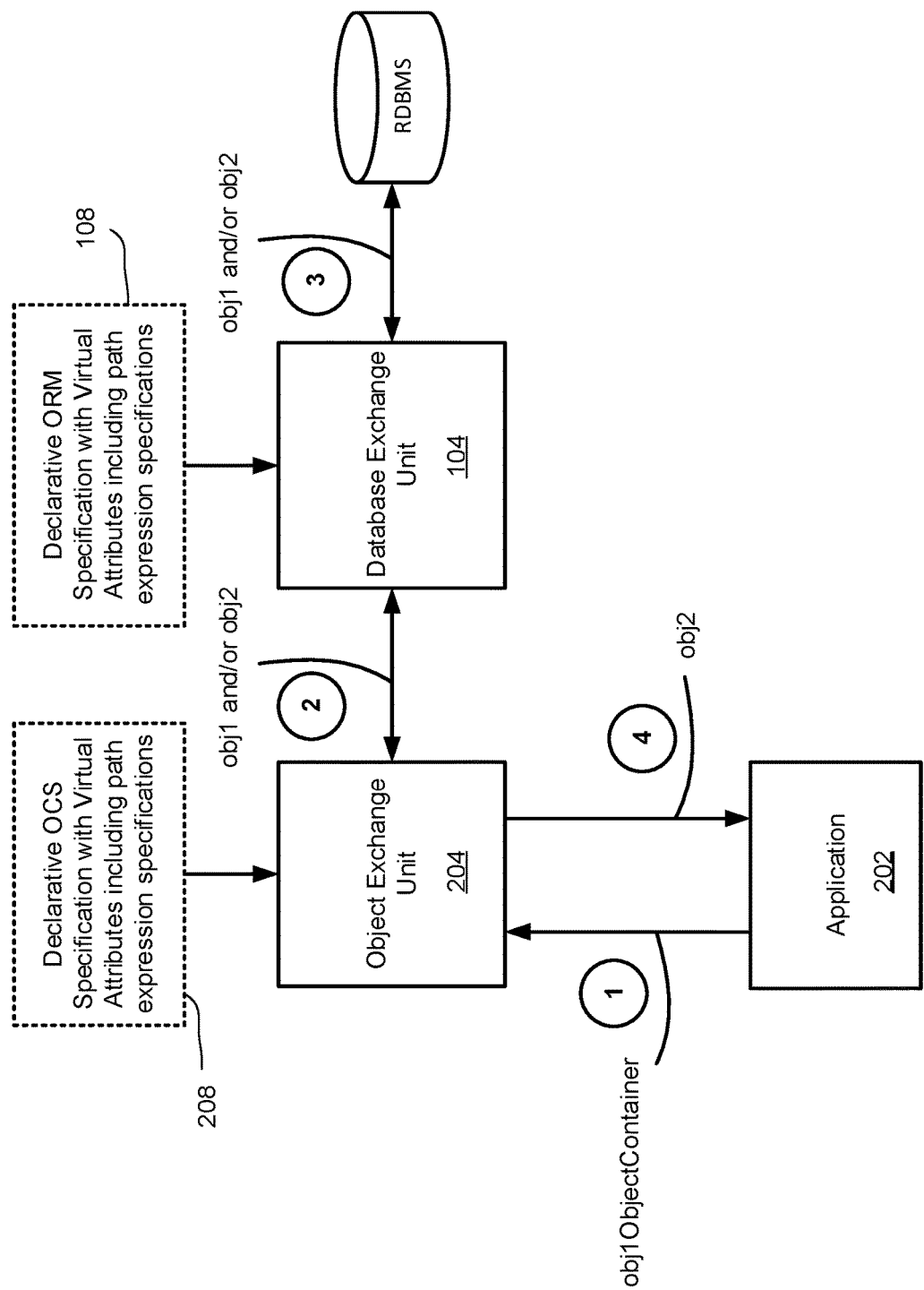
FIG. 34 is an OCS System coupled to an ORM System, which persists the original and/or the converted object.

FIG. 34 shows an OCS is initialized with a declarative OCS Specification; an ORM is initialized with a declarative ORM Specification; the application creates the original object (obj1), makes a conversion call to the OCS; the OCS converts obj1 to obj2, persists obj1 and/or obj2 into database using the ORM, and then returns obj2 to the application; the application uses the converted object (obj2). Please note that an ORM system described earlier can also take obj1 as input and persist a flattened version (obj2) of obj1 in the database.

In FIG. 34, although an ORM system has been shown as a separate component of OCS, its functionality can very well be subsumed in the OCS itself. In such a case, the declarative OCS Specification may also subsume the declarative ORM specification. For example:

INPUT_CLASS    com.example.model.JSON_Weather
TABLE WEATHER
VIRTUAL_ATTRIB  name  ATTRIB_TYPE  java.lang.String
VIRTUAL_OUTPUT_ATTRIB cityName
VIRTUAL_ATTRIB dt ATTRIB_TYPE int VIRTUAL_OUTPUT_ATTRIB date
VIRTUAL_ATTRIB  main.temp  ATTRIB_TYPE double
VIRTUAL_OUTPUT_ATTRIB temperature
VIRTUAL_ATTRIB main.pressure ATTRIB_TYPE double
PRIMARY KEY name dt
SQLMAP FOR main.temp COLUMN_NAME temperature
SQLMAP FOR main.pressure COLUMN_NAME pressure
. . .
;

With the above exemplary specification, where the ORM part is shown in bold, the attributes name, dt, main.temp, and main.pressure of the original object will be saved in the columns cityName, date, temperature, and pressure respectively of the database table WEATHER.

Below is the depiction of a scenario where OCS uses an external service to get the desired object and then uses an ORM to persist that object per OCS and ORM specifications.

Figure 35:
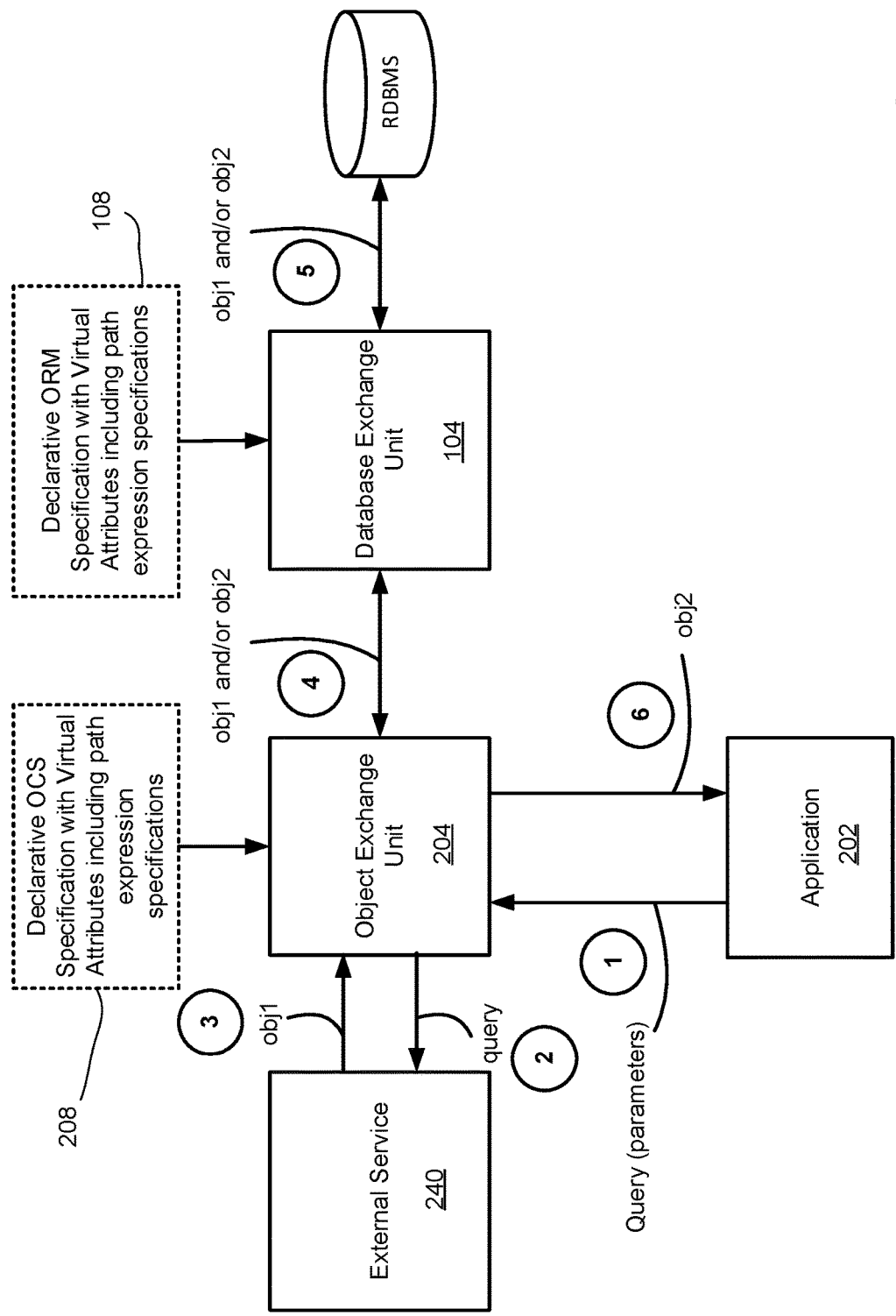
FIG. 35 is an OCS System using an External Service to query object for conversion and is coupled to an ORM System to persist the queried and/or the converted object.

FIG. 35 shows an OCS is initialized with a declarative OCS Specification; an ORM is initialized with a declarative ORM Specification; the application makes a query call to the OCS with appropriate parameters. The OCS retrieves the original object (obj1) from an external service using the passed parameters. The OCS converts obj1 to obj2, persists obj1 and/or obj2 into database using the ORM, and then returns obj1 and/or obj2 to the application; the application uses the retrieved object (obj1) and/or the converted object (obj2). Please note that an ORM system described earlier can also take obj1 as input and persist a flattened version (obj2) of obj1 in the database.

In another aspect of the invention, an OCS system may be used to provide an object pruning and flattening service in an Internet or Intranet cloud. The OCS system may be invoked through remote protocols like web services or RESTful APIs. The original objects may be retrieved from other services. Multiple OCS systems based on multiple OCS Specifications may provide a service exchange such that an application can connect to an appropriate OCS system based on an OCS Specification identified by some name or id. An OCS Exchange connected to multiple backend services and providing domain specific object conversion system based on a particular OCS Specification can serve multiple applications on web.

Figure 36:
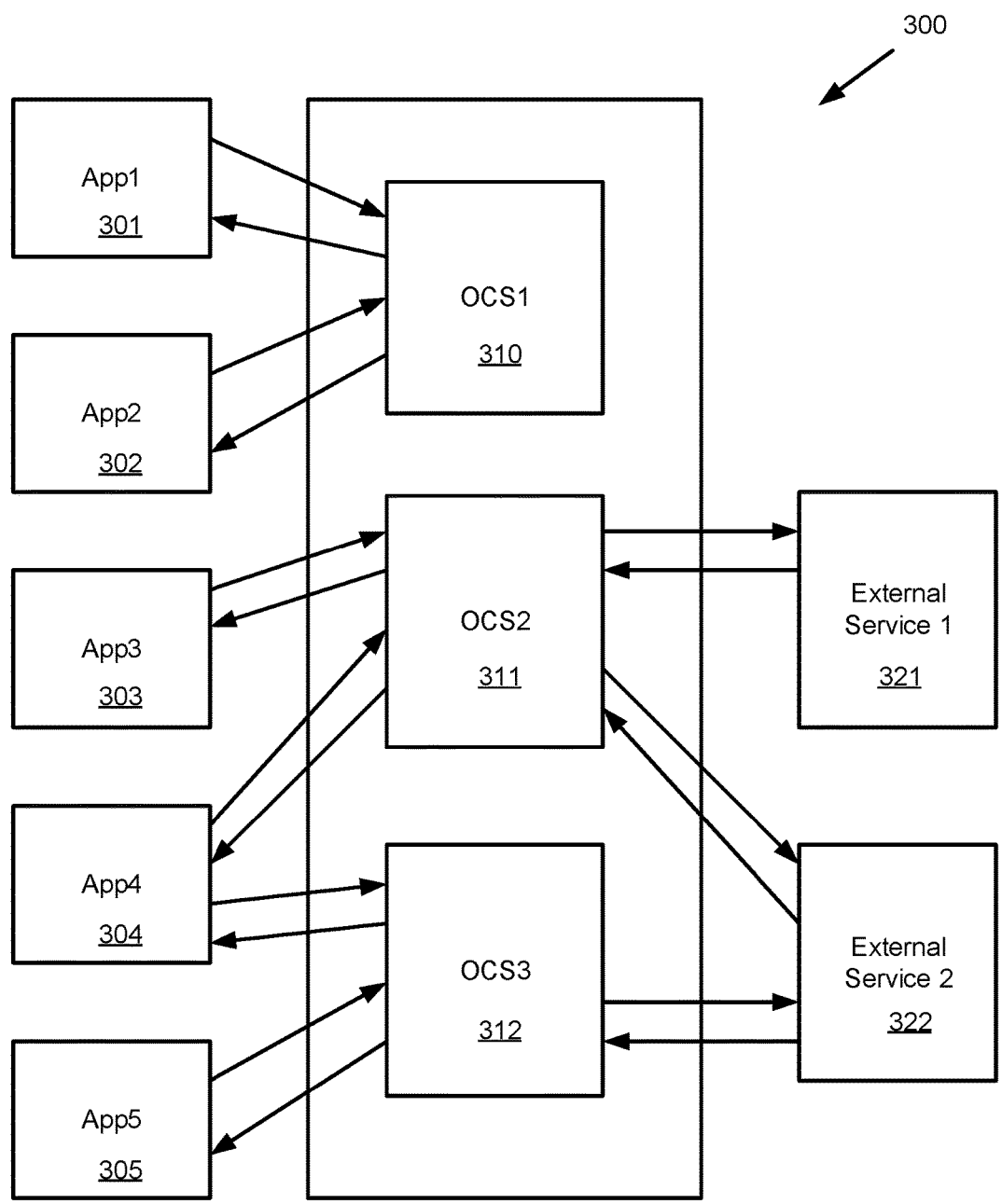
FIG. 36 is an OCS Exchange System.

FIG. 36 shows an OCS Exchange that has three instances of OCS systems (OCS1, OCS2, and OCS3) serving multiple applications. Two external services are also used to obtain object data from two of the OCS systems. An OCS System may convert objects received directly from the application or objects received from one or more External. Services or a combination of both. The OCS Exchange and External Services are hosted in an Internet or Intranet cloud and may be accessed through local or remote protocols.

FIGS. 37A and 37B show exemplary Java source code for an EnhancedJSONObject class.

FIGS. 38A and 38B show exemplary Java source code for a JSONObjectContainer class.

FIGS. 39A, 39B and 39C show alternate exemplary Java source code for an JSONObjectContainer.

FIG. 40 shows exemplary Java source code for the class JSON_Weather.

FIG. 41 shows exemplary embodiment of Java source code for the interface GetSet.

FIGS. 42A and 42B show exemplary embodiment of Java source code for the ObjectContainer.

FIG. 43 shows exemplary embodiment of Java source code for the class Class1.

FIG. 44 shows exemplary embodiment of Java source code for the class Class2.

FIG. 45 shows exemplary embodiment of Java source code for the class Class3.

FIG. 46 shows exemplary embodiment of Java source code for the class OutputClass.

FIG. 47 shows exemplary embodiment of Java source code for the class useOCS.

An ORM system described above may be used as a framework for creating a microservice to provide an Object Relational Mapping (ORM) functionality for a configured ORM specification. An OCS system described above may be used as a framework for creating a microservice to provide an Object Conversion (OCS) functionality for a configured OCS specification.

In some embodiments, the database exchange units may be used to transfer data in JSON format between relational and non-relational databases. Examples of non-relational databases are object-oriented databases (e.g. Versant, Objectivity), NoSQL databases (e.g., Amazon DynamoDB, Couchbase, MongoDB), and Big Data databases.JSON data can be stored in and retrieved for most nonrelational databases by using the methods (APIs and protocols) provided by such databases (e.g., Dynamo DB Mapper for Dynamo). Since the present invention teaches a way to store and retrieve decent data using a relational database, it can thereby be used to transfer data, in JSON format, between relational database on one side in a relational or nonrelational database on the other side. The transfer of data can be done in both ways to optionally achieve synchronization of data between different databases. The transfer of the JSON data can be done using one of the many different communication protocols including restful APIs and web services. Such transfer of data can help in achieving the following and similar kinds of functionalities where at least one of the source and target databases is a relational database:
  a) data migration (transfer) from a source database to a target database.
  b) data synchronization between a source database and a target database.
  c) continuous data replication from a source database to a target database.

The data transfer may be controlled based on the value of a timestamp or a version attribute. The data transfer can be further controlled using the flattening and pruning techniques described in the invention. The object augmentation technique may be used to further enhance the data transfer process.

FIG. 48 shows an embodiment of data transfer from a source relational database to a target relational database. A module represents programming code.

Figure 49:
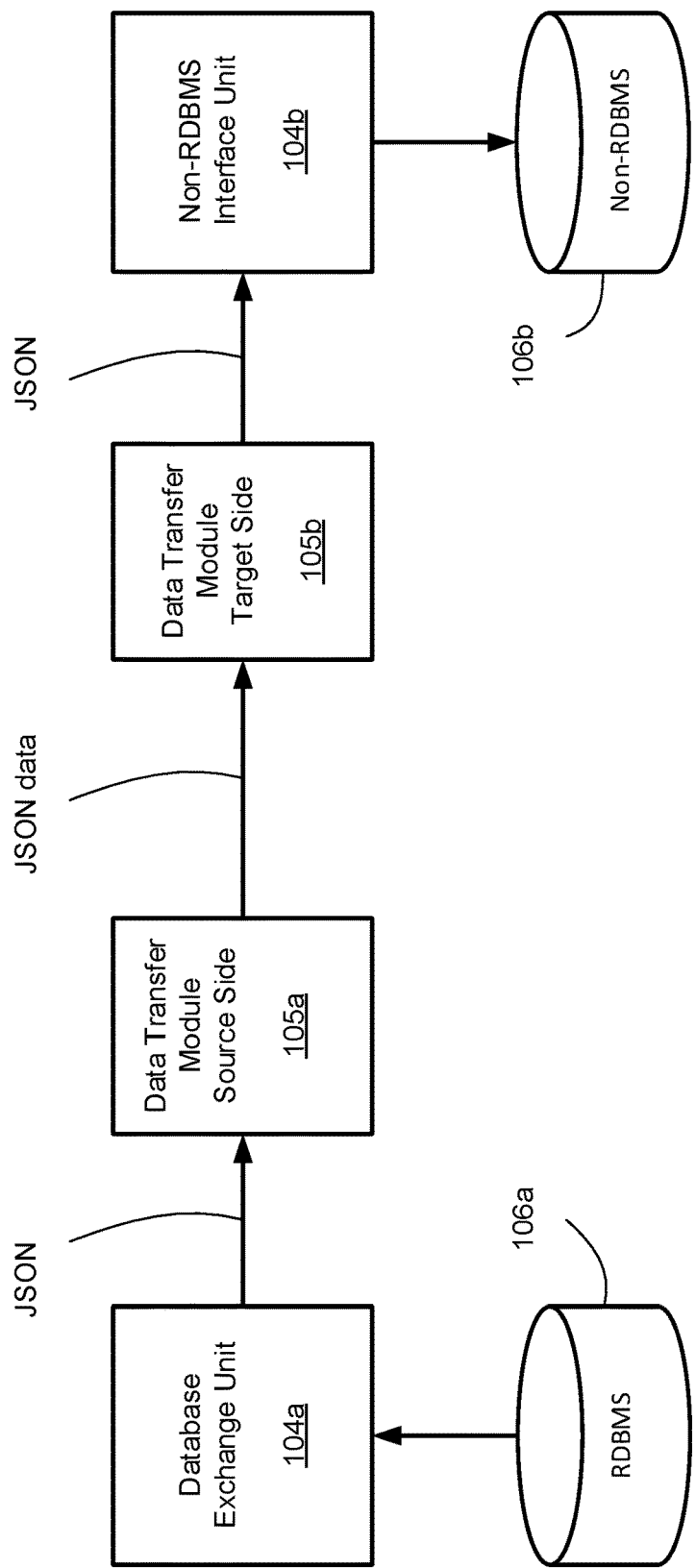
FIG. 49 shows an embodiment of data transfer from a source relational database to a target non-relational database.

FIG. 49 shows an embodiment of data transfer from a source relational database to a target non-relational database. The Non-RDBMS Interface Unit provides the methods to store JSON data in the non-relational database and to retrieve data in JSON format from the non-relational database.

Figure 50:
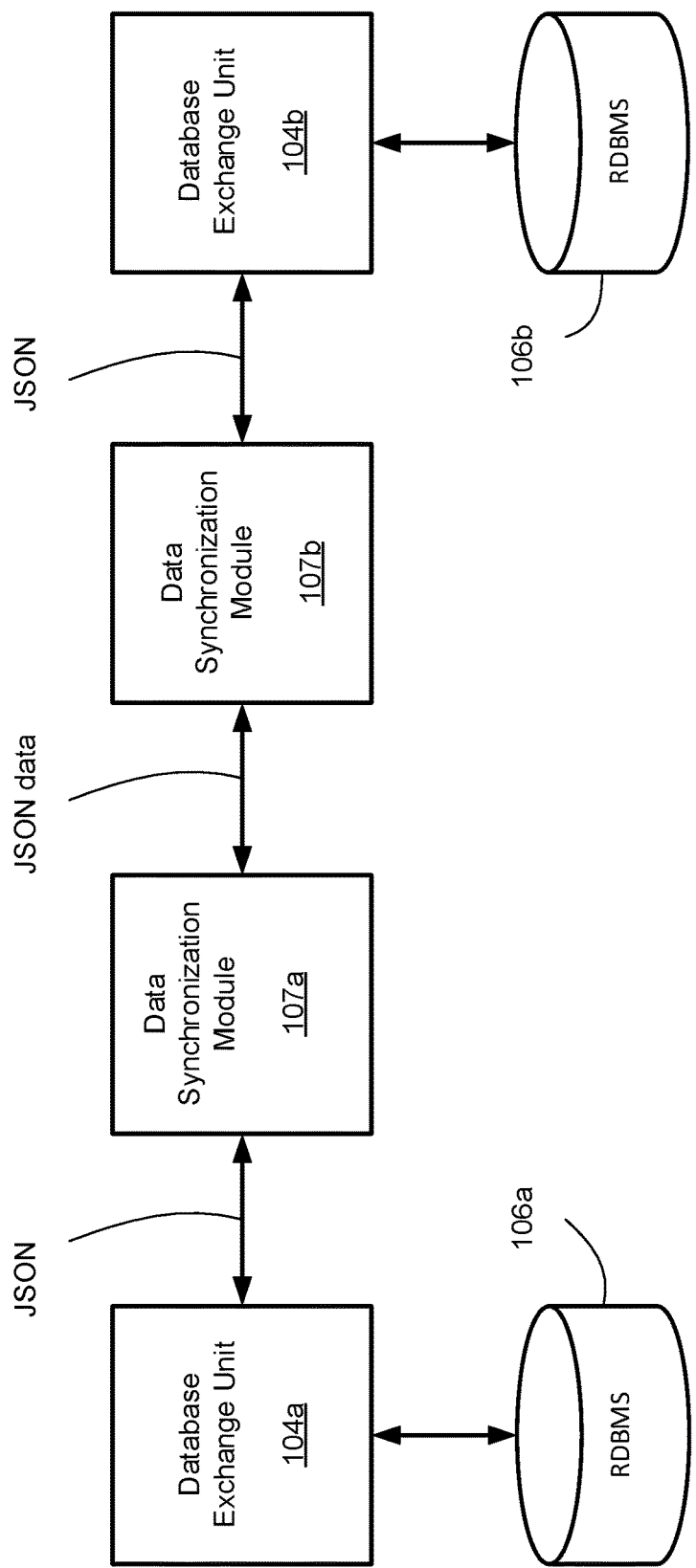
FIG. 50 shows an embodiment of data synchronization between two relational databases.

FIG. 50 shows an embodiment of data synchronization between two relational databases.

Figure 51:
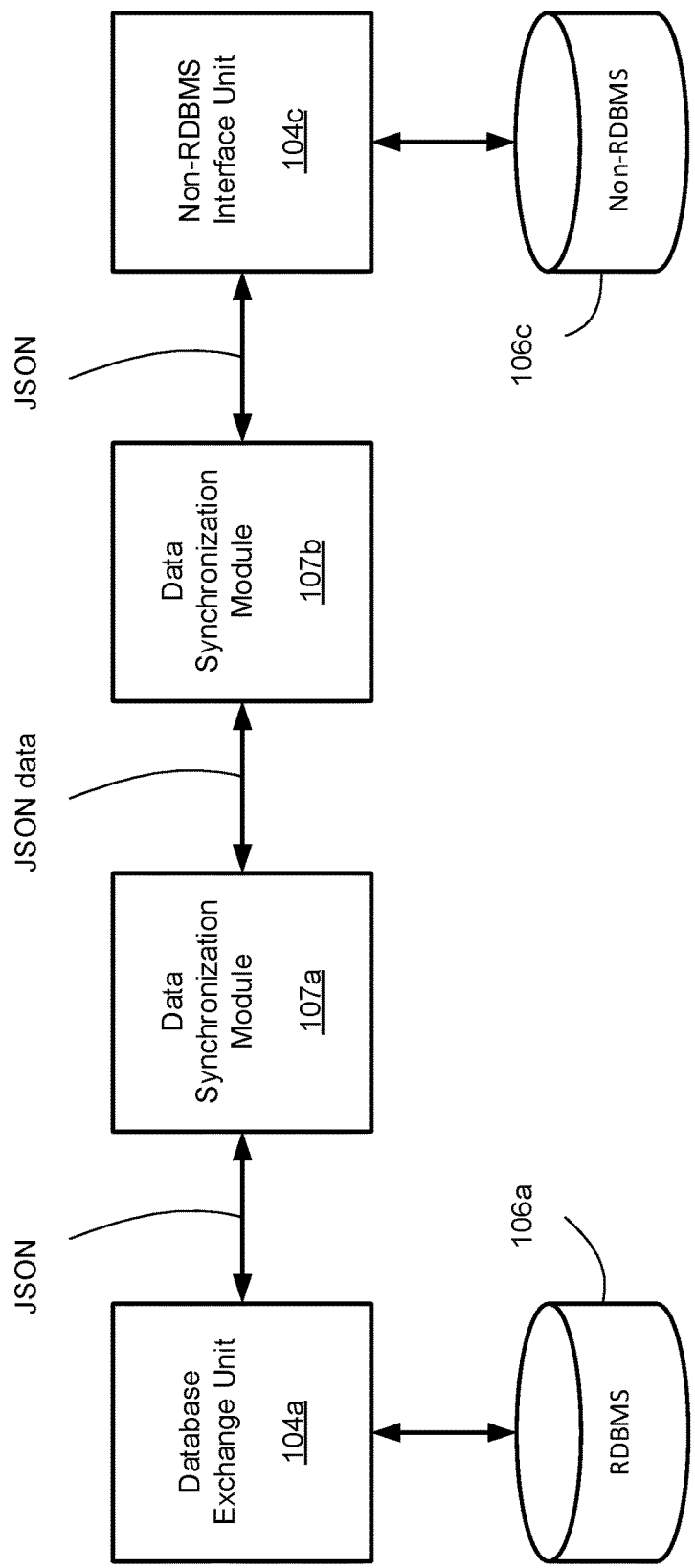
FIG. 51 shows an embodiment of data synchronization between a relational database and a non-relational database.

FIG. 51 shows an embodiment of data synchronization between a relational database and a non-relational database. The Non-RDBMS Interface Unit provides the methods to store JSON data in the non-relational database and to retrieve data in JSON format from the non-relational database.

Note that the present invention can also be enhanced to handle data in binary formats (like Google Protocol Buffers and Apache Thrift) in addition to the JSON format by creating an ObjectContainer class similar to JSONObjectContainer class and defining the mapping for the binary data using virtual attributes.

Figure 52:
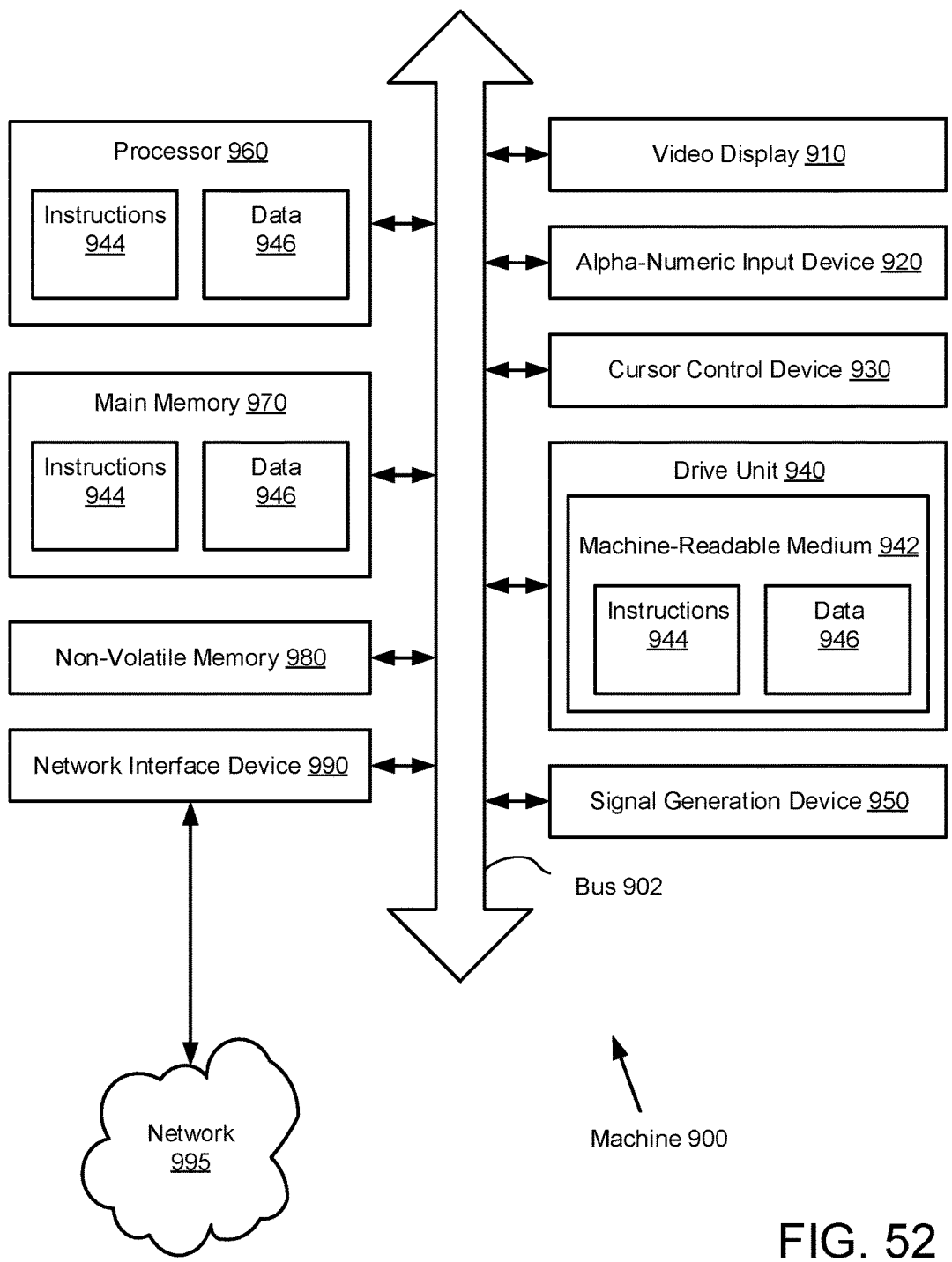
FIG. 52 illustrates an embodiment of a machine having a set of instructions for causing the machine to perform one or more of the methods discussed herein.

FIG. 52 is a diagrammatic representation of an embodiment of a machine 900, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with a server to facilitate operations of the server and/or to access the operation of the server. In some embodiments, the machine may act as a server for some functions and a client for other functions.

In some embodiments, the machine 900 runs the application 100 or application 200. In other embodiments, the machine 900 is the ORM system 100 or OCS system 200 according to an embodiment as described herein or a component of such systems, such as one or more components that make up the ORM system 100 or the OCS System 200, or one or more units as described herein. In other embodiments, the machine 900 is the RDBMS 106 or the non-RDBMS 106c according to an embodiment as described herein.

The machine 900 includes a processor 960 (e.g., a central processing unit (CPU), a graphics processing unit (GPU) or both), a main memory 970 and a nonvolatile memory 980, which communicate with each other via a bus 902. In some embodiments, the machine 900 may be a cluster of computers or comprise multiple processors or multiple processor cores. In one embodiment, the machine 900 also includes a video display 910, an alphanumeric input device 920 (e.g., a keyboard), a cursor control device 930 (e.g., a mouse), a drive unit 940 (e.g., solid state drive (SSD), hard disk drive, Digital Versatile Disk (DVD) drive, or flash drive), a signal generation device 950 (e.g., a speaker) and a network interface device 990.

In some embodiments, the video display 910 includes a touch-sensitive screen for user input. In some embodiments, the touch-sensitive screen is used instead of a keyboard and mouse. The drive unit 940 includes a machine readable medium 942 on which is stored one or more sets of instructions 944 (e.g. software) embodying any one or more of the methods or functions of the inventive subject matter.

The instructions 944 may also reside, completely or partially, on machine-readable media within the main memory 940 and within machine-readable media within the processor 960 during execution thereof by the machine 900. The instructions 944 may also be transmitted or received over a network 995 via the network interface device 990. In some embodiments, the machine-readable medium 942 also includes a database 944 including some of the received information.

While the machine-readable medium 942 is shown in an exemplary embodiment to be a single medium, the term "machine-readable medium" should be taken to include a single medium or multiple media (e.g., a centralized or distributed database, and/or associated caches and servers) that store the one or more sets of instructions and/or data. The term "machine readable medium" shall also be taken to include any non-transitory medium that is capable of storing, encoding or carrying a set of instructions for execution by the machine and that cause the machine to perform any one or more of the methods or functions of the inventive subject matter. The term "machine-readable medium" shall accordingly be taken to include, but not be limited to, solid-state memories, optical and magnetic media, and other non-transitory tangible media.

In general, the methods executed to implement the embodiments of the disclosure, may be implemented as part of an operating system or a specific application, component, program, object, module or sequence of instructions referred to as "programs." For example, one or more programs may be used to execute specific processes according to the inventive subject matter. The programs typically comprise one or more instructions set at various times in various memory and storage devices in the machine, and that, when read and executed by one or more processors, cause the machine to perform operations to execute methods, functions and other elements of the inventive subject matter.

Moreover, while embodiments have been described in the context of machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include, but are not limited to, recordable type media such as volatile and non-volatile memory devices, flash memory devices, floppy and other removable disks, hard disk drives, and optical disks such as Compact Disk Read-Only Memory (CD-ROMS) and Digital Versatile Disks (DVDs), among others.

What is claimed is:

1. A system for converting data between an object-oriented system comprising an object model, wherein the object model is at least partially defined by a JSON object class, and a relational system comprising a relational model defined by tables, the system comprising:
    an object relational mapping (ORM) data structure stored in a non-transitory machine-readable medium and defining a mapping between the object model and the relational model, the ORM data structure produced from a declarative ORM specification based on an ORM grammar; and
    an exchange unit operable to convert data from the object model to the relational model through an object container stored in a non-transitory machine-readable medium and encapsulating a first JSON object of the JSON object class, and to convert data from the relational model to the object model through an object container stored in a non-transitory machine-readable medium and encapsulating a second JSON object.

2. The system of claim 1 wherein the first JSON object comprises a first plurality of attributes and the second JSON object comprises a second plurality of attributes, the exchange unit operable to use a reflection facility of a programming language for at least one of getting the values of the first plurality of attributes and setting the values of the second plurality of attributes.

3. The system of claim 1 wherein the object model is at least partially defined by a non-JSON object class and wherein the exchange unit is further operable to convert data from the object model corresponding to the non-JSON object class to the relational model, and to convert data from the relational model to the object model corresponding to the non-JSON object class.

4. The system of claim 1 wherein the exchange unit further comprises:
    an object call processing unit communicatively coupled to receive object calls from the object-oriented system;
    a mapping unit communicatively coupled to the object call processing unit, the mapping unit operable to receive an object class definition, and operable to perform object relational mapping according to the declarative ORM specification in response to the object calls; and
    a database interface unit communicatively coupled to the mapping unit, the database interface unit operable to store and receive data in the relational system.

5. The system of claim 4 further comprises a code generation unit operable to generate at least part of the mapping unit based on the declarative ORM specification.

6. The system of claim 1 wherein the declarative ORM specification selects less than all the attributes of the JSON object class for converting data from the object model to the relational model.

7. The system of claim 6, wherein data is retrieved from the relational model to the second JSON object, the second JSON object having less than all the attributes of the JSON object class.

8. The system of claim 1 wherein the JSON object class has a first plurality of attributes and the object model comprises an additional attribute that is not one of the first plurality of attributes;
    the declarative ORM specification comprises a declaration for mapping the additional attribute; and
    the exchange unit being operable to use an accessor method to retrieve the value of the additional attribute and to save the retrieved value of the additional attribute and at least one attribute value of the first plurality of attributes in the relational system; and being further operable to retrieve from the relational system the value of the additional attribute and the at least one attribute value of the first plurality of attributes into the second JSON object.

9. The system of claim 1 further comprising:
    a second relational system operable to store JSON object data;
    a first module operable to retrieve a JSON object from the exchange unit; and
    a second module operable to receive the JSON object data from the first module and to store the JSON object data in the second relational system through a second exchange unit.

10. The system of claim 1 further comprising:
an object-oriented database system operable to store JSON object data;
a first module operable to retrieve a JSON object from the exchange unit; and
a second module operable to receive the JSON object data from the first module and to store the JSON object data in the object-oriented database system through an object-oriented database interface unit.

11. The system of claim 1 further comprising:
a second database system operable to store and retrieve JSON data;
a first module to retrieve data in JSON format from the second database system using a database interface unit of the second database system and to transfer the retrieved JSON data to a second module; and
the second module storing the JSON data in the relational system using the exchange unit.

12. The system of claim 11 wherein the second database system is an object-oriented database system.

13. A system for converting data between an object-oriented system comprising an object model, wherein the object model is at least partially defined by at least two linked object classes, and a relational system comprising a relational model defined by tables, the system comprising:
an ORM data structure stored in a non-transitory machine-readable medium and defining a mapping between the object model and the relational model, the ORM data structure produced from a declarative ORM specification based on an ORM grammar, the declarative ORM specification comprising a path expression for mapping a nested attribute of the at least two linked object classes; and
an exchange unit operable to convert data from the object model to the relational model through an object container stored in a non-transitory machine-readable medium and encapsulating a first instance of objects of the at least two linked object classes, and to convert data from the relational model to the object model through an object container stored in a non-transitory machine-readable medium and encapsulating a second object wherein the value of the nested attribute of the first instance of objects of the at least two linked object classes is retrieved into a top-level attribute of the second object.

14. The system of claim 13 wherein the exchange unit is operable to use a reflection facility of a programming language to get and set at least one attribute value of at least one object of the object model.

15. The system of claim 13 wherein the exchange unit further comprises:
an object call processing unit communicatively coupled to receive object calls from the object-oriented system;
a mapping unit communicatively coupled to the object call processing unit, the mapping unit receiving definitions of the at least two linked object classes, and performing object relational mapping according to the declarative ORM specification in response to the object calls; and
a database interface unit communicatively coupled to the mapping unit, the database interface unit storing and retrieving data in the relational system.

16. The system of claim 15 further comprises a code generation unit for generating at least part of the mapping unit based on the declarative ORM specification.

17. The system of claim 13 wherein at least one of the at least two linked object classes is a JSON object class.

18. The system of claim 13 wherein the class of the object container comprises a method for accessing the nested attribute based on the path expression.

19. The system of claim 18 wherein the class of the object container is a JSON object container class.

20. The system of claim 13 wherein the class of the object container references an enhanced JSON object comprising a method for accessing the nested attribute based on the path expression.

21. The system of claim 13 wherein the declarative ORM specification selects less than all the attributes of the at least two linked object classes for converting data from the object model to the relational model.

22. The system of claim 21 wherein data is retrieved from the relational model to a second class of the object model, the second class of the object model having less attributes than the at least two linked object classes of the object model.

23. The system of claim 13 wherein the path expression comprises a sequence of linking attribute names and the name of the nested attribute, each linking attribute name being used to reference the next linked object in the sequence to identify the path to the nested attribute, wherein the last linked object has the nested attribute.

24. The system of claim 23 wherein the attribute names in the path expression are separated by a delimiter.

25. The system of claim 23 wherein a column name in the relational system for a nested attribute is specified in the ORM specification.

26. A system for converting data between an input object model and an output object model, the system comprising:
an input JSON object class at least partially defining the input object model and an output JSON object class at least partially defining the output object model;
an object container stored in a non-transitory machine-readable medium and encapsulating a first JSON object of the input JSON object class;
an object conversion system (OCS) data structure stored in a non-transitory machine-readable medium and defining a mapping between the input object model and the output object model, the OCS data structure produced from a declarative OCS specification based on an OCS grammar, the declarative OCS specification selects at least one of the attributes of the input JSON object class for converting data from the input object model to the output object model; and
an exchange unit for converting data of the first JSON object, through the object container, from the input object model to the output object model.

27. The system of claim 26 wherein the input JSON object class comprises a first plurality of attributes and the output JSON object class comprises a second plurality of attributes, the exchange unit operable to use a reflection facility of a programming language for at least one of getting the values of the first plurality of attributes and setting the values of the second plurality of attributes.

28. The system of claim 26 wherein the exchange unit is operable to convert data of the first JSON object from the input JSON object model to data of an object of the output JSON object model according to the declarative OCS specification.

29. The system of claim 26 further comprises a code generation unit for generating at least part of the exchange unit based on the declarative OCS specification.

30. The system of claim 26 wherein the declarative OCS specification selects less than all the attributes of the input JSON object class for converting data from the input object model to the output object model.

31. The system of claim 26 wherein the input JSON object class has a first plurality of attributes at least partially defining the input object model and the input object model comprises an additional attribute that is not one of the first plurality of attributes;
   the declarative OCS specification comprises a declaration for mapping the additional attribute; and
   the exchange unit being operable to use at least one getter method to retrieve at least one attribute value of the first plurality of attributes from the first JSON object and the value of the additional attribute and to use at least one setter method to set the retrieved values into a second JSON object of the output object model.

32. A system for converting data between an input object model and an output object model, wherein the input object model is at least partially defined by at least two linked object classes, and at least one output object class defining an output object model, the system comprising:
   an OCS data structure stored in a non-transitory machine-readable medium and defining a mapping between the input object model and the output object model, the OCS data structure produced from a declarative OCS specification based on an OCS grammar, the declarative OCS specification comprising a path expression for mapping a nested attribute of the at least two linked object classes;
   an object container stored in a non-transitory machine-readable medium and encapsulating a first instance of objects of the at least two linked object classes; and
   an exchange unit operable to convert data of the first instance of objects of the at least two linked object classes from the input object model, through the object container, to data of an output object of the output object model wherein the value of the nested attribute of the first instance of objects of the at least two linked object classes is used to set the value of a top-level attribute of the output object.

33. The system of claim 32 wherein the exchange unit is operable to convert data of the object from the input object model to data of an object of the output object model according to the declarative OCS specification.

34. The system of claim 32 further comprises a code generation unit for generating at least part of the exchange unit based on the declarative OCS specification.

35. The system of claim 32 wherein the at least two linked object classes comprise at least two linked JSON object classes.

36. The system of claim 35 wherein the object container references an enhanced JSON object comprising a method for accessing a nested attribute of the at least two linked JSON object classes based on the path expression.

37. The system of claim 32 wherein the declarative OCS specification selects less than all the attributes of the at least two linked object classes for converting data from the input object model to the output object model.

38. The system of claim 37 wherein the data is retrieved through the object container from the objects of the at least two linked object classes and converted to the output object, the output object having less than all the attributes of the objects of the at least two linked object classes.

39. The system of claim 32 wherein the class of the object container comprises a method for accessing the nested attribute based on the path expression.

40. The system of claim 32 wherein the path expression comprises a sequence of linking attribute names and the name of the nested attribute, each linking attribute name being used to reference the next linked object in the sequence to identify the path to the nested attribute, wherein the last linked object has the nested attribute.

41. The system of claim 40 wherein the attribute names in the path expression are separated by a delimiter.

42. A system for converting data between an object-oriented system comprising an input object model and an output object model, and a relational system comprising a relational model defined by tables, the system comprising:
   at least one input object class at least partially defining the input object model and at least one output object class at least partially defining the output object model;
   a first object container stored in a non-transitory machine-readable medium and encapsulating an input object of a class in the input object model;
   an object conversion system (OCS) data structure stored in a non-transitory machine-readable medium and defining a mapping between the input object model and the output object model, the OCS data structure produced from a declarative OCS specification based on an OCS grammar, the declarative OCS specification selects at least one of the attributes of the class in the input object model for converting data from the input object model to the output object model;
   a first exchange unit for converting data of the input object, through the first object container, to data of an output object of the output object model;
   a second object container stored in a non-transitory machine-readable medium and encapsulating a second object, wherein the second object is either the input object or the output object;
   an object relational mapping (ORM) data structure stored in a non-transitory machine-readable medium and defining a mapping between at least one of the input object model and the output object model to the relational model, the ORM data structure generated produced from a declarative ORM specification based on an ORM grammar; and
   a second exchange unit operable to convert data from at least one of the input object model and the output object model to the relational model through the second object container encapsulating the second object.

43. The system of claim 42 wherein the second object is the input object, the ORM data structure defines a mapping between the input object model and the relational model.

44. The system of claim 42 wherein the second object is the output object, the ORM data structure defines a mapping between the output object model and the relational model.

45. The system of claim 42 wherein the first object comprises a first plurality of attributes and the second object comprises a second plurality of attributes, the first exchange unit and the second exchange unit being operable to use a reflection facility of a programming language for accessing at least one of the values of the first plurality of attributes and the values of the second plurality of attributes.

46. The system of claim 42, wherein the at least one input class comprises at least two linked object classes, the declarative OCS specification comprises a path expression for mapping a nested attribute of the at least two linked object classes; the input object is an instance of the at least two linked object classes; and the first exchange unit is further operable to convert data of the input object through the first object container to data of the output object wherein the value of the nested attribute of the input object model is used to set the value of a top-level attribute of the output object.

47. The system of claim 42 wherein at least one of the input object and the output object is a JSON object.

48. The system of claim 42 further comprising an external service, wherein the first exchange unit is operable to pass at least one parameter in a query to the external service, the external service being operable to return the first object in response to the query based on the at least one parameter.

49. A program product comprising at least one non-transitory machine-readable medium, the at least one non-transitory machine-readable medium storing instructions, the instructions comprising:
instructions which when executed by at least one processor cause converting data between an object-oriented system comprising an object model, wherein the object model is at least partially defined by a JSON object class, and a relational system comprising a relational model defined by tables;
instructions which when executed by at least one processor cause producing an object relational mapping (ORM) data structure from a declarative ORM specification based on an ORM grammar, the ORM data structure defining a mapping between the object model and the relational model; and
instructions which when executed by at least one processor cause an exchange unit converting data from the object model to the relational model through an object container encapsulating a first JSON object of the JSON object class, and cause converting data from the relational model to the object model through an object container encapsulating a second JSON object.

50. The program product of claim 49, wherein the first JSON object comprises a first plurality of attributes and the second JSON object comprises a second plurality of attributes, and the instructions further include:
instructions which when executed by at least one processor cause the exchange unit to use a reflection facility of a programming language for at least one of getting the values of the first plurality of attributes and setting the values of the second plurality of attributes.

51. The program product of claim 49 wherein the declarative ORM specification selects less than all the attributes of the JSON object class for converting data from the object model to the relational model.

52. The program product of claim 49, wherein an object-oriented database system is operable to store JSON object data, and the instructions further include:
instructions which when executed by at least one processor cause a first module to retrieve a JSON object from the exchange unit; and
instructions which when executed by at least one processor cause a second module to receive the JSON object data from the first module and to store the JSON object data in the object-oriented database system through an object-oriented database interface unit.

53. A program product comprising at least one non-transitory machine-readable medium, the at least one non-transitory machine-readable medium storing instructions, the instructions comprising:
instructions which when executed by at least one processor cause converting data between an object-oriented system comprising an object model, wherein the object model is at least partially defined by at least two linked object classes, and a relational system comprising a relational model defined by tables;
instructions which when executed by at least one processor cause producing an object relational mapping (ORM) data structure from a declarative ORM specification based on an ORM grammar, wherein the declarative ORM specification comprises a path expression for mapping a nested attribute of the at least two linked object classes, and wherein the ORM data structure defines a mapping between the object model and the relational model; and
instructions which when executed by at least one processor cause converting data from the object model to the relational model through an object container encapsulating a first instance of objects of the at least two linked object classes, and converting data from the relational model to the object model through an object container encapsulating a second object, wherein the value of the nested attribute of the first instance of objects of the at least two linked object classes is retrieved into a top-level attribute of the second object.

54. The program product of claim 53 wherein at least one of the at least two linked object classes is a JSON object class.

55. The program product of claim 53 wherein the declarative ORM specification selects less than all the attributes of the at least two linked object classes for converting data from the object model to the relational model.

56. A program product comprising at least one non-transitory machine-readable medium, the at least one non-transitory machine-readable medium storing instructions, the instructions comprising:
instructions which when executed by at least one processor cause converting data between an input object model and an output object model, wherein an input JSON object class at least partially defining an input object model and an output JSON object class at least partially defining an output object model;
instructions which when executed by at least one processor cause producing an object conversion system (OCS) data structure from a declarative OCS specification based on an OCS grammar, wherein the declarative OCS specification selects at least one of the attributes of the input JSON object class for converting data from the input object model to the output object model, and wherein the OCS data structure defines a mapping between the input object model and the output object model;
instructions which when executed by at least one processor cause an object container to encapsulate a first JSON object of the input JSON object class; and
instructions which when executed by at least one processor cause converting data of the first JSON object, through the object container, from the input object model to the output object model.

57. The program product of claim 56 wherein the declarative OCS specification selects less than all the attributes of the input JSON object class for converting data from the input object model to the output object model.

58. A program product comprising at least one non-transitory machine-readable medium, the at least one non-transitory machine-readable medium storing instructions, the instructions comprising:
instructions which when executed by at least one processor cause converting data between an input object model and an output object model, wherein the input object model is at least partially defined by at least two linked object classes, and at least one output object class defining an output object model;
instructions which when executed by at least one processor cause producing an object conversion system (OCS) data structure from a declarative OCS specification based on an OCS grammar, wherein the declarative OCS specification comprises a path expression for mapping a nested attribute of the at least two linked object classes, and wherein the OCS data structure defines a mapping between the input object model and the output object model;

instructions which when executed by at least one processor cause an object container to encapsulate a first instance of objects of the at least two linked object classes; and instructions which when executed by at least one processor cause converting data of the first instance of objects of the at least two linked object classes from the input object model, through the object container, to data of an output object of the output object model, wherein the value of the nested attribute of the first instance of objects of the at least two linked object classes is used to set the value of a top-level attribute of the output object.

59. The program product of claim 58 wherein the at least two linked object classes comprise at least two linked JSON object classes.

60. The program product of claim 58 wherein the declarative OCS specification selects less than all the attributes of the at least two linked object classes for converting data from the input object model to the output object model.

* * * * *